(12) United States Patent
Yoshida et al.

(10) Patent No.: US 8,108,702 B2
(45) Date of Patent: Jan. 31, 2012

(54) POWER SAVING DEVICE CONTROLLED BY CONTROLLER OR DISK

(75) Inventors: Masahiro Yoshida, Kawasaki (JP); Tadashi Matsumura, Kawasaki (JP); Taichi Oono, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 852 days.

(21) Appl. No.: 12/038,439

(22) Filed: Feb. 27, 2008

(65) Prior Publication Data

US 2008/0244290 A1 Oct. 2, 2008

(30) Foreign Application Priority Data

Mar. 30, 2007 (JP) ................................. 2007-094956

(51) Int. Cl.
*G06F 1/32* (2006.01)
(52) U.S. Cl. .................. 713/320; 713/300; 713/324
(58) Field of Classification Search .................. 713/300, 713/310, 320, 323, 324
See application file for complete search history.

(56) References Cited

U.S. PATENT DOCUMENTS

| | | | |
|---|---|---|---|
| 5,954,820 A * | 9/1999 | Hetzler | 713/323 |
| 6,583,947 B1 | 6/2003 | Hakamata et al. | |
| 7,035,972 B2 * | 4/2006 | Guha et al. | 711/114 |
| 7,082,373 B2 * | 7/2006 | Holle | 702/60 |
| 7,246,105 B2 | 7/2007 | Numanoi et al. | |
| 7,546,414 B2 | 6/2009 | Yamamoto et al. | |
| 2005/0160221 A1 * | 7/2005 | Yamazaki et al. | 711/114 |
| 2005/0268121 A1 * | 12/2005 | Rothman et al. | 713/300 |
| 2006/0239086 A1 * | 10/2006 | Shiota et al. | 365/191 |

FOREIGN PATENT DOCUMENTS

| | | |
|---|---|---|
| JP | 7-134628 | 5/1995 |
| JP | 7-168726 | 7/1995 |
| JP | 8-335357 | 12/1996 |
| JP | 10-333796 | 12/1998 |
| JP | 11-202988 | 7/1999 |
| JP | 2000-293314 | 10/2000 |
| JP | 2002-163076 | 6/2002 |
| JP | 2002-297320 | 10/2002 |
| JP | 2003-345632 | 12/2003 |
| JP | 2004-252570 | 9/2004 |
| JP | 2005-209230 | 8/2005 |
| JP | 2006-260445 | 9/2006 |
| JP | 2006-285464 | 10/2006 |

OTHER PUBLICATIONS

Japanese Office Action issued Feb. 9, 2010 in corresponding Japanese Patent Application 2007-094956.
Japanese Office Action mailed on Jun. 30, 2009 and issued in corresponding Japanese Patent Application 2007-094956.

* cited by examiner

*Primary Examiner* — Thomas Lee
*Assistant Examiner* — Paul Yanchus, III
(74) *Attorney, Agent, or Firm* — Staas & Halsey LLP

(57) ABSTRACT

This is a disk array device comprising means for operating a plurality of controller modules or disks, means for determining the a future operating state, based on operation history of the controller module or the disk and setting means for setting an operating state of the controller module or disk in such a way as to reduce its power consumption, based on the future operating state of the controller module or disk.

20 Claims, 87 Drawing Sheets

|  | Active | Idle | Busy Ratio |
|---|---|---|---|
| CM#0 CPU#0 | XXXX | YYYY | ZZ |
| : | | | |
| CM#7 CPU#1 | SSSS | TTTT | UU |
| CA#0 CPU#0 | AAAA | BBBB | CC |
| : | | | |

FIG. 3

| CM#0 CPU#0 | |
|---|---|
| Time | Busy Ratio |
| 00:00:00 | ZZ |
| 00:00:30 | YY |
| 00:01:00 | XX |
| : | : |

FIG. 4A

| CM#0 CPU#0 | |
|---|---|
| Time | Operational Rank |
| 00:00:00 - 00:30:00 | A |
| 00:30:00 - 01:00:00 | A |
| 01:00:00 - 01:30:00 | B |
| : | : |

FIG. 4B

| CM#0 CPU#0 Time | Present Operational Rank | ... | Yesterday Operational Rank | Today Operational Rank | Renewal Operational Rank |
|---|---|---|---|---|---|
| 00:00:00 - 00:30:00 | A | ... | A | A | A |
| 00:30:00 - 01:00:00 | A | ... | A | B | A |
| 01:00:00 - 01:30:00 | A | ... | B | B | B |
| 01:30:00 - 02:00:00 | B | ... | B | C | B |
| 02:00:00 - 02:30:00 | B | ... | C | C | C |
| ⋮ | ⋮ | ⋮ | ⋮ | ⋮ | ⋮ |

F I G. 5

| Start | End | Operational Rank |
|---|---|---|
| Jan, 1, 1st Week, Mon, 00:00:00 | Jan, 3, 1st Week, Wed, 21:30:00 | D |
| Jan, 3, 1st Week, Wed, 21:30:00 | Jan, 20, 3rd Week, Sat, 12:00:00 | A |
| Jan, 20, 3rd Week, Sat, 12:00:00 | Jan, 30, 5th Week, Tue, 23:30:00 | B |
| Jan, 30, 5th Week, Tue, 23:30:00 | Feb, 1, 1st Week, Thurs, 01:00:00 | A |
| Feb, 1, 1st Week, Thurs, 01:00:00 | Feb, 3, 1st Week, Sat, 21:30:00 | C |
| : | : | : |

FIG. 6A

| CM#0 CPU#0 | CM#0 CPU#0 |
|---|---|
| Time (Feb, 1, 1st Week,) | Operational Rank |
| 00:00:00 - 00:30:00 | B |
| 00:30:00 - 01:00:00 | B |
| 01:00:00 - 01:30:00 | A |
| 01:30:00 - 02:00:00 | B |
| : | : |

F I G. 6 B

| (Feb. 1, 1st Week,) | CM#0 CPU#0 | CM#0 CPU#1 | CM#1 CPU#0 | CM#1 CPU#1 |
|---|---|---|---|---|
| Time | Operational Rank | Operational Rank | Operational Rank | Operational Rank |
| 00:00:00 – 00:30:00 | B | A | C | C |
| 00:30:00 – 01:00:00 | B | A | C | C |
| 01:00:00 – 01:30:00 | A | B | B | C |
| 01:30:00 – 02:00:00 | B | B | B | C |
| ⋮ | ⋮ | ⋮ | ⋮ | ⋮ |

F I G. 7

| Time | CM#0 CPU#0 Busy Ratio | CM#0 CPU#1 Busy Ratio | CM#1 CPU#0 Busy Ratio | CM#1 CPU#1 Busy Ratio |
|---|---|---|---|---|
| 0:00:00 | 30 | 78 | 15 | 12 |
| 0:00:30 | 35 | 72 | 12 | 10 |
| : | : | : | : | : |
| 0:29:00 | 52 | 45 | 35 | 10 |
| 0:29:30 | 56 | 42 | 32 | 16 |
| 0:30:00 | 55 | 41 | 26 | 13 |

FIG. 8

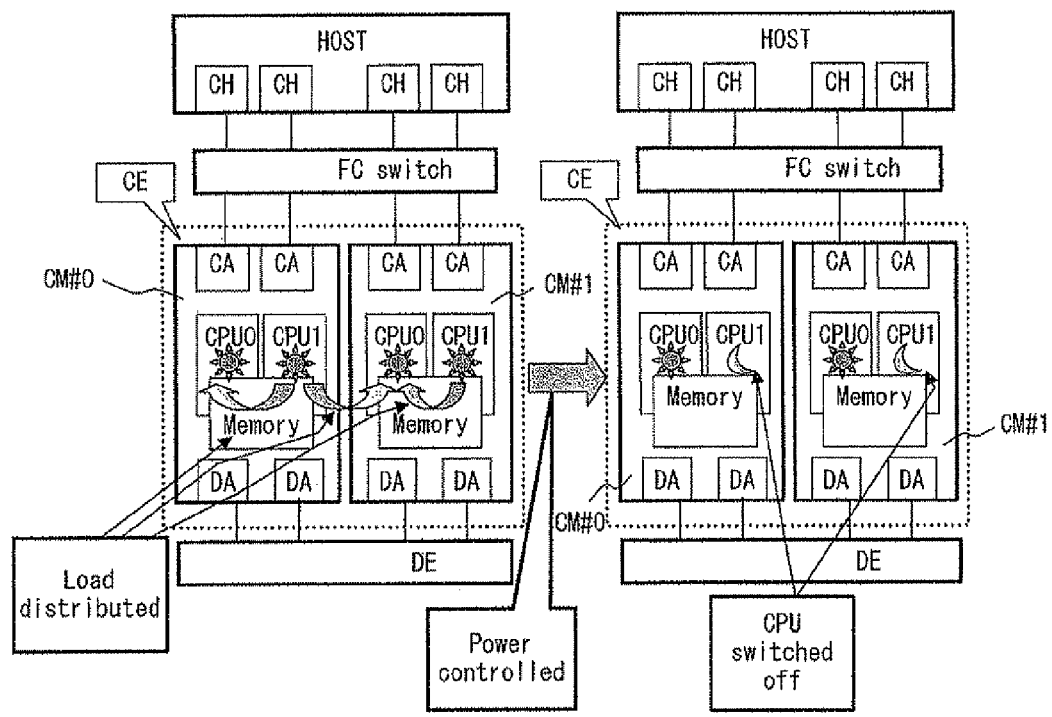
F I G. 9

| Time | CM#0 CPU#0 Busy Ratio | CM#0 CPU#1 Busy Ratio | CM#1 CPU#0 Busy Ratio | CM#1 CPU#1 Busy Ratio |
|---|---|---|---|---|
| 0:00:00 | 70 | 88 | 55 | 42 |
| 0:00:30 | 75 | 82 | 52 | 40 |
| ⋮ | ⋮ | ⋮ | ⋮ | ⋮ |
| 0:29:00 | 65 | 61 | 59 | 49 |
| 0:29:30 | 63 | 69 | 64 | 46 |
| 0:30:00 | 68 | 62 | 67 | 43 |

F I G. 1 0

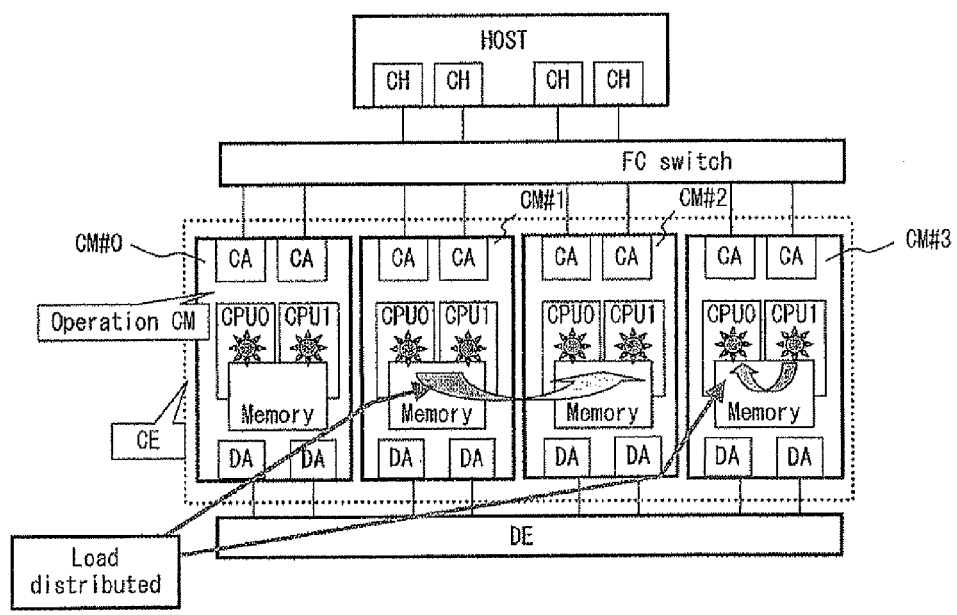
F I G. 1 1 A

| Start | End | Operational Rank |
|---|---|---|
| Jan, 1, 1st Week, Mon, 00:00:00 | Jan, 3, 1st Week, Wed, 21:30:00 | D |
| Jan, 3, 1st Week, Wed, 21:30:00 | Jan, 20, 3rd Week, Sat, 12:00:00 | A |
| Jan, 20, 3rd Week, Sat, 12:00:00 | Jan, 30, 5th Week, Tue, 23:30:00 | B |
| Jan, 30, 5th Week, Tue, 23:30:00 | Feb, 1, 1st Week, Thurs, 01:00:00 | A |
| Feb, 1, 1st Week, Thurs, 01:00:00 | Feb, 3, 1st Week, Sat, 21:30:00 | C |
| .. | .. | .. |

FIG. 12A

| CM#0 CPU#0 | CM#0 CPU#0 |
|---|---|
| Time (Jan, 3, 1st Week) | Operational Rank |
| 20:00:00 - 20:30:00 | D |
| 20:30:00 - 21:00:00 | D |
| 21:00:00 - 21:30:00 | C |
| 21:30:00 - 22:00:00 | A |
| : | : |

FIG. 12B

| (Jan, 3, 1st Week) | CM#0 CPU#0 | CM#0 CPU#1 | CM#1 CPU#0 | CM#1 CPU#1 |
|---|---|---|---|---|
| Time | Operational Rank | Operational Rank | Operational Rank | Operational Rank |
| 20:00:00 - 20:30:00 | D | D | D | D |
| 20:30:00 - 21:00:00 | D | D | D | D |
| 21:00:00 - 21:30:00 | C | C | C | C |
| 21:30:00 - 22:00:00 | A | B | A | A |
| : | : | : | : | : |

FIG. 13A

| (Jan, 3, 1st Week) | CM#0 CPU#0 | CM#0 CPU#1 | CM#1 CPU#0 | CM#1 CPU#1 |
|---|---|---|---|---|
| Time | Busy Ratio | Busy Ratio | Busy Ratio | Busy Ratio |
| 21:00:00 | 16 | Off | 15 | Off |
| 21:00:30 | 19 | Off | 12 | Off |
| : | : | : | : | : |
| 21:09:00 | 30 | Off | 35 | Off |
| 21:09:30 | 42 | Off | 49 | Off |
| 21:10:00 | 60 | Off | 66 | Off |

FIG. 13B

|  | CM#0 CPU#0 | CM#0 CPU#1 | CM#1 CPU#0 | CM#1 CPU#1 |
|---|---|---|---|---|
| Time | Busy Ratio | Busy Ratio | Busy Ratio | Busy Ratio |
| : | : | : | : | : |
| 0:29:00 | 75 | Off | 72 | Off |
| 0:29:30 | 92 | Off | 98 | Off |
| 0:30:00 | 90 | Off | 94 | Off |

FIG. 15

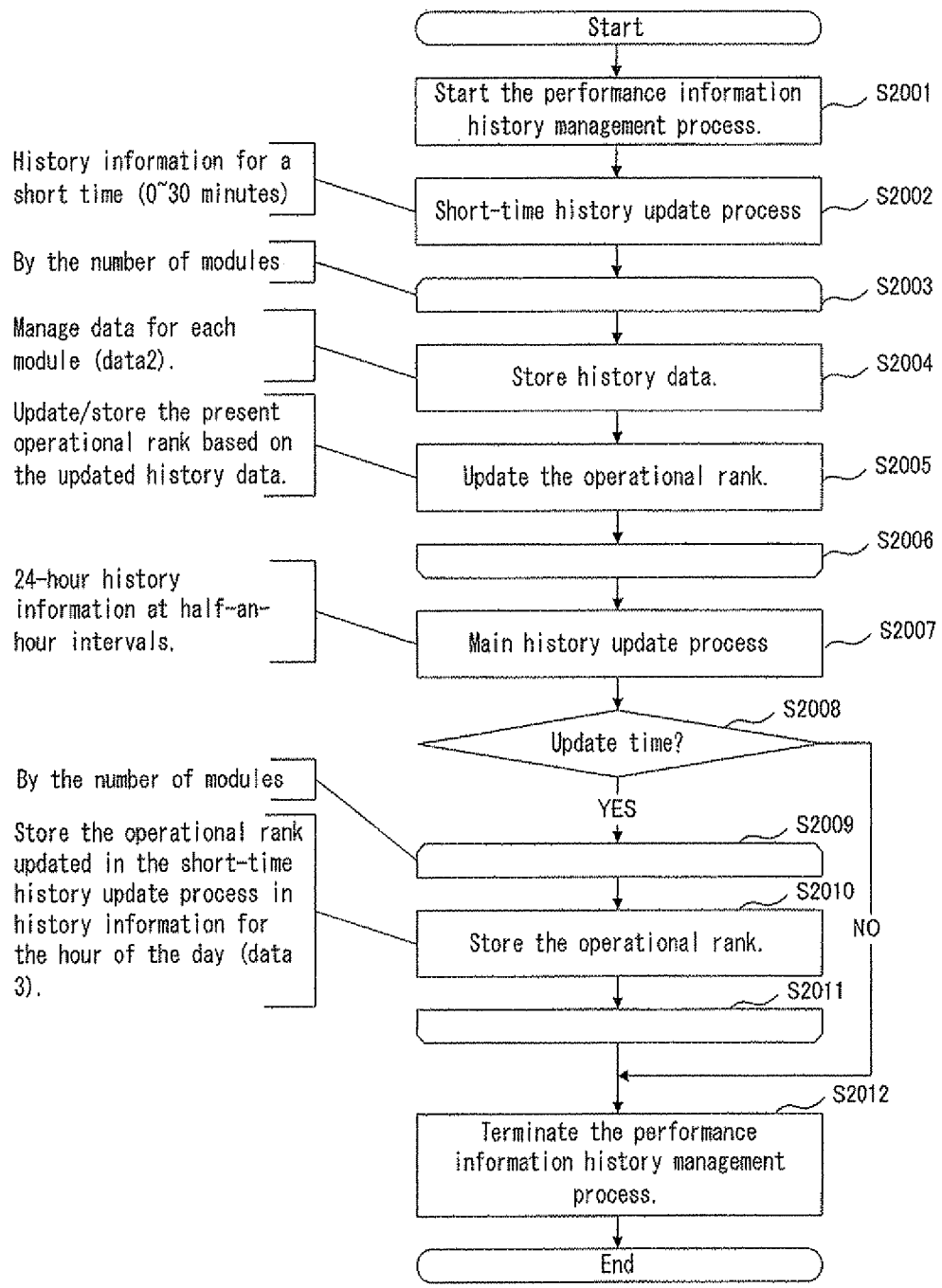
F I G. 20

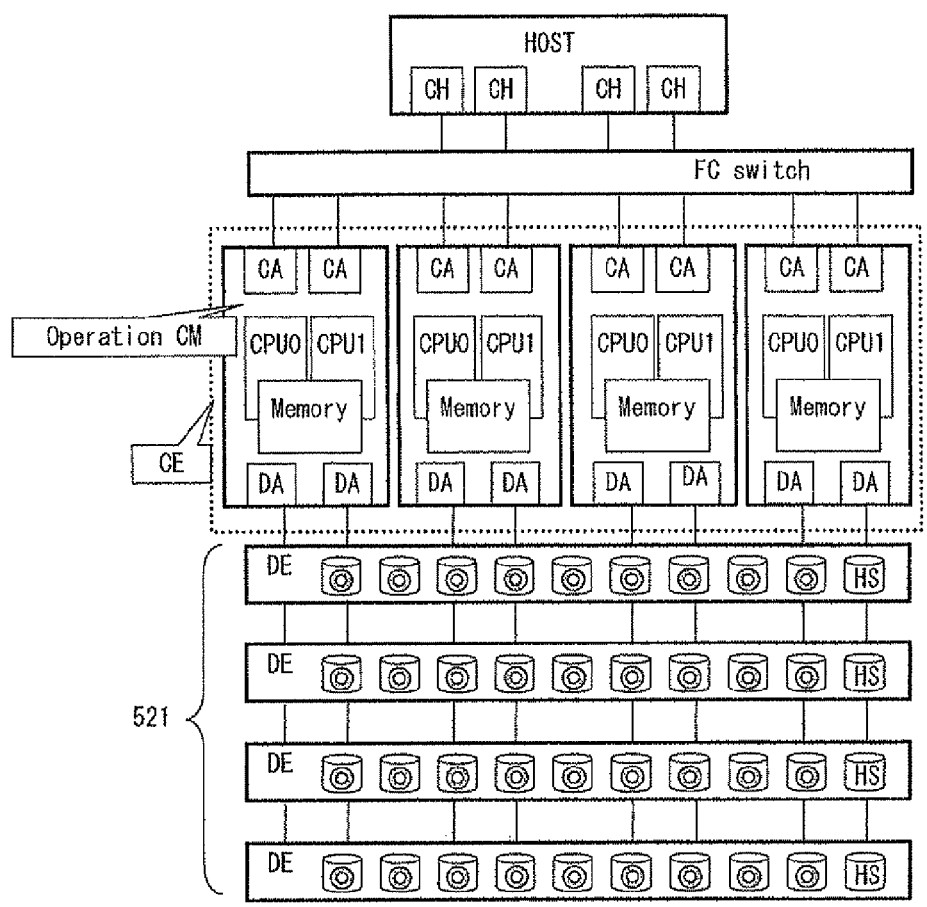
F I G. 4 0

|  | Busy Ratio |
|---|---|
| Disk #0 | ZZ |
| : | |
| Disk #2047 | UU |

FIG. 41A

|          | Command Count | Block Size | Busy Ratio |
|----------|---------------|------------|------------|
| RLU #0   | XXXX          | WWWWW      | MM         |
| ⋮        |               |            |            |
| RLU #1023| CCCC          | SSSSS      | UU         |

FIG. 41B

| Disk#0 | |
|---|---|
| Time | Busy Ratio |
| 00:00:00 | ZZ |
| 00:00:30 | YY |
| 0:01:00 | XX |
| : | : |

FIG. 42A

| RLU#0 | |
|---|---|
| Time | Operational Rank |
| 00:00:00 – 00:30:00 | A |
| 00:30:00 – 01:00:00 | A |
| 01:00:00 – 01:30:00 | B |
| : | : |

FIG. 42B

| RLU#0 | Present | : | Yesterday | Today | Renewal |
|---|---|---|---|---|---|
| Time | Operational Rank | : | Operational Rank | Operational Rank | Operational Rank |
| 00:00:00 - 00:30:00 | A | : | A | A | A |
| 00:30:00 - 01:00:00 | A | : | A | B | A |
| 01:00:00 - 01:30:00 | A | : | B | B | B |
| 01:30:00 - 02:00:00 | B | : | B | C | B |
| 02:00:00 - 02:30:00 | B | : | C | C | C |
| : | : | : | : | : | : |

F I G. 4 3

| Start | End | Operational Rank |
|---|---|---|
| Jan, 1, 1st Week, Mon, 00:00:00 | Jan, 3, 1st Week, Wed, 21:30:00 | D |
| Jan, 3, 1st Week, Wed, 21:30:00 | Jan, 20, 3rd Week, Sat, 12:00:00 | A |
| Jan, 20, 3rd Week, Sat, 12:00:00 | Jan, 30, 5th Week, Tue, 23:30:00 | B |
| Jan, 30, 5th Week, Tue, 23:30:00 | Feb, 1, 1st Week, Thurs, 01:00:00 | A |
| Feb, 1, 1st Week, Thurs, 01:00:00 | Feb, 3, 1st Week, Sat, 21:30:00 | C |
| : | : | : |

F I G. 4 4 A

| RLU#0 | |
|---|---|
| Time (Feb, 1, 1st Week,) | Operational Rank |
| 00:00:00 - 00:30:00 | B |
| 00:30:00 - 01:00:00 | B |
| 01:00:00 - 01:30:00 | A |
| 01:30:00 - 02:00:00 | B |
| : | : |

FIG. 44B

| (Feb, 1, 1st Week,) | RLU#0 | RLU#1 | RLU#2 | RLU#3 |
|---|---|---|---|---|
| Time | Operational Rank | Operational Rank | Operational Rank | Operational Rank |
| 00:00:00 - 00:30:00 | B | A | C | C |
| 00:30:00 - 01:00:00 | B | A | C | C |
| 01:00:00 - 01:30:00 | A | B | B | C |
| 01:30:00 - 02:00:00 | B | B | B | C |
| : | : | : | : | : |

FIG. 45

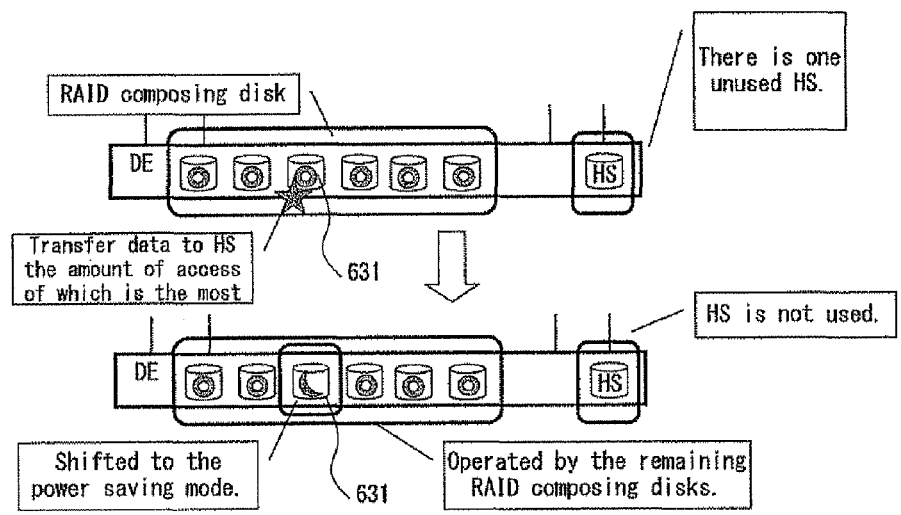
F I G. 49

| (Feb. 1, 1st Week,) | RLU#0 Operational Rank | RLU#1 Operational Rank | RLU#2 Operational Rank | RLU#3 Operational Rank |
|---|---|---|---|---|
| Time | | | | |
| 00:00:00 - 00:30:00 | B | A | B | C |
| 00:30:00 - 01:00:00 | B | A | C | D |
| 01:00:00 - 01:30:00 | A | B | C | D |
| 01:30:00 - 02:00:00 | B | B | C | D |
| : | : | : | : | : |

FIG. 51

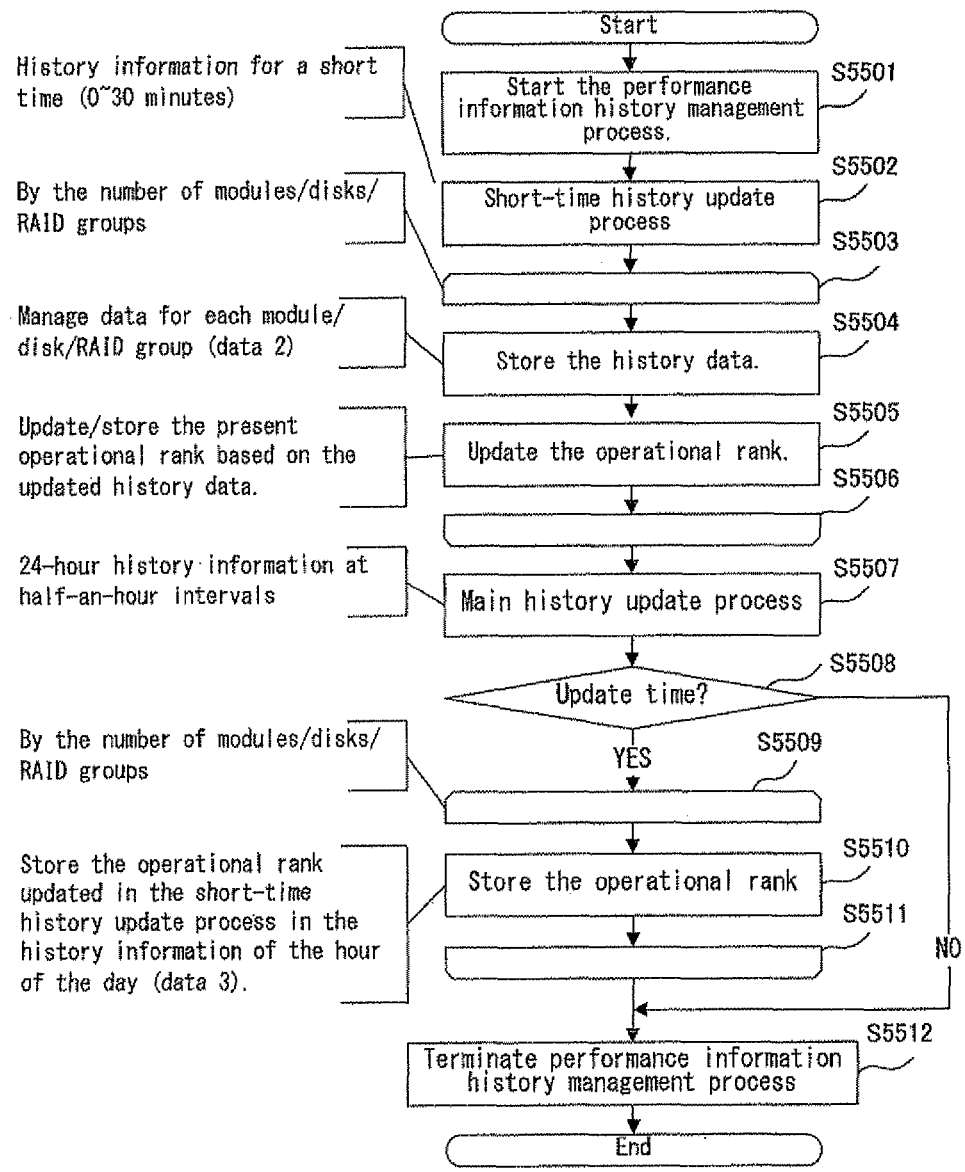
F I G. 55

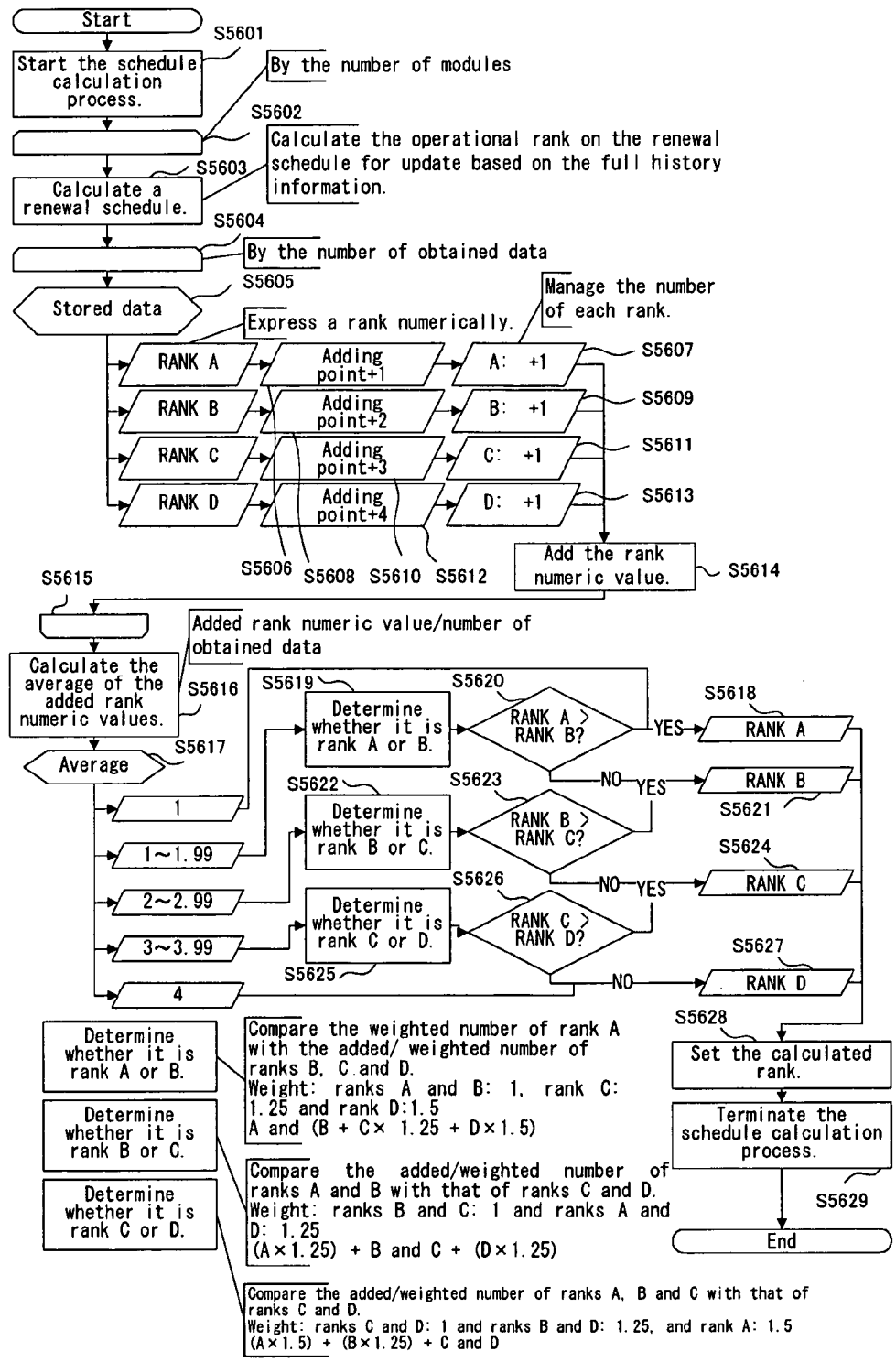
F I G. 5 6

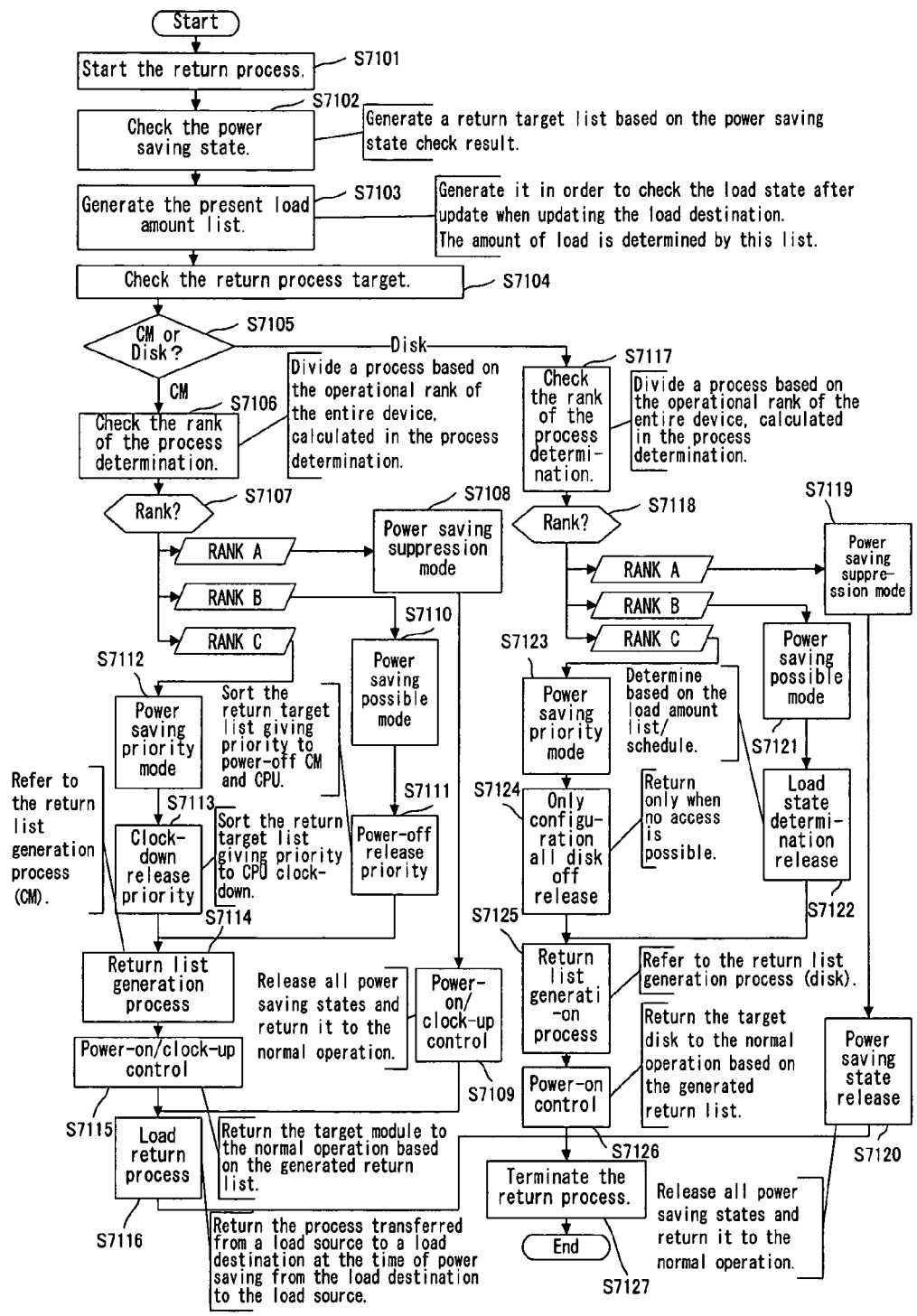
F I G. 7 1

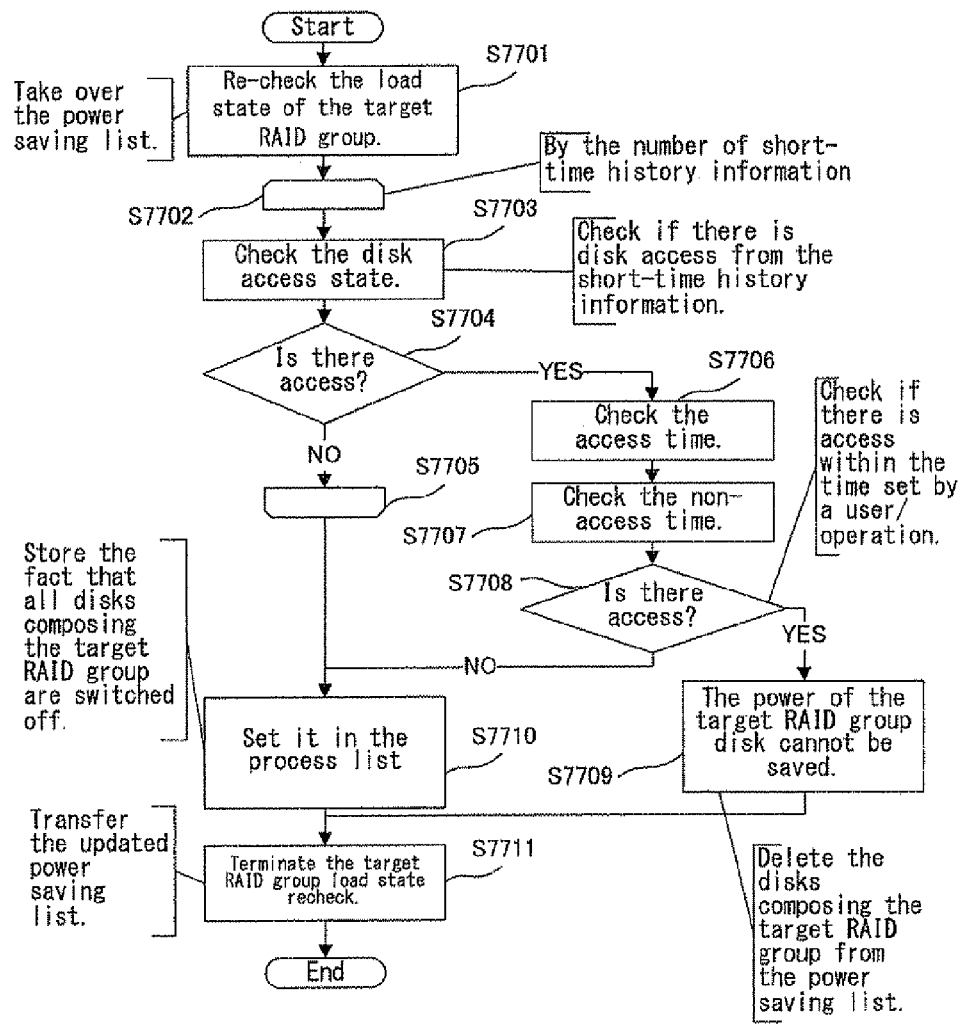
F I G. 77

POWER SAVING DEVICE CONTROLLED BY CONTROLLER OR DISK

CROSS REFERENCE TO RELATED APPLICATIONS

This application is based upon and claims the benefit of priority from the prior Japanese Patent Application No. 2007-94956 filed on Mar. 30, 2007, the entire contents of which are incorporated herein by reference.

BACKGROUND OF THE INVENTION

1. Field of the Invention

The present invention relates to a disk array device, and more particularly to a disk array device for saving power controlled by a controller or a disk.

2. Description of the Related Art

A disk array device is divided into a control enclosure (CE) unit on which communication modules for communicating with device control/higher-order devices are mainly mounted and a disk enclosure (DE) unit on which disks are mounted. When requiring process speed/performance, the number of controllers or the number of CPUs of one controller must be increased or the number of clock frequencies of a CPU must be increased. By this, power consumption also increases. Power consumption also is increased depending on the configuration scale of a disk array. When increasing the amount of data storage, the number of disks must be increased. If the number of disks increases, power consumption increases by the number of disks.

Patent Document 1 discloses a technology for reducing power consumption in a magnetic disk device.

Japanese Patent Application No. H10-333796

SUMMARY OF THE INVENTION

It is an object of the present invention to reduce the power consumption of controllers or disks in a disk array device.

The present invention adopts the following configuration in order to solve the above-described problem.

Specifically, according to one aspect of the present invention, the disk array device of the present invention comprises a means for operating a plurality of controller modules or disks in the disk array device, a means for determining a future operating state on the basis of the operation history of the controller module or disk and a setting means for setting the operating state of the controller module or disk in such a way as to reduce its power consumption, on the basis of the future operating state of the controller module or disk.

It is preferable for the future operating state determination means to comprise a means for ranking in order to indicate the determination criteria on the degree of power saving of a controller module or disk based on its operation history and a means for modifying the rank based on the operation history or a user's setting.

It is preferable for the setting means to comprise a means for distributing the load of a specific controller module to another controller module while securing the redundancy of a controller module or disk.

It is preferable for the setting means to comprise a means for transferring the data of a disk in use to a hot spare disk while securing the redundancy of the disk and stopping the operation of the disk in use.

According to another aspect of the present invention, the disk array device of the present invention comprises a means for operating a plurality of controller modules or disks, a performance information collecting means for collecting the performance information value of the controller module or disk, a history management means for storing the performance information value, a schedule modification means for calculating the future operating state of the controller module or disk based on the performance information value, a schedule adjustment means for calculating a new future operating state based on the operating state set by a user and the future operating state and a means for controlling the power of the controller module or disk based on the present operating state and the new future operating state.

The disk array device of the present invention can reduce power consumption based on the operation history of a controller module or disk and a user's designation to optimally save power.

DESCRIPTION OF THE DRAWINGS

FIG. 3 shows an example of a performance information value.

FIG. 4A shows an example of the history of the operating state for a short time.

FIG. 4B shows an example of today's operational rank.

FIG. 5 shows an example of history and a calculated schedule.

FIG. 6A shows an example of a schedule set by a user.

FIG. 6B shows an example of its optimized schedule.

FIG. 7 shows an example of the operational rank schedule of each CPU.

FIG. 8 shows an example of the short-time operating state history of each CPU.

FIG. 9 shows the concept of power saving.

FIG. 10 shows an example of the short-time operating state history of each CPU.

FIG. 11A shows the concept of power saving (No. 1).

FIG. 12A shows an example of the schedule set by the user.

FIG. 12B shows an example of optimized schedule.

FIG. 13A shows an example of the operational rank schedule of each CPU.

FIG. 13B shows an example of its short-time operating state history.

FIG. 15 shows an example of the short-time operating state history of each CPU.

FIG. 20 is the detailed flowchart of a history management process.

FIG. 40 is the block diagram of the disk array device in the second preferred embodiment of the present invention.

FIG. 41A shows an example of the performance information value of a disk.

FIG. 41B shows an example of the performance information value of an RLU.

FIG. 42A shows an example of short-time operating state history.

FIG. 42B shows an example of today's operational rank.

FIG. 43 shows an example of history and a calculated schedule.

FIG. 44A shows an example of a schedule set by a user.

FIG. 44B shows an example of its optimized schedule.

FIG. 45 shows an example of the operational rank schedule of each RLU.

FIG. 49 shows the concept of power saving.

FIG. 51 shows an example of the operational rank schedule of each RLU.

FIG. 55 is the detailed flowchart of a history management process.

FIG. 56 is the flowchart of a schedule calculation process.

FIG. 71 is the detailed flowchart of a return process.

FIG. 77 is the detailed flowchart of a target RAID group load state re-check process.

DESCRIPTION OF THE PREFERRED EMBODIMENTS

Figure 1:
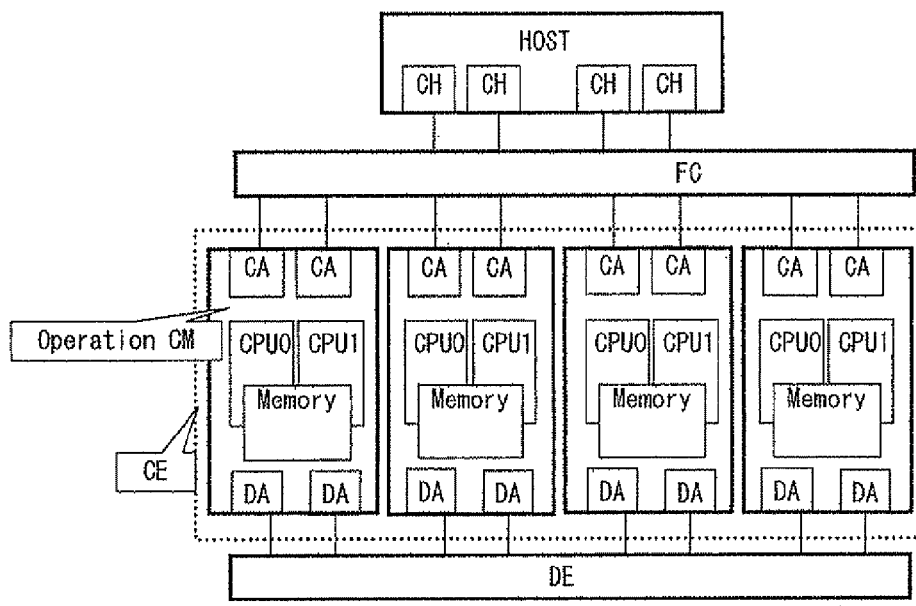
FIG. 1 shows the basic configuration of the disk array device in the preferred embodiment of the present invention.

FIG. 1 shows the basic configuration of the disk array device in the preferred embodiment of the present invention. A host HOST is connected to a channel adaptor CA in a controller module CM via a channel CH and a fiber channel (FC) switch. For example, CPU0, CPU1 and memory M are provided in the controller module CM. The controller module CM is connected to a disk array enclosure DE in the outside via a disk adaptor DA provided in its inside. A plurality of CM is mounted in the controller enclosure CE. In FIG. 1 four controller modules CM are used for its operation. If there are two or more CM, its redundancy is secured. The controller enclosure CE can be also connected to a higher-order device side via the FC switch. The mounted disk array has a RAID composition taking redundancy into consideration.

The controller module CM comprises an I/O control unit for controlling I/O from a higher-order device, a system control unit for controlling devices and a device monitor unit for monitoring a device state. In addition to these, the first preferred embodiment of the present invention further comprises power consumption control units (hereinafter called "eco-mode control unit") for reducing the power consumption of CM, CPU and CA of the components of the disk array device. Each of these eco-mode control units is composed of four control modules.

Figure 2:
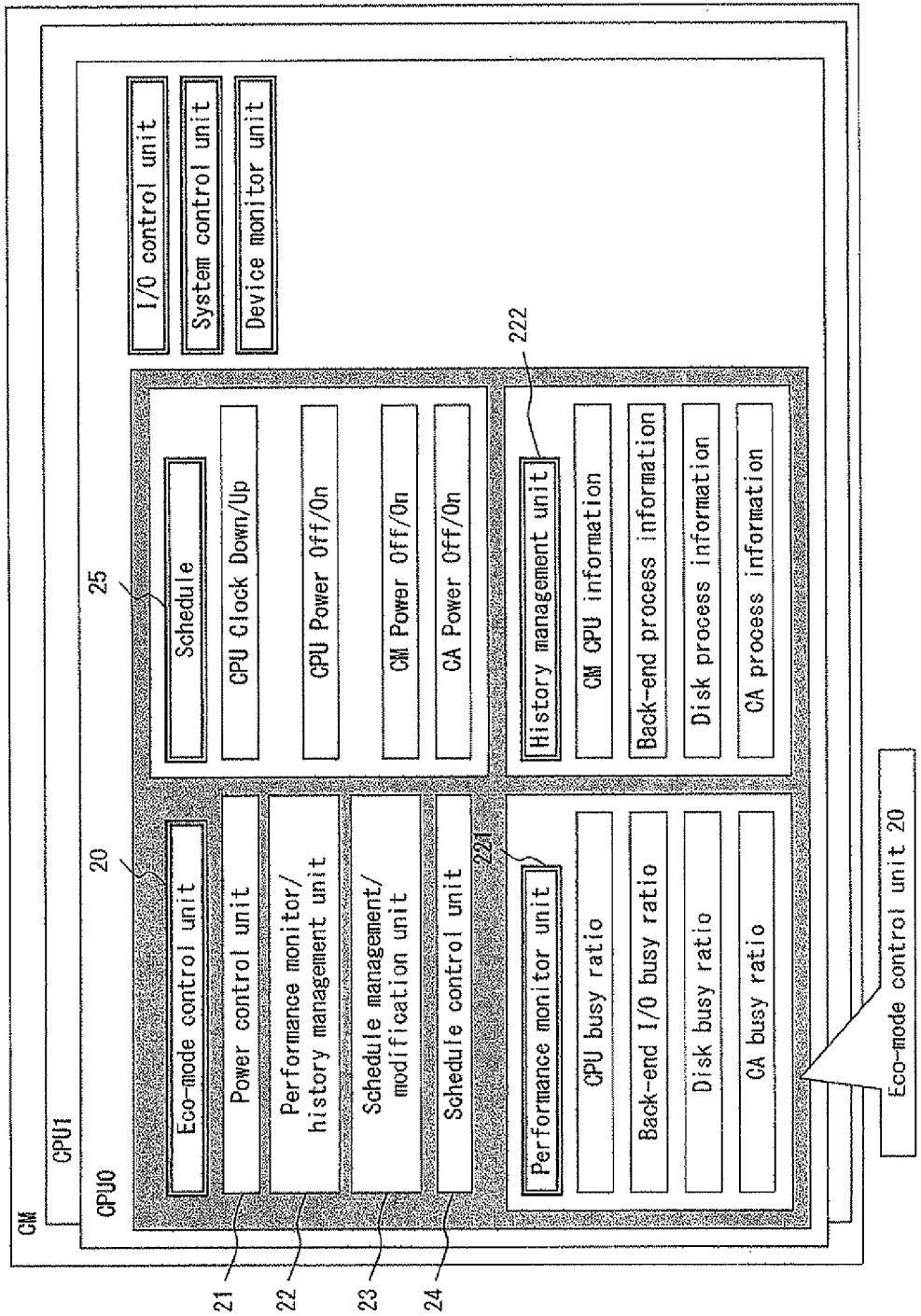
FIG. 2 shows the configuration of the eco-mode control unit in the first preferred embodiment of the present invention.

FIG. 2 shows the configuration of this eco-mode control unit 20. This eco-mode control unit 20 comprises a power control unit 21 installed on memory referenced by a specific CPU0 called "specific CM master", a performance monitor/history management unit 22 and a schedule management/modification unit 23 and a schedule control unit 24.

The power control unit 21 determines an actual process for reducing power consumption and performs the process. Namely, it controls the CPU clock down/up, power off/on, CM power off/on and CA power off/on of each CPU, CM and CA, presented in schedule 25. The performance monitor/history management unit 22 exercises control based on the operation history of a module at specific time intervals, such as stoppage/off-control in the case where a non-operating module is detected, start/on-control due to rapid load increase. The performance monitor/history management unit 22 monitors the operation state of a disk array and manages operation states as history. In this case, it monitors the load states of CPU/CM/CA for each module in units of days and hours and generates its history.

The performance monitor/history management unit 22 comprises a performance monitor unit 221 and a history management unit 222. The performance monitor unit 221 monitors a CPU busy ratio, a back-end (that is, disk side) I/O busy ratio, a disk busy ratio and a CA busy ratio. The history management unit 222 manages the history of CM/CPU information, back-end process information, disk process information and CA process information.

The schedule management/modification unit 23 manages and modifies the schedule of CPU clock down/up, power off/on, CM power off/on and CA power off/on in order to reduce power consumption. For example, it generates an optimized schedule from schedule management specified by a user and history generated by the performance monitor/history management unit 22.

The schedule control unit 24 controls the process schedule of power consumption reduction. It controls the power control unit 21 in such a way as to reflect the optimized schedule based on the schedule specifies by the user and to continuously update the schedule at specific time intervals. In this case, a schedule means the time change of the load states of the components CM, CPU and CA and its rank or busy ratio, which is described later.

There is a performance information collection control unit, which is not shown in FIG. 2, operating in cooperation with the above described control units. This control unit obtains the performance value of the components CPU, CM, CA and DA under performance supervision. There is also information obtained depending on each component and its logical volume. The above-described performance value, its schedule and its performance history are stored in the memory of CM to which each control unit refers.

The normal operation of the disk array device is described. A disk array has a configuration in which redundancy is taken into consideration. Therefore, the controller module CM for controlling the device is at least duplicated. One controller module CM mounts at least one CPU and currently sometimes it has a plurality of CPU. In its normal operation, since no care is paid to power consumption, it is operated using all CPU of all CM.

The power consumption reduction process (operation/schedule control) in the first preferred embodiment of the present invention is described. While a disk array is being normally operated, the performance monitor unit 221 obtains performance information values, such as a busy ratio and the like, which are the indexes of performance, of each CM, CPU, CA and DA (back-end) at specific time intervals and stores these obtained performance information values in the memory of the CM.

FIG. 3 shows the CPU performance of each controller module CM using a busy ratio. A busy ratio is indicated by a count number ratio obtained by counting up which is active, assuming that its count number is 1 when it is idle. Specifically, it is as follows.

$$\text{Busy ratio} = \text{count number in the case where it is active}/(\text{count number in the case where it is active} + \text{count number in the case where it is idle})$$

The higher the busy ratio is, the higher the performance information, that is, operation or load, of CPU of the controller module CM.

The history management unit 222 calculates the operating state of each module based on the performance information value stored in the memory and stores it in the memory of the controller module CM as history information.

FIG. 4A shows the history of the busy ratio for each half a minute after 0 hour 0 minute, of controller module CM#0 CPU#0. FIG. 4B shows the history of the operational rank for each half an hour of controller module CM#0 CPU#0. In this case, an operational rank indicates the determination criterion of the degree of power saving reflected by the busy ratio or amount of load of each component, based on its operation history. For example, the operational rank is calculated on the basis of a busy ratio. It is assumed that if busy ratios are 0~25%, 25~50%, 50~75% and 75~100%, the ranks are D, C, B and A, respectively.

The schedule management/modification unit 23 generates the schedules of the power off/on control of CM, CPU and CA in the device and the clock down/up of CPU from history information calculated on the basis of each operating state. When the schedule is already generated, the previous schedule and one generated this time are collated and optimized.

FIG. 5 shows the history of the operational rank change for each half an hour of CM#0CPU#0. Its fields, present and today, indicate the average of operational ranks up to yesterday and one for today, respectively. Then, an operational rank after today is calculated on the basis of the schedule of the operational rank in the field present and that in the field today and is indicated a field renewal as an operational rank updated according to a flow described later.

Furthermore, whether or not a schedule is set by a user checked. If it is set, it is collated with the schedule generated by the schedule management/modification unit 23 and is optimized again.

FIG. 6A shows a schedule set by a user. For example, since January 1 through 3 are New Year holidays, it is assumed that a disk array device is not operated. Then, its operational rank is set to D. For February 1 through 3, the operational rank is set to C.

FIG. 6B shows a schedule obtained by collating the schedule generated by the schedule management/modification unit 23 with the schedule set by the user which is shown in FIG. 6A and optimizing it according to the flow described later. Specifically, although the operational ranks of CM#0CPU#0 are AABBC as a result of the history of the operational rank by the schedule set by the schedule management/modification unit 23, the operation rank of February 1 of the schedule set by the user is C. Therefore, BBAB . . . are set as the history of the operational rank optimized taking this into consideration. In this case, the order of the operational rank is A>B>C>D.

The schedule control unit 24 requests the power control unit 21 to control the power off/on of CM, CPU and CA in the device and the clock down/up of CPU based on the schedule generated by the schedule management/modification unit 23. Upon receipt of the request from the schedule control unit 24, the power control unit 21 determines the power of which in the device should be controlled, CM, CPU or CA and whether the clock of CPU should be modified, also taking into consideration its present operating state and performs optimal power control by collating it with its configuration information presuming that redundancy is secured.

FIG. 7 shows the change schedule of February 1 of the operational rank for each half an hour, of each CPU in a disk array device with two CM. In the schedule shown in FIG. 7, although the ranks of CM1 and CM0 are low and high, respectively, taking redundancy into consideration the process on CM1 side is transferred to CM0 side, namely the process is modified and the power off process of CM#1 is not performed. The power control unit 21 checks whether the power off process of CM#1CPU#1 can be performed by transferring the process of CM#1CPU#1 whose rank is low in the schedule generated using information obtained from each control unit to CM#1CPU#0 and whether the power off process of CM#0CPU#1 can be performed by transferring the process of CM#0CPU#1 whose rank is high to CM#0CPU#0 and CM#1CPU#0.

Lastly, the processing state (busy ratio) of the performance monitor unit 221 being an actual processing state is monitored and determined every half a minute several minutes before as shown in FIG. 8. The busy ratio of CM#0CPU#1 gradually decreases, that of CM#0CPU#0 is high but not too high and that of CM#1CPU#0 is fairly low. In this preferred embodiment it is optimal which CPU should be switched off and how the process load of CPU that is switched off should be distributed to other CPU is determined according to the flow described later taking into consideration the schedule (history of rank change) shown in FIG. 7, of each CPU.

Even when the process of CM#1CPU#1 is transferred to CM#1CPU#0 based on the processing state of the above-described performance monitor unit 221, it can be determined that there is no problem since its busy ratio is about 50%. When the process of CM#0CPU#1 is distributed and transferred to CM#0CPU#0 and CM#1CPU#0, its volume configuration must be taken into consideration. In this case, if the busy ratio of each of CM#0CPU#0 and CM#1CPU#0 rises about 20%, it can be determined there is no problem since about 70~80% remains for the process.

The distribution process of volume information is performed on the basis of this process result and the power off process of CM#0CPU#1 and CM#1 CPU#1 is performed by modifying the operating CPU. Thus, power consumption for CPU control can be reduced. The power saving effect can be also improved by switching off CM#0CPU#1 whose rank is high.

FIG. 9 shows that their process load is transferred to other CPU and CM#0CPU#1 and CM#1CPU#1 is switched off.

When it is determined that it is difficult to distribute the process of the performance monitor unit 221 being an actual process to other CPU as shown in the schedule shown in FIG. 10 and to switch off the CPU, it is determined whether power consumption can be reduced by lowering the clock frequency of a target CPU. If it is possible, the clock frequencies of all or a part of CPU are lowered. If it is difficult to lower the CPU clock frequency, the monitor is continued in the present state without performing such a process. When the CPU clock frequency can be gradually lowered, it is gradually lowered.

It can be determined that since when the process CM#1CPU#1 is transferred to CM#1CPU#0, its busy ratio exceeds 100%, it cannot be transferred on the basis of processing state of the performance monitor unit 221 shown in FIG. 10. When the process of CM#1CPU#1 is transferred to CM#1CPU#0, since its busy ratio exceeds 100%, it can be determined that it cannot be transferred. In this case, if the clock frequencies of all CPU drop about 20%, the present busy ratios of all CPU rise about 20%. In this case, since about 70~80% remains for the process, it can be determined that there is no problem.

The clock frequency down process of CPU is performed on the basis of this process result. Thus, power consumption can be reduced.

Figure 11B:
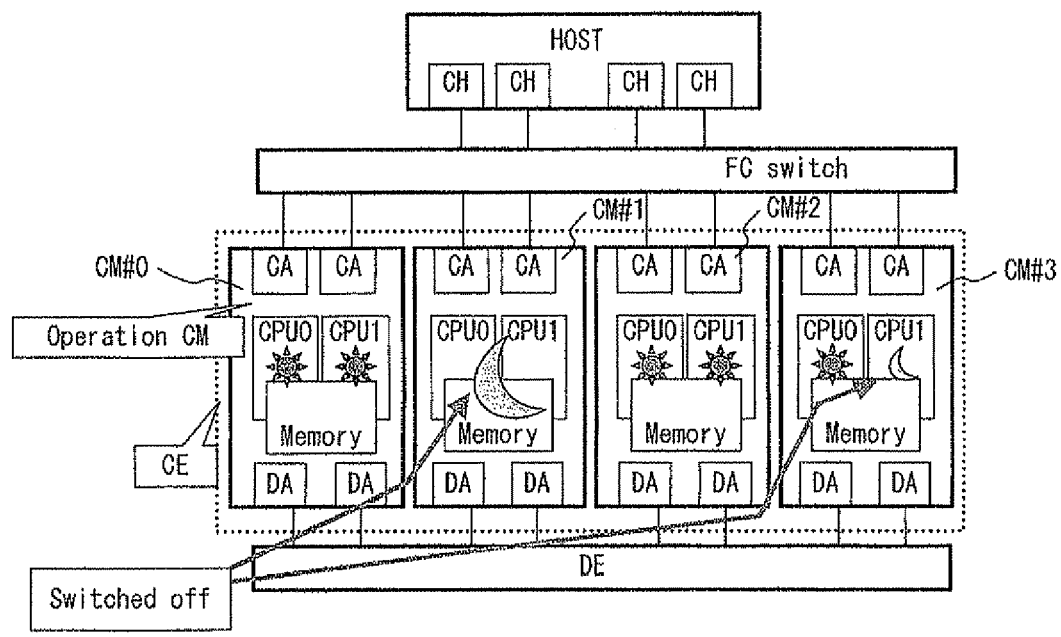
FIG. 11B shows the concept of power saving (No. 2).

In the case where three or more CM are used, as shown in FIGS. 11A and 11B, if power saving is performed by switching off one CM, redundancy can be maintained different from the two CM configuration. Therefore, the process on CM#1 side can be transferred to CM#2 side and CM#1 can be switched off. Thus, the range of choices can be extended. Even in the case of three or more CM configuration, that is determined by collating a schedule generated by each control unit with the processing state of the performance monitor unit 221 being an actual processing state. In case where one CM is switched off, CA information mounted the CM must be also taken over. Therefore, it must be determined also taking into consideration its destination.

Next, normal operation return process (at the time of schedule control) is described. The schedule set by the user, the schedule generated on the basis of the performance information values of CM, CPU, CA and DA (back-ground) that the performance monitor/control unit 22 has obtained while operating the disk array and the present operating state are all considered, a module that shares a process in the power consumption reduction process, that is, a switched-off module is switched on and the device is returned to the normal operation process.

The schedule control unit 24 requests the power control unit 21 to control the power off/on of CM, CPU and CA in the device and the clock down/up of CPU based on the schedule generated by the schedule management/modification unit 23.

Upon receipt of the request from the schedule control unit 24, the power control unit 21 determines the power of which in the device should be controlled, CM, CPU or CA and whether the clock of CPU should be modified, also taking into consideration the present operating state and performs optimal power control by collating it with its configuration information presuming that redundancy is secured.

FIG. 12A shows the user's schedule generated by the schedule management/modification unit 23. FIG. 12B shows the power control of January 3 of CM#0CPU#0 that is set on the basis of the user's schedule shown in FIG. 12A. According to this, the operational rank from 20:00 through 21:00 is D and the device is in power saving mode.

However, in the schedule shown in FIG. 13A, it can be determined that the process loads (ranks) of both CM#0 and CM#1 will increase between 21:00:00 and 21:30:00 and after 21:30:00 the device is operated with fairly high process load. The processing state (busy ratio) of the performance monitor unit 221, being an actual processing state is monitored every half a minute several minutes before as shown in FIG. 13B and it is determined whether power control should be further moved up and performed.

When the processing state (busy ratio) of the performance monitor unit 221, being an actual processing state is checked several minutes before, CPU#1 of CM#0 and CM#1 is switched off and CPU#0 of CM#0 and CM#1 is operated. It is also found that the load of the operating CPU also gradually increases. Since the schedule also knows that the load of the device will increase, the power control unit 21 switches on CPU#1 of CM#0 and CM#1 and operates a process for returning it to the normal operating state.

Next, the normal operation return process (at the time of load up) is described. While normally operating the disk array, the performance monitor unit 221 obtains performance information values, such as busy ratios being indexes of performance, of CM, CPU and CA in specific time intervals. These obtained performance information values are stored in the memory of CM. When this performance information value exceeds a specific value, the power of which in the device should be controlled, CM, CPU or CA and whether the clock of CPU should be modified, also taking into consideration its present operating state is determined, regardless of the fact that there is a request from the schedule control unit 24. If there is a module sharing a process in the power consumption reduction process, its process-sharing source is switched on to return to the normal operation process.

Figure 14:
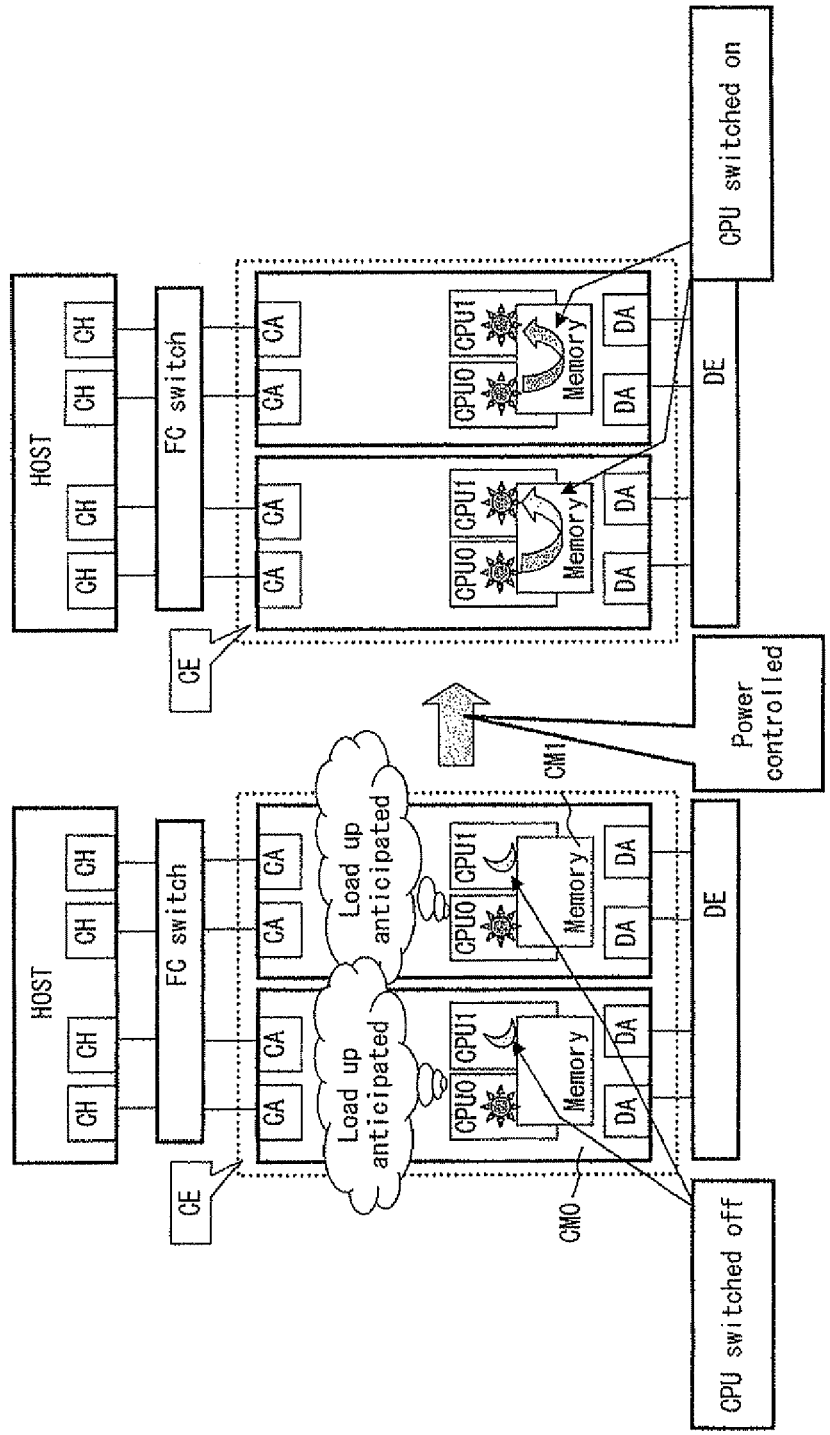
FIG. 14 shows the concept of normal operation return.

FIG. 14 shows the state where CM0CPU1 and CM1CPU1 that are switched off when load up is anticipated in CM0CPU0 and CM1CPU0 are switched on.

Figure 16:
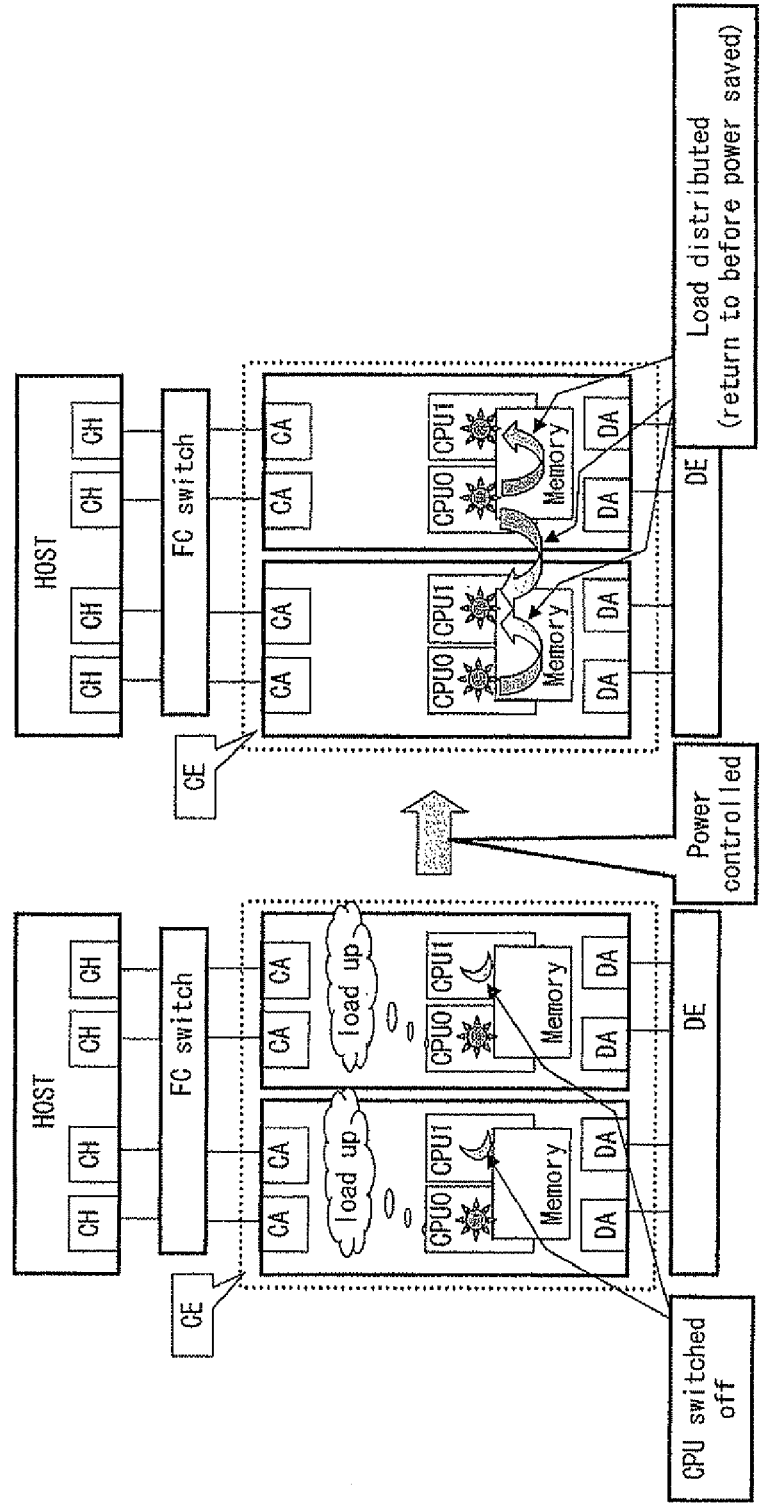
FIG. 16 shows the concept of normal operation return.

FIG. 15 shows the case where the busy ratios of CM0CPU0 and CM1CPU0 rapidly rise to almost 100% for 29 minutes 30 seconds. At this time, it is detected that CM0CPU1 and CM1CPU1 are switched off regardless of the fact that there is a request from the schedule control unit 24 and CM0CPU1 and CM1CPU1 are switched on as shown in FIG. 16. Then, the load state before the power consumption reduction is returned while load is being distributed from CM0CPU0 and CM1CPU0 to CM0CPU1 and CM1CPU1.

Although the power saving of the controller module CM and its CPU has been described above, this preferred embodiment is also applicable to the power saving of other components, such as CA, DA and the like in CM. In that case, the performance monitor unit 221 uses a CA busy ratio and a back-end I/O busy ratio and the history management unit 222 uses CA process information and back-end information.

Next, the detailed process of power consumption control is described.

Figure 17:
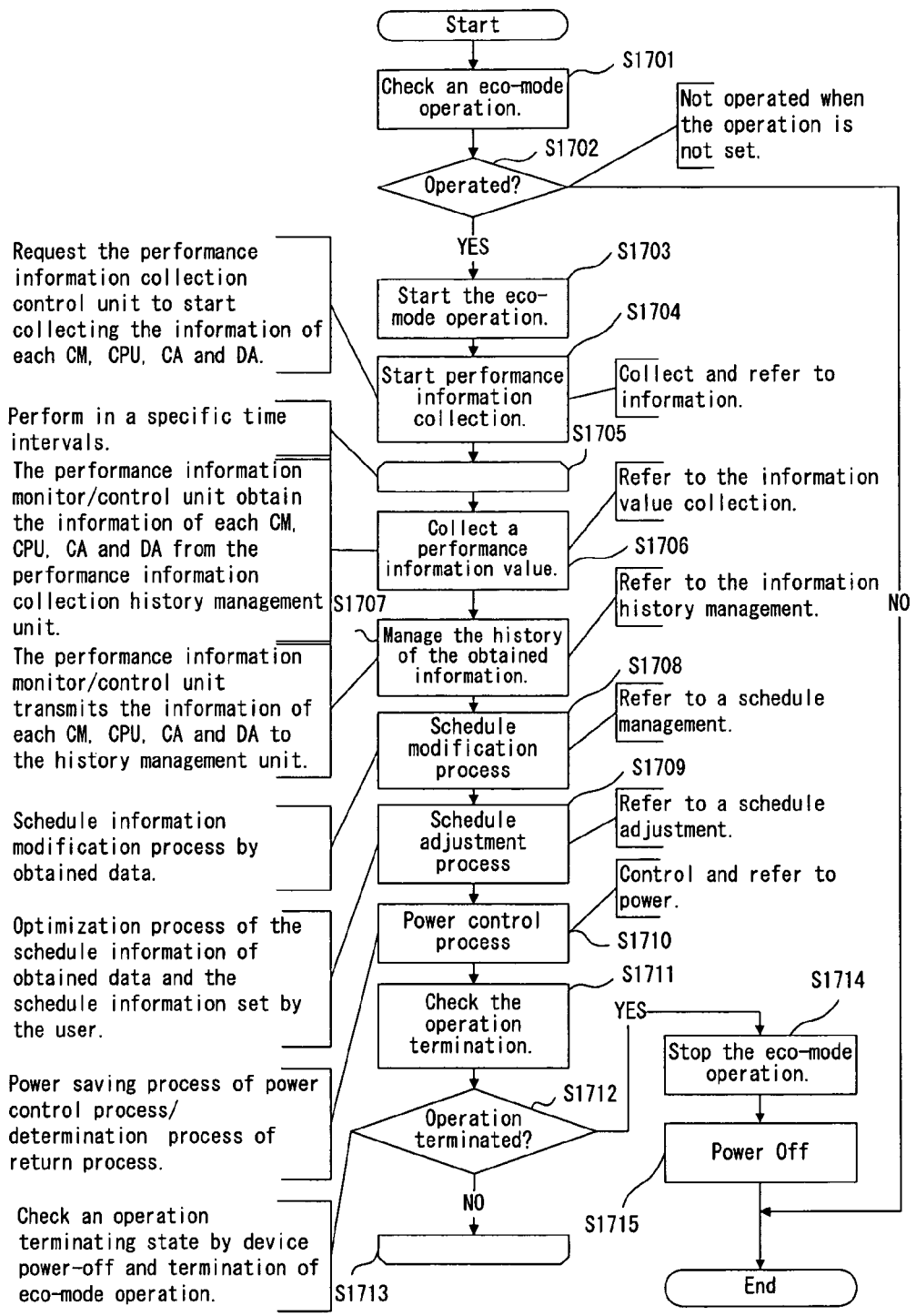
FIG. 17 is the flowchart of the power consumption control process of the disk array in the first preferred embodiment of the present invention.

FIG. 17 is the flowchart of the power consumption control process of the disk array in the first preferred embodiment of the present invention.

In step S1701 it is checked whether the disk array can be operated in an eco-mode. The eco-mode is a mode for controlling power consumption.

In step S1702, if the disk array can be operated in the eco-mode, the flow proceeds to step S1703. If it cannot be operated in the eco-mode for the reason that the eco-mode is not set or the like, the process is terminated.

In step S1703 the operation in the eco-mode is started.

In step S1704 the performance information collection unit is requested to start the performance information collection of CM, CPU, CA and DA. The detailed process of performance information collection start is described later.

Step S1705 is the beginning of a loop and is started in specific time intervals.

In step S1706 the performance monitor/history management unit 22 obtains information about each CM, CPU, CA and DA from the performance information collection unit 205. The detailed process of obtaining performance information values is described later.

In step S1707 the performance monitor/history management unit 22 manages the obtained information as history. The detailed process of history management is described later.

In step S1708 the schedule management/modification unit 23 modifies and manages a schedule based on the obtained data. The detailed schedule modification process is described later.

In step S1709 the schedule based on the obtained data generated in step S1708 and the schedule based on the schedule set by a user are optimized. The detailed schedule adjustment process is described later.

In step S1710 the power control unit 21 determines which of the power control process should be performed, a power saving processor a return process. The detailed power control process is described later.

In step S1711 it is checked whether the operation in the eco-mode should be terminated.

In step S1712, if the operation in the eco-mode is not terminated, the flow proceeds to step S1713. If the operation in the eco-mode is terminated, the flow proceeds to step S1714.

Step S1713 is the end of the loop corresponding to step S1705.

In step S1714 the operation in the eco-mode is terminated.

In step S1715, if the device is switched off, the disk array is switched off.

Figure 18:
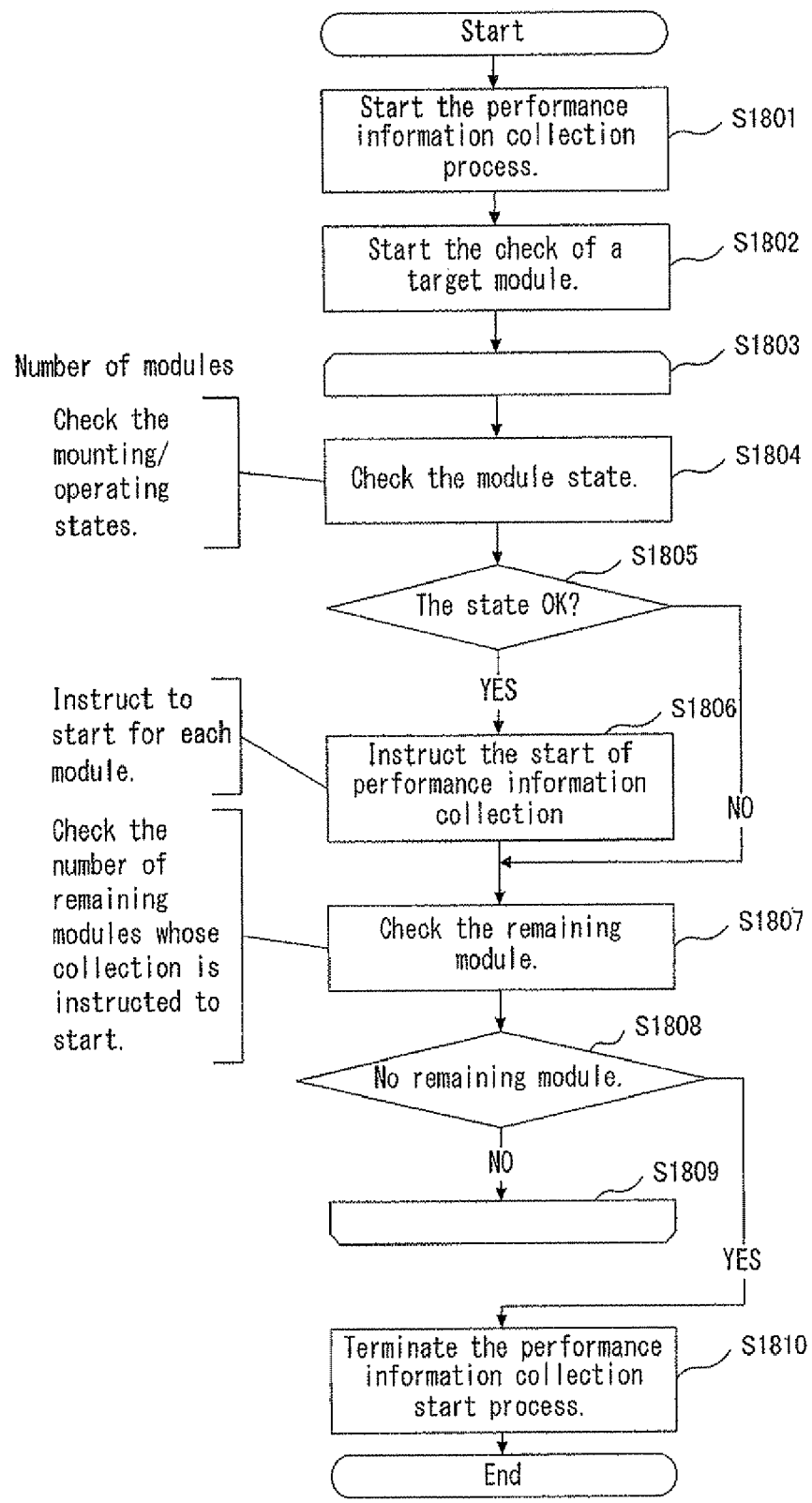
FIG. 18 is the detailed flowchart of a performance information collection starting process.

FIG. 18 is the detailed flowchart of a performance information collection starting process.

In step S1801 the performance information collection process is started.

In step S1802 a target module (for example, CM, CPU, CA, DA or the like) is checked.

Step S1803 is the beginning of a loop and is repeated by the number of modules.

In step S1804 the mounting and operating states of the target module is checked.

In step S1805, if the module state is normal, the flow proceeds to step S1806. If it is not normal, for example, the module is not operated, the flow proceeds to step S1807.

In step S1806 the performance information collection unit is instructed to start the performance information collection of modules.

In step S1807 it is checked if there remains a module whose performance information collection is not started yet.

In step S1808 if there is no remaining target, the flow proceeds to step S1809. If there is a remaining target, the flow proceeds to step S1810.

Step S1809 is the end of the loop corresponding to step S1803.

In step S1810 the performance information collection starting process is terminated.

Figure 19:
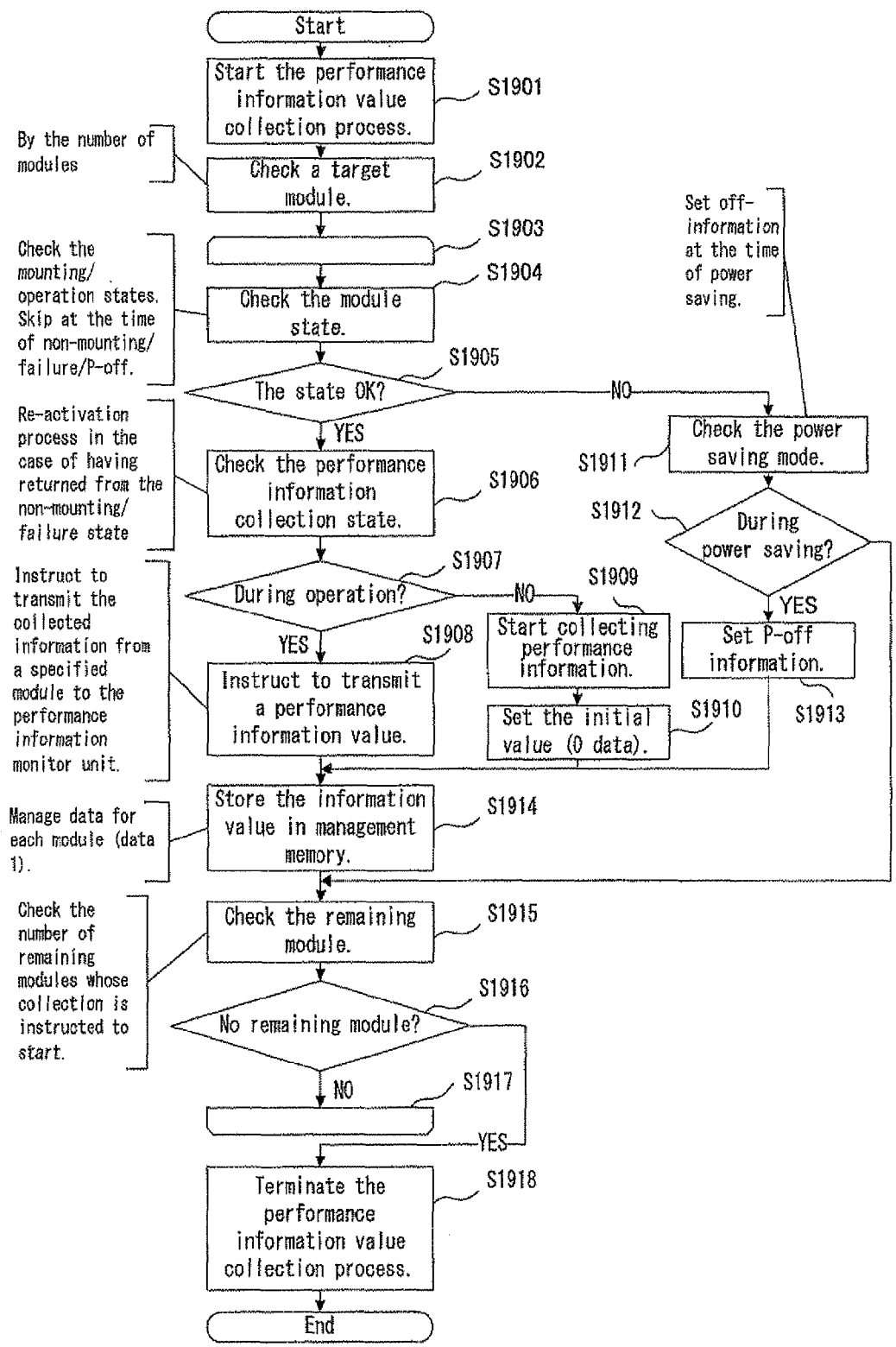
FIG. 19 is the detailed flowchart of a performance information value collection process.

FIG. 19 is the detailed flowchart of a performance information value collection process (step S1706).

In step S1901 the performance information value collection process is started.

In step S1902 the check of a target module is started.

Step S1903 is the beginning of a loop and is repeated by the number of modules.

In step S1904 the mounting and operating states of the target module is checked.

In step S1905, if the module state is OK, the flow proceeds to step S1906. If the module state is NG, for example, a module is not mounted yet, fails or is switched off, the flow proceeds to step S1911.

In step S1906 it is checked if the performance information of a module is collected.

In step S1907, if the performance information is collected, the flow proceeds to step S1908. If it is not collected, the flow proceeds to step S1909.

In step S1908 it is instructed to transmit the collected performance values to the performance monitor/history management unit 22.

In step S1909 the performance information collection unit is instructed to start the performance information collection of a module.

In step S1910 an initial value is set.

In step S1911 it is checked if the module is in the power saving mode. The power saving mode means a state where a target is not used to save power consumption instead of being not used due to a failure or being not mounted.

In step S1912 if it is in the power saving mode, the flow proceeds to step S1913. If it is not in the power saving mode, the flow proceeds to step S1915.

In step S1913 information that the module is in the power saving mode (power-off information) is set.

In step S1914 the performance information values of the module are stored in memory.

In step S1915 it is checked if there remains a module that is instructed to start performance information collection but that its performance information values are not collected yet.

In step S1916, if there remains a module that is instructed to start performance information collection but that its performance information values are not collected yet, the flow proceeds to step S1917. If there remains no such module, the flow proceeds to step S1918.

Step S1917 is the end of the loop corresponding to step S1903.

In step S1918 the performance information value collection process is terminated.

FIG. 20 is the detailed flowchart of the history management process (step S1707).

In step S2001 the history management process of performance information is started.

In step S2002 the history for a short time (for example, 0~30 minutes) is updated on the basis of the obtained performance information.

Step S2003 is the beginning of a loop and is repeated by the number of modules.

In step S2004 the updated history data is stored in memory for each module.

In step S2005 the present operational rank is updated on the basis of the updated history data and is stored. The present operational rank is calculated using a schedule calculation process described later.

Step S2006 is the end of the loop corresponding to step S2003.

In step S2007 the history of the main is updated. History information for 24 hours, for example, at intervals of half an hour is stored in the main.

In step S2008 it is checked if it is update time. If it is update time, the flow proceeds to step S2009. If it is not update time yet, the flow proceeds to step S2012.

Step S2009 is the beginning of another loop and is repeated by the number of modules.

In step S2010 the operational rank updated in the short time history update process is stored in the history information of the hour of the day.

Step S2011 is the end of the loop corresponding to step S2009.

In step S2012 the history management process of performance information is terminated.

Figure 21:
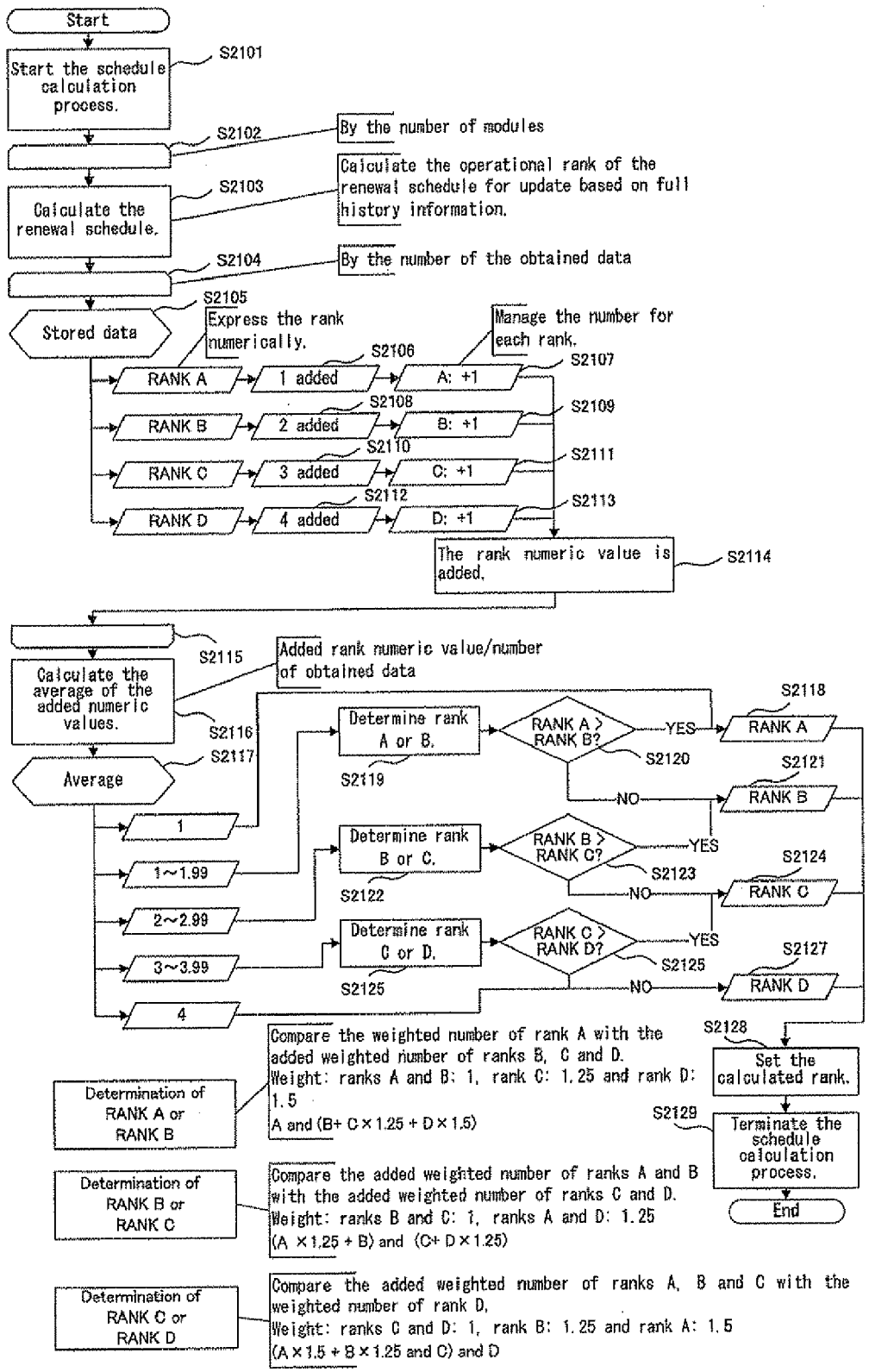
FIG. 21 is the flowchart of a schedule calculation process.

FIG. 21 is the flowchart of the schedule calculation process (step S2205, S2208 and S2312). This process is used to calculate the present operational rank, the average of operational ranks on the basis of a plurality of operational ranks.

In step S2101 the schedule calculation process is started.

Step S2102 is the beginning of a loop and is repeated by the number of modules.

In step S2103 an average operational rank calculation process is started.

Step S2104 is the beginning of another loop and is repeated by the number of obtained data.

In step S2105, if the operational rank of the obtained data is A, the flow proceeds to step S2106. If the operational rank of the obtained data is B, the flow proceeds to step S2108. If the operational rank of the obtained data is C, the flow proceeds to step S2110. If the operational rank of the obtained data is D, the flow proceeds to step S2112.

In step S2106 a rank is numerically expressed. In the case of rank A, its adding point is 1.

In step S2107, 1 is added to the number of ranks A in the evaluation value for managing the number of each rank.

In step S2108 a rank is numerically expressed. In the case of rank B, its adding point is 2.

In step S2109, 1 is added to the number of ranks B in the evaluation value for managing the number of each rank.

In step S2110 a rank is numerically expressed. In the case of rank C, its adding point is 3.

In step S2111, 1 is added to the number of ranks C in the evaluation value for managing the number of each rank.

In step S2112 a rank is numerically expressed. In the case of rank D, its adding point is 4.

In step S2113, 1 is added to the number of ranks D in the evaluation value for managing the number of each rank.

In step S2114 all the numerically expressed values are added to their rank numeric values.

Step S2115 is the end of the loop corresponding to step S2102.

In step S2116 an average is calculated by dividing the total of all the added numeric values by the number of obtained data.

In step S2117, if the average is 1, the flow proceeds to step S2118. If it is 1~1.99, the flow proceeds to step S2119. If it is 2~2.99, the flow proceeds to step S2122. If it is 3~3.99, the flow proceeds to step S2125.

In step S2118 it is ranked A.

In step S2119 it is determined which it is ranked, A or B. It is determined by comparing the weighted number of ranks A and those of ranks B, C and D. It is assumed that the weight of each of ranks A and B, that of rank C, that of rank D are 1, 1.25 and 1.5, respectively. Then, the number of rank A and "the number of ranks B+the number of ranks C×1.25+the number of ranks D×1.5" are compared. If the number of ranks A is larger, it is determined that rank A is larger. If "the number of ranks B+the number of ranks C×1.25+the number of ranks D×1.5" is larger, it is determined that rank B is larger.

In step S2120, if rank A is larger, the flow proceeds to step S2118. If rank B is larger, the flow proceeds to step S2121.

In step S2121 it is ranked B.

In step S2122 it is determined which it is ranked, B or C. It is determined by comparing the weighted number of ranks A and B and those of ranks C and D. It is assumed that the weight of each of ranks B and C and that of each of ranks A and D are 1 and 1.25, respectively. Then, "the number of ranks A×1.25+the number of ranks B" and "the number of ranks C+the number of ranks D×1.25" are compared. If "the number of ranks A×the number of ranks B" is larger, it is determined that rank B is larger. If "the number of ranks C+the number of ranks D×1.25" is larger, it is determined that rank C is larger.

In step S2123, if rank B is larger, the flow proceeds to step S2121. If rank C is larger, the flow proceeds to step S2124.

In step S2124 it is ranked C.

In step S2125 it is determined which it is ranked, C or D. It is determined by comparing the weighted number of ranks A, B and C and those of rank D. It is assumed that the weight of each of ranks C and D and that of rank B and that of rank A are 1, 1.25 and 1.5, respectively. Then, "the number of ranks A×1.5+the number of ranks B×1.25+the number of ranks C"

and the number of ranks D are compared. If "the number of ranks A×1.5+the number of ranks B×1.25+the number of ranks C" is larger, it is determined that rank C is larger. If the number of ranks D is larger, it is determined that rank D is larger.

In step S2126, if rank C is larger, the flow proceeds to step S2124. If rank D is larger, the flow proceeds to step S2127.

In step S2127 it is ranked D.

In step S2128 the calculated rank is set.

In step S2129 the schedule calculation process is terminated.

Figure 22:
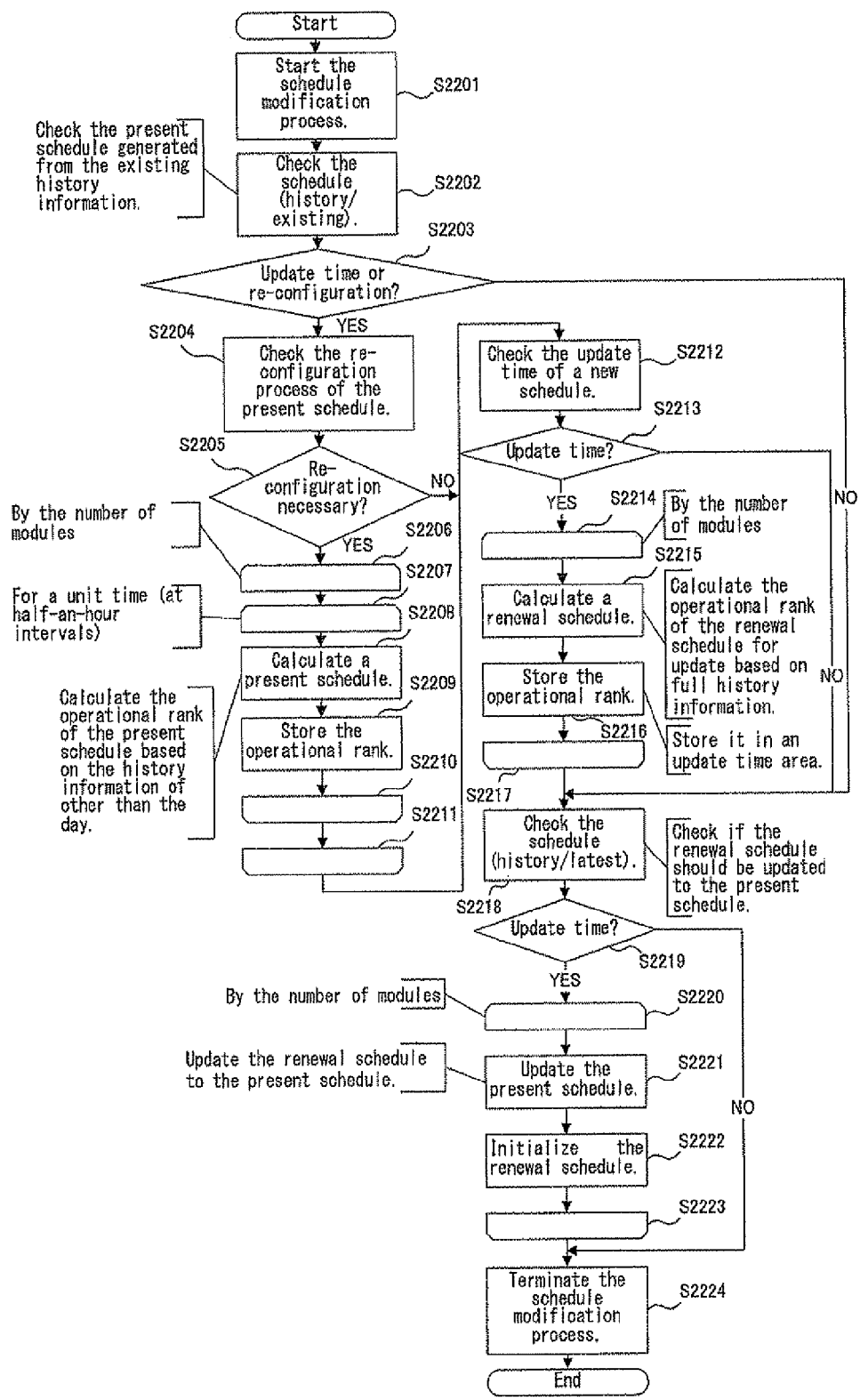
FIG. 22 is the detailed flowchart of a schedule modification process.

FIG. 22 is the detailed flowchart of the schedule modification process (step S1708).

In step S2201 the schedule modification process is started.

In step S2202 the present schedule generated from existing history information is checked.

In step S2203 if it is update time or re-configuration, the flow proceeds to step S2204. If it is neither update time nor re-configuration, the flow proceeds to step S2218.

In step S2204 it is checked if the present schedule must be re-constructed.

If in step S2205 it must be reconstructed, the flow proceeds to step S2206. If it is not needed, the flow proceeds to step S2212.

Step S2206 is the beginning of a loop and is repeated by the number of modules.

Step 2207 is the beginning of another loop and is repeated for a unit time (for example, half an hour).

In step S2208 the present schedule is calculated.

In step S2209 the calculated operational rank is stored.

Step S2210 is the end of the loop corresponding to step S2207.

Step S2211 is the end of the loop corresponding to step S2206.

In step S2212 the update time of the new schedule is checked.

In step S2213, if it is the update time, the flow proceeds to step S2214. If it is not the update time, the flow proceeds to step S2218.

Step S2214 is the beginning of another loop and is repeated by the number of modules.

In step S2215, an operational rank as a renewal schedule for update is calculated on the basis of all history information. The operational rank as a renewal schedule is calculated using the above-described schedule calculation process.

In step S2216 the calculated operational rank is stored in an update time area.

Step S2217 is the end of the loop corresponding to step S2214.

In step S2218 it is checked if the renewal schedule is updated to the present schedule.

In step S2219, if it is the update time, the flow proceeds to step S2220. If it is not the update time, the flow proceeds to step S2224.

Step S2220 is the beginning of another loop and is repeated by the number of modules.

In step S2221 the renewal schedule is updated to the present schedule.

In step S2222 the renewal schedule is initialized.

Step S2223 is the end of the loop, corresponding to step S2220.

In step S2224 the schedule modification process is terminated.

Figure 23:
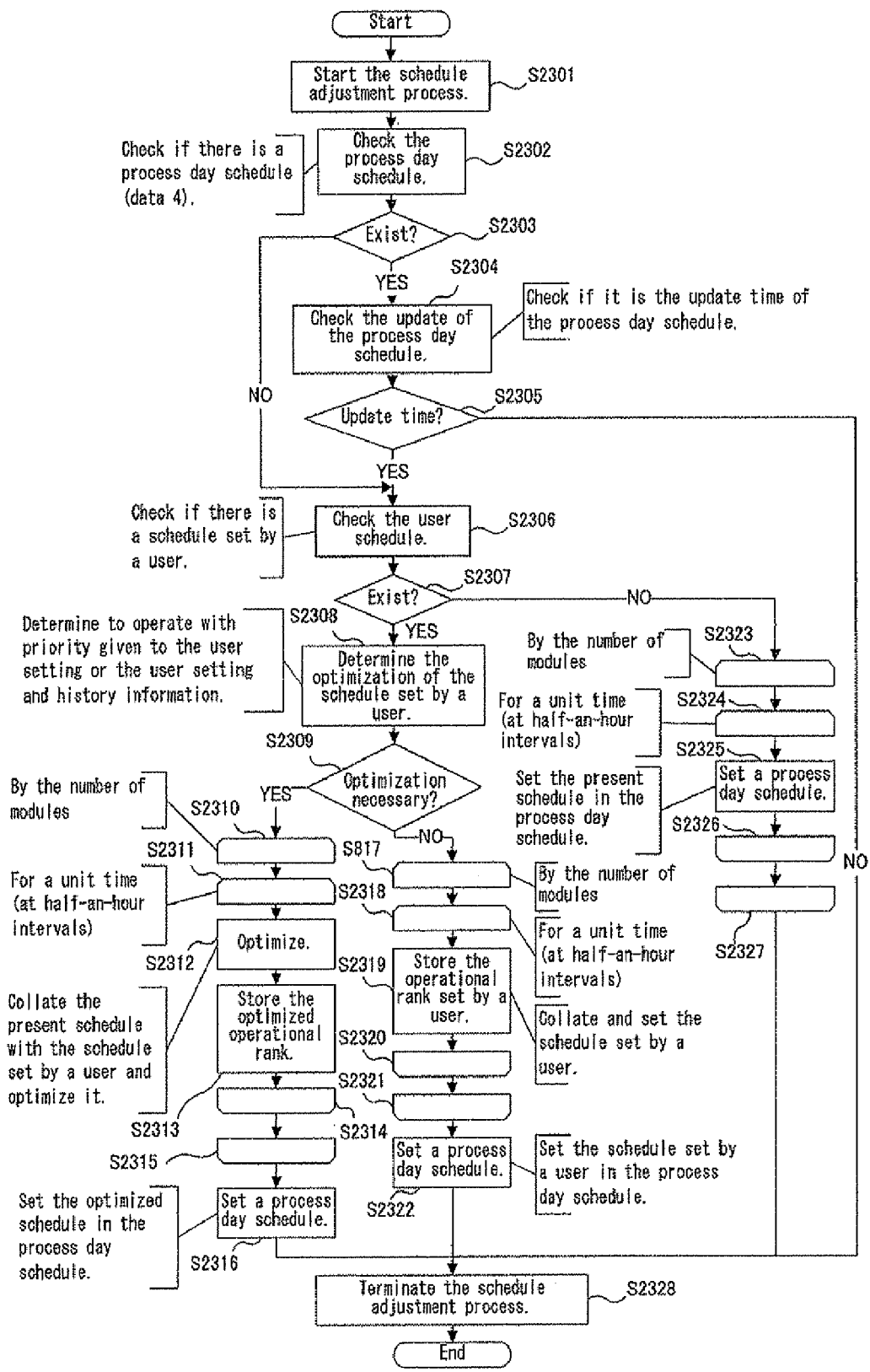
FIG. 23 is the detailed flowchart of a schedule adjustment process.

FIG. 23 is the detailed flowchart of the schedule adjustment process (step S1709).

In step S2301 the schedule adjustment process is started.

In step S2302 it is checked if there is a process day schedule.

In step S2303, if there is a process day schedule, the flow proceeds to step S2304. If there is no process day schedule, the flow proceeds to step S2306.

In step S2304 it is checked if it is the update time of the process day schedule.

In step S2305, if it is the update time of the process day schedule, the flow proceeds to step S2306. If it is not the update time of the process day schedule, the flow proceeds to step S2328.

In step S2306 it is checked if there is a user schedule.

In step S2307, if there is a user schedule, the flow proceeds to step S2308. If there is no user schedule, the flow proceeds to step S2323.

In step S2308 it is determined to which priority is given in the operation of power consumption control, user setting or combination of user setting and history information.

In step S2309 if it is determined that optimization is necessary, the flow proceeds to step S2310. If it is not determined that optimization is necessary, the flow proceeds to step S2317.

Step S2310 is the beginning of a loop and is repeated by the number of modules.

Step S2311 is the beginning of another loop and is repeated for a unit time.

In step S2312 the present schedule and the schedule set by the user are collated and an optimized operational rank is calculated. The optimized operational rank is calculated using the above-described schedule calculation process.

In step S2313 the optimized operational rank is stored.

Step S2314 is the end of the loop, corresponding to step S2311.

Step S2315 is the end of the loop, corresponding to step S2310.

In step S2316 the optimized schedule is set in the process day schedule.

Step S2317 is the beginning of another loop and is repeated by the number of modules.

Step S2318 is the beginning of another loop and is repeated for a unit time.

In step S2319 the operational rank set by the user is stored.

Step S2320 is the end of the loop, corresponding to step S2317.

Step S2321 is the end of the loop, corresponding to step S2318.

In step S2322 the schedule set by the user is set in the process day schedule.

Step S2323 is the beginning of another loop and is repeated by the number of modules.

Step S2324 is the beginning of another loop and is repeated for a unit time.

In step S2325 the present schedule is set in the process day schedule.

Step S2326 is the end of the loop, corresponding to step S2324.

Step S2327 is the end of the loop, corresponding to step S2323.

In step S2328 the schedule adjustment process is terminated.

Figure 24:
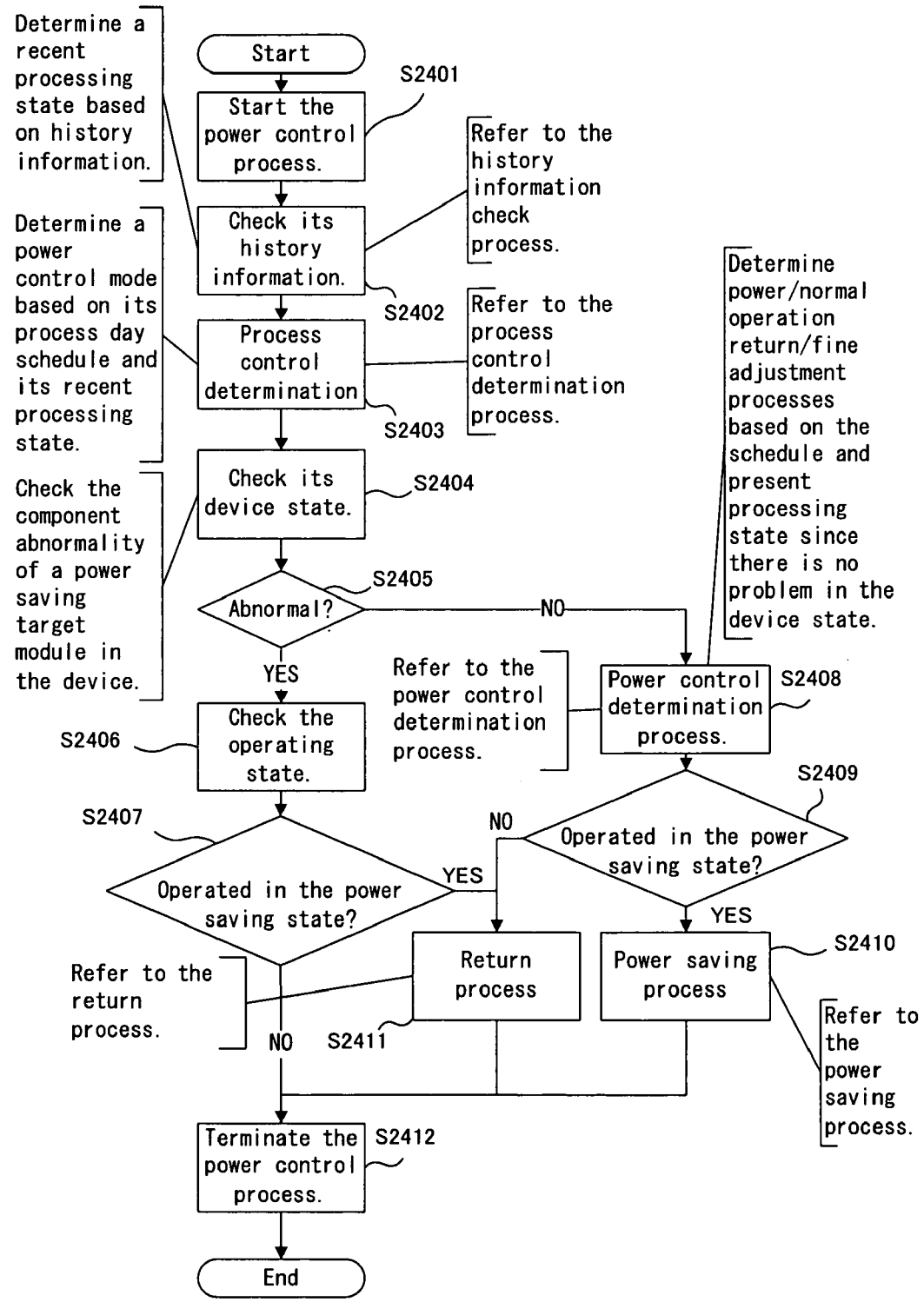
FIG. 24 is the detailed flowchart of a power control process.

FIG. 24 is the detailed flowchart of the power control process (step S1710).

In step S2401 the power control process is started.

In step S2402 history information is checked and the recent processing state is determined. The detailed history information check process is described later.

In step S2403 the power control mode is determined on the basis of the process day schedule and the recent processing state. The detailed process control determination process for determining the power control mode is described later.

In step S2404 it is checked if there is the component abnormality of a power saving target module in the device.

In step S2405, if there is the component abnormality, the flow proceeds to step S2406. If there is no component abnormality, the flow proceeds to step S2409.

In step S2406 the present operating state is checked.

In step S2407 the present operational rank of the entire device is referenced and it is determined whether the device is operated in the power saving mode. If the device is operated in the power saving mode, the flow proceeds to step S2411. If the device is not operated in the power saving mode, the flow proceeds to step S2412.

In step S2408, since the device state has no problem, it is determined which should be performed, a power saving, a normal operation return process or a fine adjustment process, based on the schedule and the present processing state. The detailed power control determination process is described later.

In step S2409, if the device is operated in a power saving mode, the flow proceeds to step S2410. If it is not operated in a power saving mode, the flow proceeds to step S2411.

In step S2410 the power saving process is performed. The detailed power saving process is described later.

In step S2411 the return process is performed. The detailed return process is described later.

In step S2412 the power control process is terminated.

Figure 25:
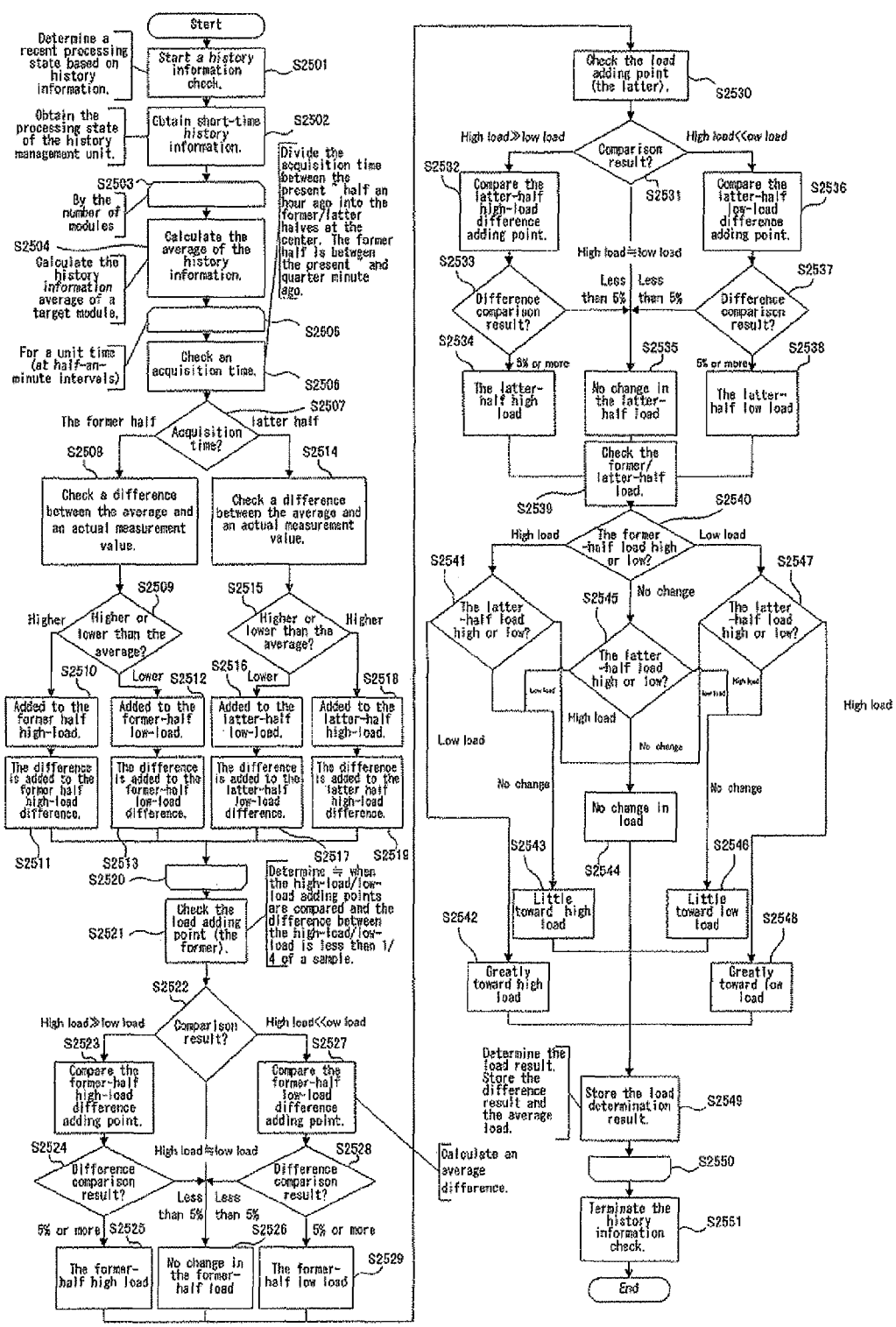
FIG. 25 is the detailed flowchart of a history information check process.

FIG. 25 is the detailed flowchart of the history information check process (step S2402).

In step S2501 the history information check process for determining a recent processing state based on history information is started.

In step S2502 short-time history information is obtained by obtaining the processing state of the history management unit.

Step S2503 is the beginning of a loop and is repeated by the number of modules.

In step S2504 the average value of the history information of a target module is calculated.

Step S2505 is the beginning of another loop and is repeated for a unit time (for half a minute).

In step S2506 the acquisition time of an actual measurement value in history information is checked.

In step S2507, if the actual measurement value is obtained in the former half of the time, the flow proceeds to step S2508. If it is obtained in its latter half, the flow proceeds to step S2515. If it was obtained half an hour ago, the former half is 15 minutes ago and the latter half is between 15 and 30 minutes ago.

In step S2508 a difference between the average and the actual measurement value is checked.

In step S2509, if the actual measurement value is larger than the average, the flow proceeds to step S2510. If the actual measurement value is smaller than the average, the flow proceeds to step S2512.

In step S2510, An evaluation value indicating that the former half is highly loaded (the former high-load adding point) is added.

In step S2511 the difference is added to the former high-load difference adding point being one evaluation value.

In step S2512 an evaluation value indicating that the former half is low loaded (the former low-load adding point) is added.

In step S2513 the difference is added to the former low-load difference adding point being one evaluation value.

In step S2514 a difference between the average and the actual measurement value is checked.

In step S2515, if the actual measurement value is larger than the average, the flow proceeds to step S2518. If the actual measurement value is smaller than the average, the flow proceeds to step S2516.

In step S2516, an evaluation value indicating that the latter half is low loaded (the latter low-load adding point) is added.

In step S2517 the difference is added to the latter low-load difference adding point being one evaluation value.

In step S2518 an evaluation value indicating that the latter half is highly loaded (the latter high-load adding point) is added.

In step S2519 the difference is added to the latter high-load difference adding point being one evaluation value.

Step S2520 is the end of the loop, corresponding to step S2505.

In step S2521 the former high-load adding point and the former low-load adding point are compared.

In step S2522, if the former high-load adding point is larger than the former low-load adding point, the flow proceeds to step S2523. If the former high-load adding point is smaller than the former low-load adding point, the flow proceeds to step S2527. If the former high-load adding point is almost equal to the former low-load adding point or a difference between the former high-load adding point and the former low-load adding point is less than 25% of the number of data, the flow proceeds to step S2526.

In step S2523 an average calculation differential value is calculated and compared with the former high-load difference adding point.

In step S2524 its difference with the average calculation differential value is 5% or more, the flow proceeds to step S2525. If the difference is less than 5%, the flow proceeds to step S2526.

In step S2525 it is set that the former half is highly loaded.

In step S2526 it is set that there is no change in the load of the former half.

In step S2527 an average calculation differential value is calculated and compared with the former low-load difference adding point.

In step S2528 its difference with the average calculation differential value is 5% or more, the flow proceeds to step S2525. If the difference is less than 5%, the flow proceeds to step S2526.

In step S2529 it is set that the former half is low loaded;

In step S2530 the latter high-load adding point and the latter low-load adding point are compared.

In step S2531, if the latter high-load adding point is larger than the latter low-load adding point, the flow proceeds to step S2532. If the latter high-load adding point is smaller than the latter low-load adding point, the flow proceeds to step S2536. If the latter high-load adding point is almost equal to the latter low-load adding point or a difference between the latter high-load adding point and the latter low-load adding point is less than 25% of the number of data, the flow proceeds to step S2535.

In step S2532 an average calculation differential value is calculated and compared with the latter high-load difference adding point.

In step S2533 its difference with the average calculation differential value is 5% or more, the flow proceeds to step S2534. If the difference is less than 5%, the flow proceeds to step S2535.

In step S2534 it is set that the latter half is highly loaded.

In step S2535 it is set that there is no change in the load of the latter half.

In step S2536 an average calculation differential value is calculated and compared with the latter low-load difference adding point.

In step S2537 its difference with the average calculation differential value is 5% or more, the flow proceeds to step S2538. If the difference is less than 5%, the flow proceeds to step S2535.

In step S2538 it is set that the latter half is low loaded.

In step S2539 the load of the former half and that of the latter half are checked.

In step S2540, if the load of the former half is high, the flow proceeds to step S2541. If there is no change in the load of the former half, the flow proceeds to step S2545. If the load of the former half is low, the flow proceeds to step S2547.

In step S2541 if the load of the latter half is low, the flow proceeds to step S2542. If there is no change in the load of the latter half, the flow proceeds to step S2543. If the load of the latter half is high, the flow proceeds to step S2544.

In step S2542 it is determined that the load tends to increase greatly toward high load.

In step S2543 it is determined that the load tends to increase little toward high load.

In step S2544 it is determined that the load does not tend to change.

In step S2545, if the load of the latter half is low, the flow proceeds to step S2543. If there is no change in the load of the latter half, the flow proceeds to step S2544. If the load of the latter half is high, the flow proceeds to step S2546.

In step S2546 it is determined that the load tends to decrease little toward low load.

In step S2547, if the load of the latter half is low, the flow proceeds to step S2544. If there is no change in the load of the latter half, the flow proceeds to step S2546. If the load of the latter half is high, the flow proceeds to step S2548.

In step S2548 the load tends to decrease from greatly toward low load.

In step S2549 the load result determination, the difference result and the load average are stored.

Step S2550 is the end of the loop, corresponding to step S2503.

In step S2551 the history information check process is terminated.

Figure 26:
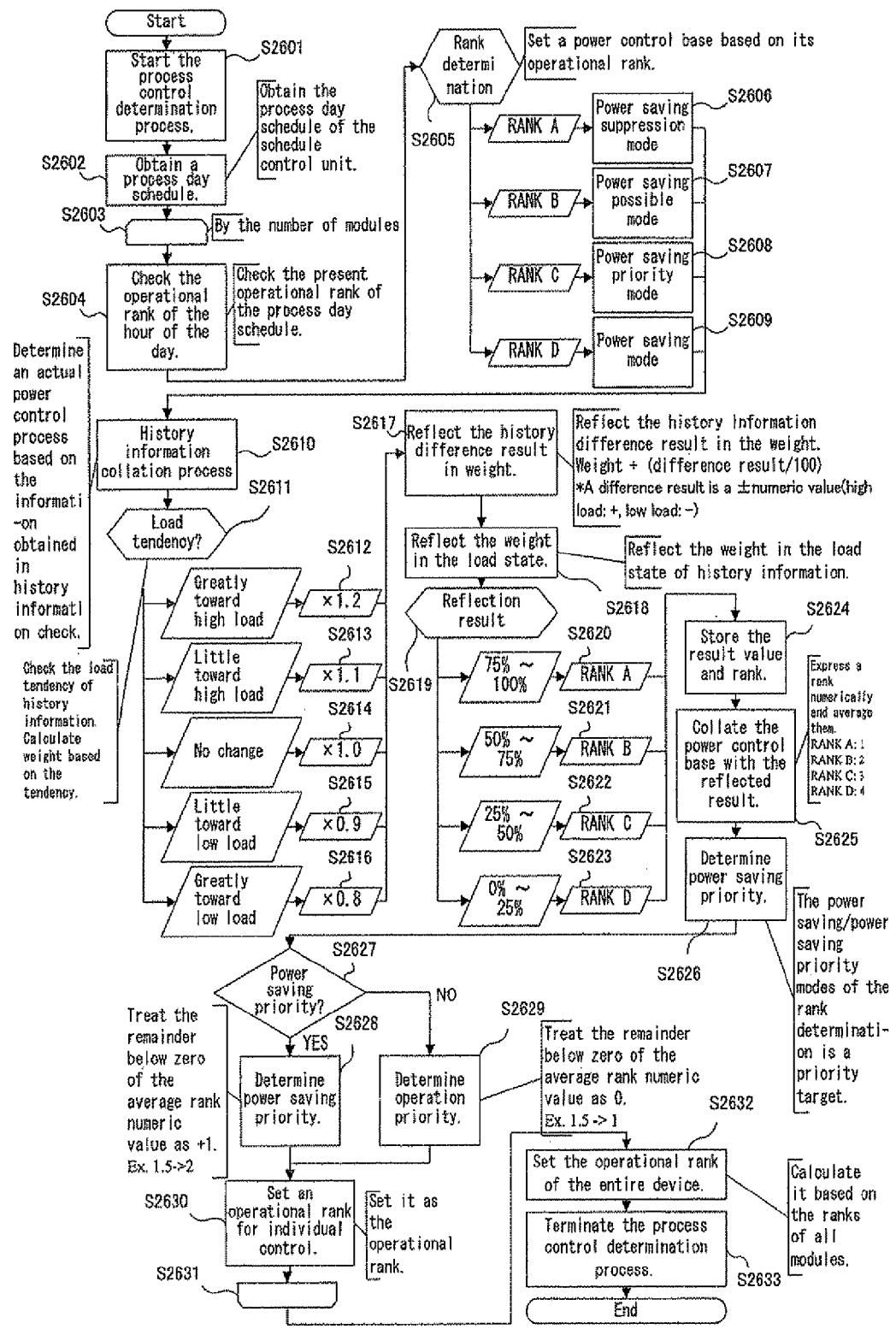
FIG. 26 is the detailed flowchart of a process control determination process.

FIG. 26 is the detailed flowchart of the process control determination process (step S2403).

In step S2601 the process control determination process is started.

In step S2602 the process day schedule of the schedule control unit 24 is obtained.

Step S2603 is the beginning of a loop and is repeated by the number of modules.

In step S2604 the present time operational rank of the process day schedule is checked.

In step S2605, if the present time operational rank of the process day schedule is A, the flow proceeds to step S2606. If the rank is B, the flow proceeds to step S2607. If the rank is C, the flow proceeds to step S2608. If the rank is D, the flow proceeds to step S2609.

In step S2606 it is determined that the base of power control is the power saving suppression mode.

In step S2607 it is determined that the base of power control is the power saving possible mode.

In step S2608 it is determined that the base of power control is the power saving priority mode.

In step S2609 it is determined that the base of power control is the power saving mode.

In step S2610 a process for determining an actual power control process, based on the result calculated in the history information check process is started.

In step S2611, if the load tendency calculated in the history information check process is greatly toward high load, the flow proceeds to step S2612. If the load tendency is little toward high load, the flow proceeds to step S2613. If there is no change in the high load, the flow proceeds to step S2614. If the load tendency is little toward low load, the flow proceeds to step S2615. If the load tendency is greatly toward low load, the flow proceeds to step S2616.

In step S2612 it is determined that weight is 1.2.
In step S2613 it is determined that weight is 1.1.
In step S2614 it is determined that weight is 1.0.
In step S2615 it is determined that weight is 0.9.
In step S2616 it is determined that weight is 0.8.

In step S2617 the difference result of history information is reflected in the weight and a new weight is calculated.

New weight=weight+(difference result/100)

In the case of high load the difference result is + and in the case of low load it is −.

In step S2618 the weight is reflected in the load of history information. More specifically, it is calculated by multiplying the load by a new weight calculated in step S2617.

In step S2619, if the value calculated in step S2618 is 75~100%, the flow proceeds to step S2620. If the value calculated in step S2618 is 50~75%, the flow proceeds to step S2621. If the value calculated in step S2618 is 25~50%, the flow proceeds to step S2622. If the value calculated in step S2618 is 0~25%, the flow proceeds to step S2623.

In step S2620 it is ranked A.
In step S2621 it is ranked B.
In step S2622 it is ranked C.
In step S2623 it is ranked D.

In step S2624 the result value and the rank are stored.

In step S2625 the power control base and the reflected result are collated. More specifically, ranks are numerically expressed and their average is calculated. At that time ranks A, B, C and D are 1, 2, 3 and 4, respectively.

In step S2626 the power saving mode/power saving priority mode in the rank determination becomes a priority target.

In step S2627 if it is power saving priority, the flow proceeds to step S2628. If it is not power saving priority, the flow proceeds to step S2629.

In step S2628 the remainder below zero of the average rank numeric value is raised. For example, 1.5 becomes 2.

In step S2629 the remainder below zero of the average rank numeric value is omitted. For example, 1.5 becomes 1.

In step S2630 an operational rank for individual control is set.

Step S2631 is the end of the loop, corresponding to step S2603.

In step S2632 the operational rank of the entire device is calculated and set on the basis of the ranks of all the modules.

In step S2633 the process control determination process is terminated.

Figure 27:
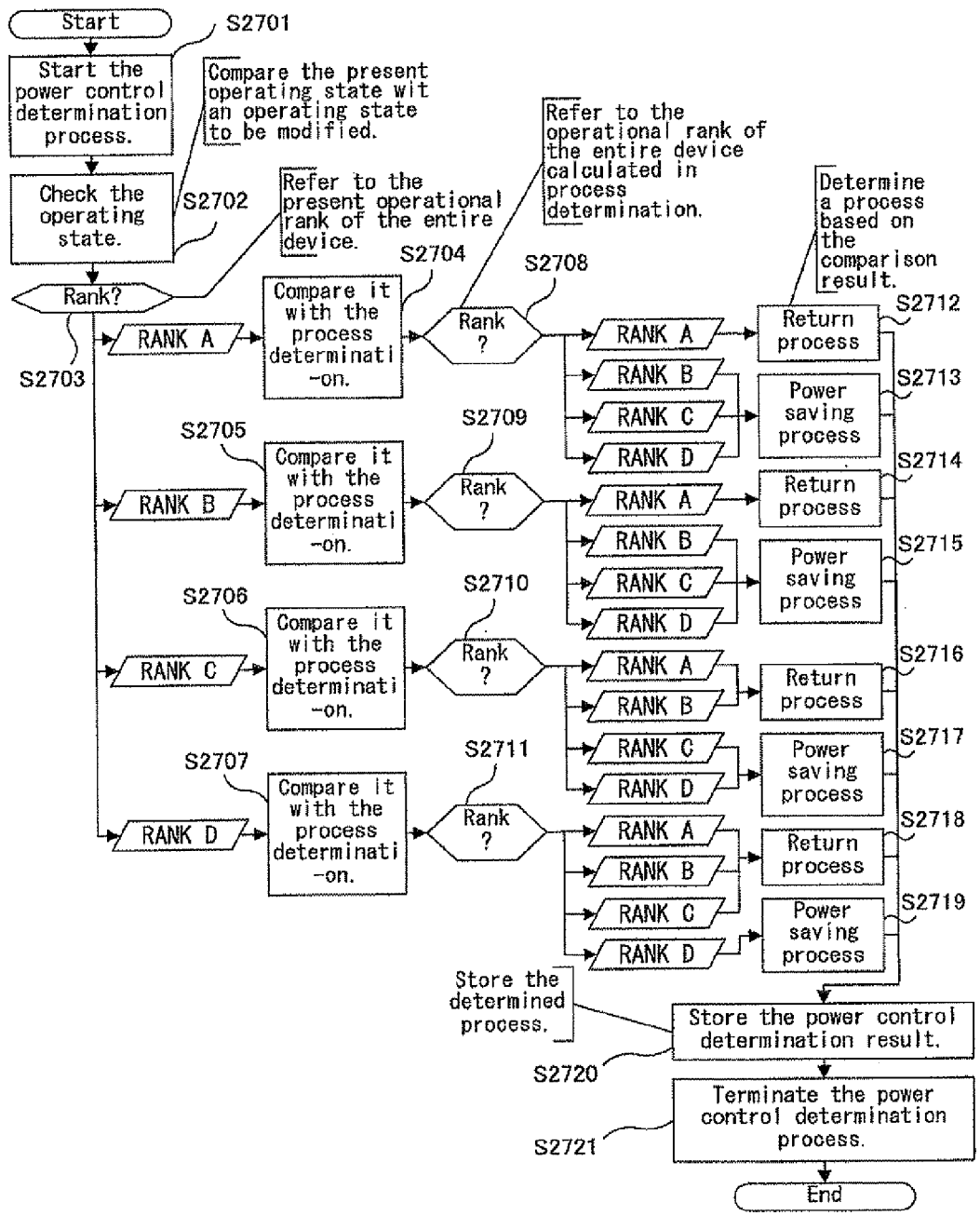
FIG. 27 is the detailed flowchart of a power control determination process.

FIG. 27 is the detailed flowchart of the power control determination process (step S2408).

In step S2701 the power control determination process is started.

In step S2702 the present operating state (operational rank) and an operating state (operational rank) to be modified are checked.

In step S2703, if the present operational rank of the entire device is A, the flow proceeds to step S2704. If the present operational rank of the entire device is B, the flow proceeds to step S2705. If the present operational rank of the entire device is C, the flow proceeds to step S2706. If the present operational rank of the entire device is D, the flow proceeds to step S2707.

In step S2704 the operational rank of the entire device, calculated in the process control determination process is checked.

In step S2705 the operational rank of the entire device, calculated in the process control determination process is checked.

In step S2706 the operational rank of the entire device, calculated in the process control determination process is checked.

In step S2707 the operational rank of the entire device, calculated in the process control determination process is checked.

In step S2708, if the operational rank of the entire device, calculated in the process control determination process is A, the flow proceeds to step S2712. If it is B, C or D, the flow proceeds to step S2713.

In step S2709, if the operational rank of the entire device, calculated in the process control determination process is A, the flow proceeds to step S2714. If it is B, C or D, the flow proceeds to step S2715.

In step S2710, if the operational rank of the entire device, calculated in the process control determination process is A or B, the flow proceeds to step S2716. If it is C or D, the flow proceeds to step S2717.

In step S2711, if the operational rank of the entire device, calculated in the process control determination process is A, B or C, the flow proceeds to step S2718. If the operational rank of the entire device, calculated in the process control determination process is D, the flow proceeds to step S2719.

In step S2712 the return process is applied to the power control determination result.

In step S2713 the power saving process is applied to the power control determination result.

In step S2714 the return process is applied to the power control determination result.

In step S2715 the power saving process is applied to the power control determination result.

In step S2716 the return process is applied to the power control determination result.

In step S2717 the power saving process is applied to the power control determination result.

In step S2718 the return process is applied to the power control determination result.

In step S2719 the power saving process is applied to the power control determination result.

In step S2720 the power control determination results are stored.

Figure 28:
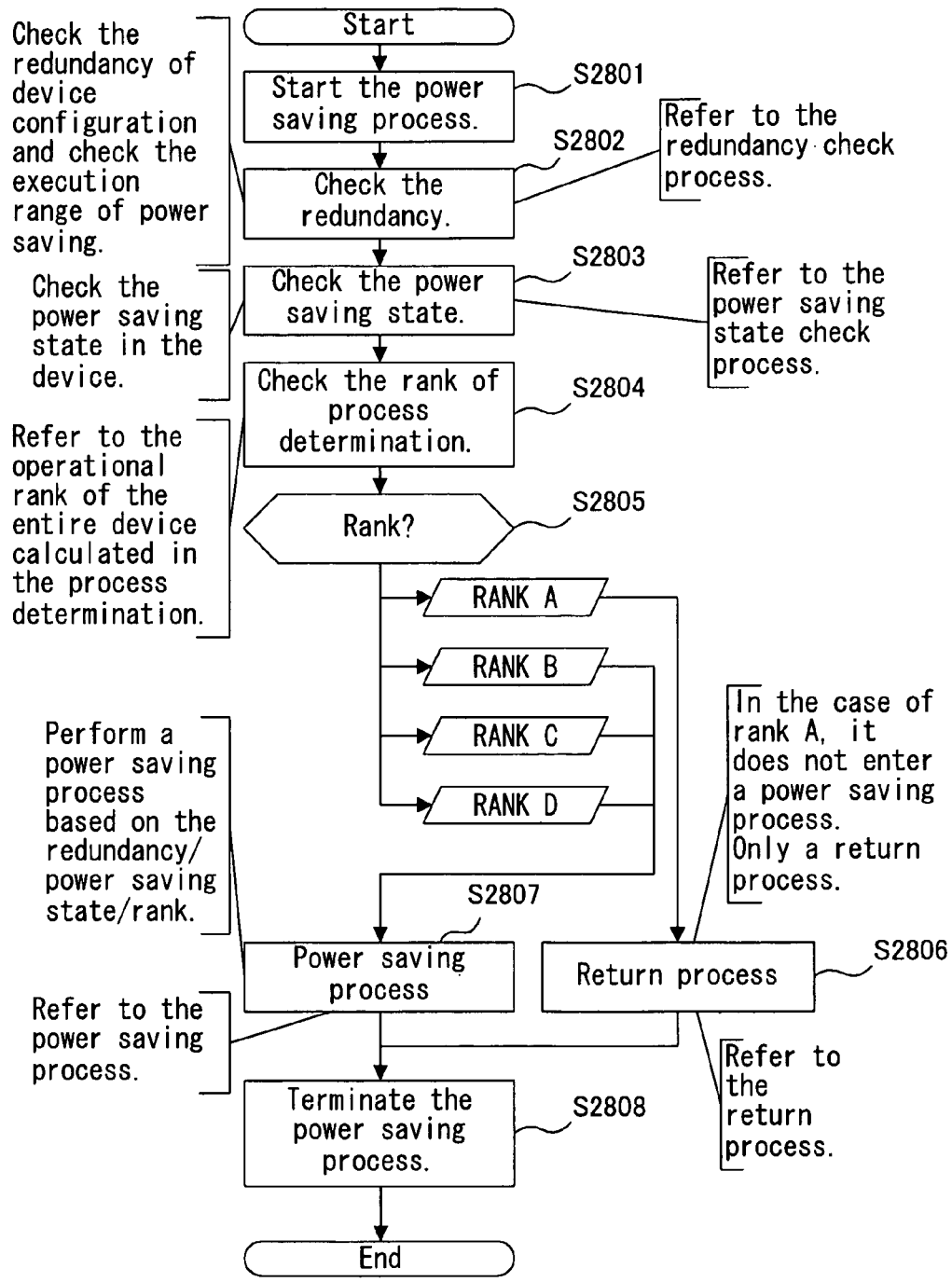
FIG. 28 is the detailed flowchart of a power saving process.

FIG. 28 is the detailed flowchart of the power saving process (step S2410).

In step S2801 the power saving process is started.

In step S2802 the redundancy of the device configuration is checked and its range whose power saving is applicable is checked. The detailed redundancy check process is described later.

In step S2803 the power saving state in the device is checked. The detailed power saving state check process is described later.

In step S2804 the operational rank of the entire device, calculated in the process control determination process is checked.

In step S2805, if the operational rank of the entire device, calculated in the process control determination process is A, the flow proceeds to step S2806. If it is B, C or D, the flow proceeds to step S2807.

In step S2806 the return process is performed. The detailed return process is described later.

In step S2807 the power saving process is performed on the basis of its redundancy, power saving state and operational rank. The detailed power saving process is described later.

In step S2808 the power saving process is terminated.

Figure 29:
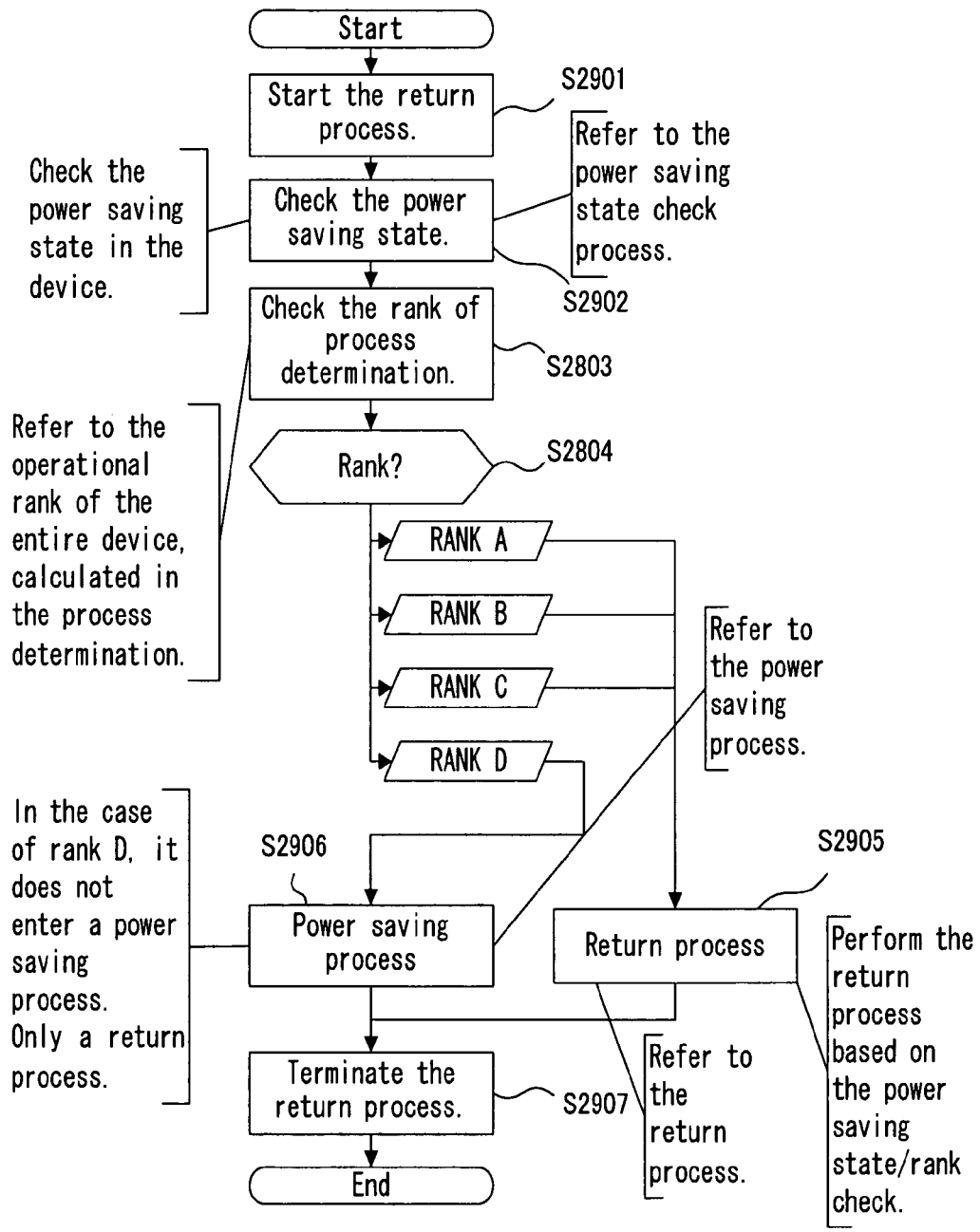
FIG. 29 is the detailed flowchart of a return process.

FIG. 29 is the detailed flowchart of the return process (step S2411 and S2806).

In step S2901 the return process is started.

In step S2902 the power saving state in the device is checked. The detailed power saving state check process is described later.

In step S2903 the operational rank of the entire device, calculated in the process control determination process is checked.

In step S2904, if the operational rank of the entire device, calculated in the process control determination process is A, B or C, the flow proceeds to step S2905. If it is D, the flow proceeds to step S2906.

In step S2905 the return process is performed on the basis of its power saving state and operational rank. The detailed return process is described later.

In step S2906 the power saving process is performed. The detailed power saving process is described above.

In step S2907 the return process is terminated.

Figure 30:
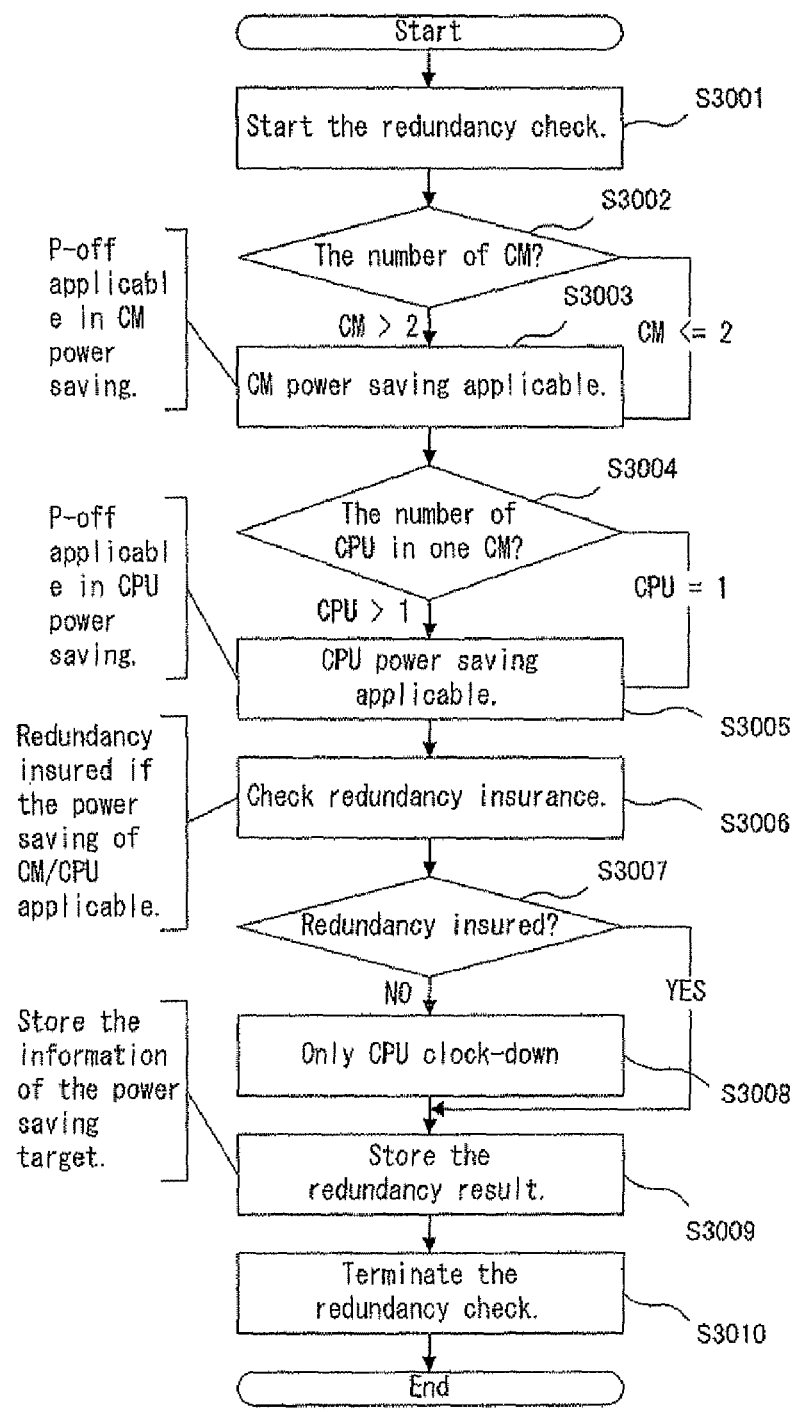
FIG. 30 is the detailed flowchart of a redundancy check process.

FIG. 30 is the detailed flowchart of the redundancy check process (step S2802).

In step S3001 the redundancy check process is started.

In step S3002, if the number of CM is more than two, the flow proceeds to step S3003. If it is two or less, the flow proceeds to step S3004.

In step S3003 the power saving of CM, that is, the power-off of CM is applicable.

In step S3004, if the number of CPU of one CM is more than 1, the flow proceeds to step S3005. If it is one, the flow proceeds to step S3006.

In step S3005 the power saving of CPU, that is, the power-off of CPU is applicable.

In step S3006 the redundancy assurance is checked.

In step S3007 if the power saving of CM or CPU is applicable, the flow proceeds to step S3009. If it is not applicable, the flow proceeds to step S3008.

In step S3008 only the clock down of CPU is applicable.

In step S3009 the information about a power saving target obtained in the above step, that is, the redundancy information of the device is stored.

In step S3010 the redundancy check process is terminated.

Figure 31:
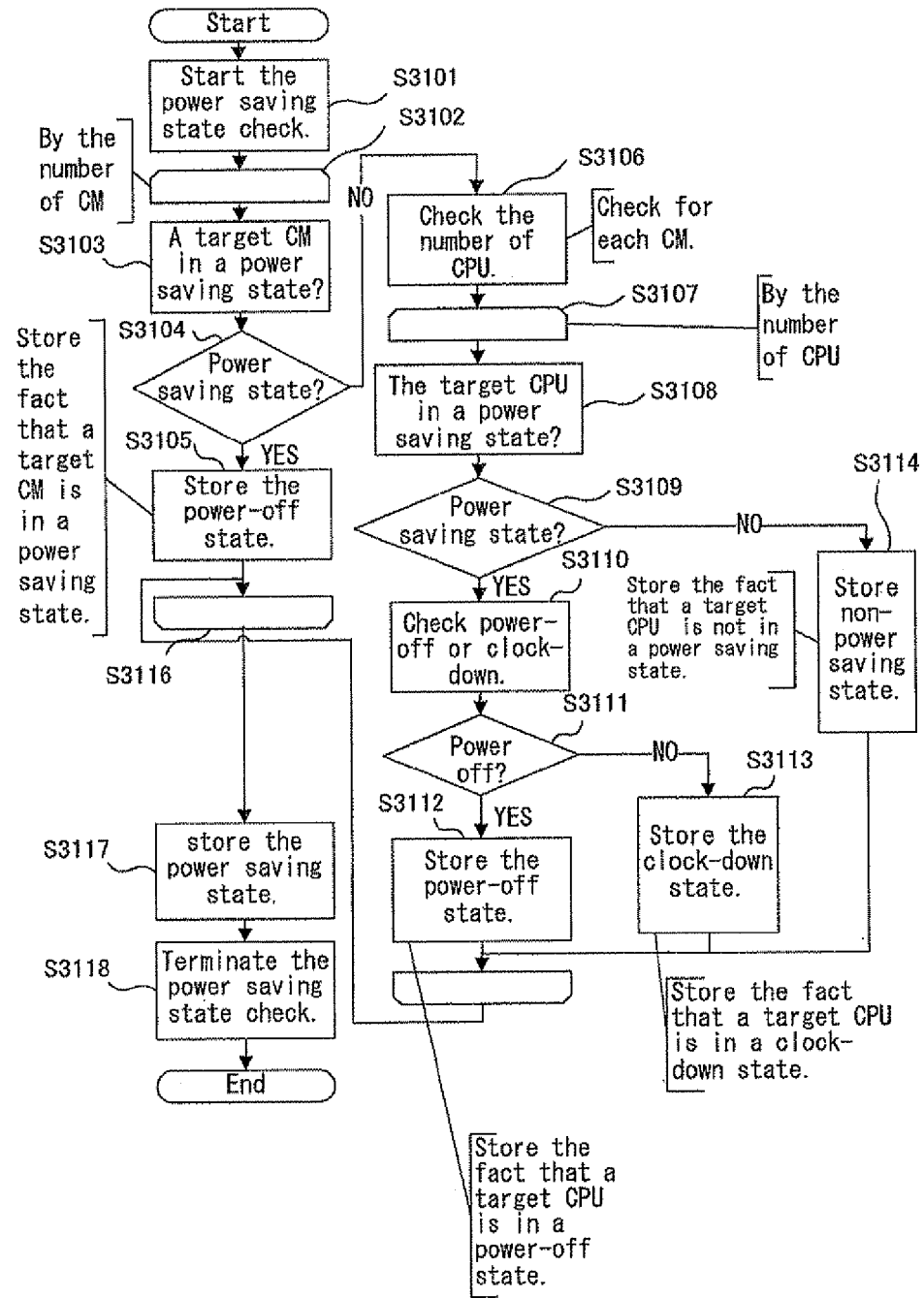
FIG. 31 is the detailed flowchart of a power saving state check process.

FIG. 31 is the detailed flowchart of the power saving state check process (steps S2803 and S2902).

In step S3101 the power saving state check process is started.

Step S3102 is the beginning of a loop and is repeated by the number of CM.

In step S3103 it is checked if a power saving target CM is in a power saving state.

In step S3104, if it is in a power saving state, the flow proceeds to step S3105. If it is not in a power saving state, the flow proceeds to step S3106.

In step S3105 the fact that the target CM is in a power saving state (power-off state) is stored.

In step S3106 the number of CPU of one CM is checked.

Step S3107 is the beginning of another loop and is repeated by the number of CPU.

In step S3108 it is checked if a power saving target CPU is in a power saving state.

In step S3109, if it is in a power saving state, the flow proceeds to step S3110. If it is not in a power saving state, the flow proceeds to step S3114.

In step S3110 it is checked if the target CPU is in a power-off state or clock-down state.

In step S3111, if the target CPU is in a power-off state, the flow proceeds to step S3112. If it is not in a power-off state, the flow proceeds to step S3113.

In step S3112 the fact that the target CPU is in a power saving state (power-off state) is stored.

In step S3113 the fact that the target CPU is in a clock-down state (power-off state) is stored.

In step S3114 the fact that the target CPU is in not a power saving state is stored.

Step S3115 is the end of the loop, corresponding to step S3107.

Step S3116 is the end of the loop, corresponding to step S3102.

In step S3117 the power state of each unit is stored as a power saving state.

In step S3118 the power saving state check process is terminated.

Figure 32:
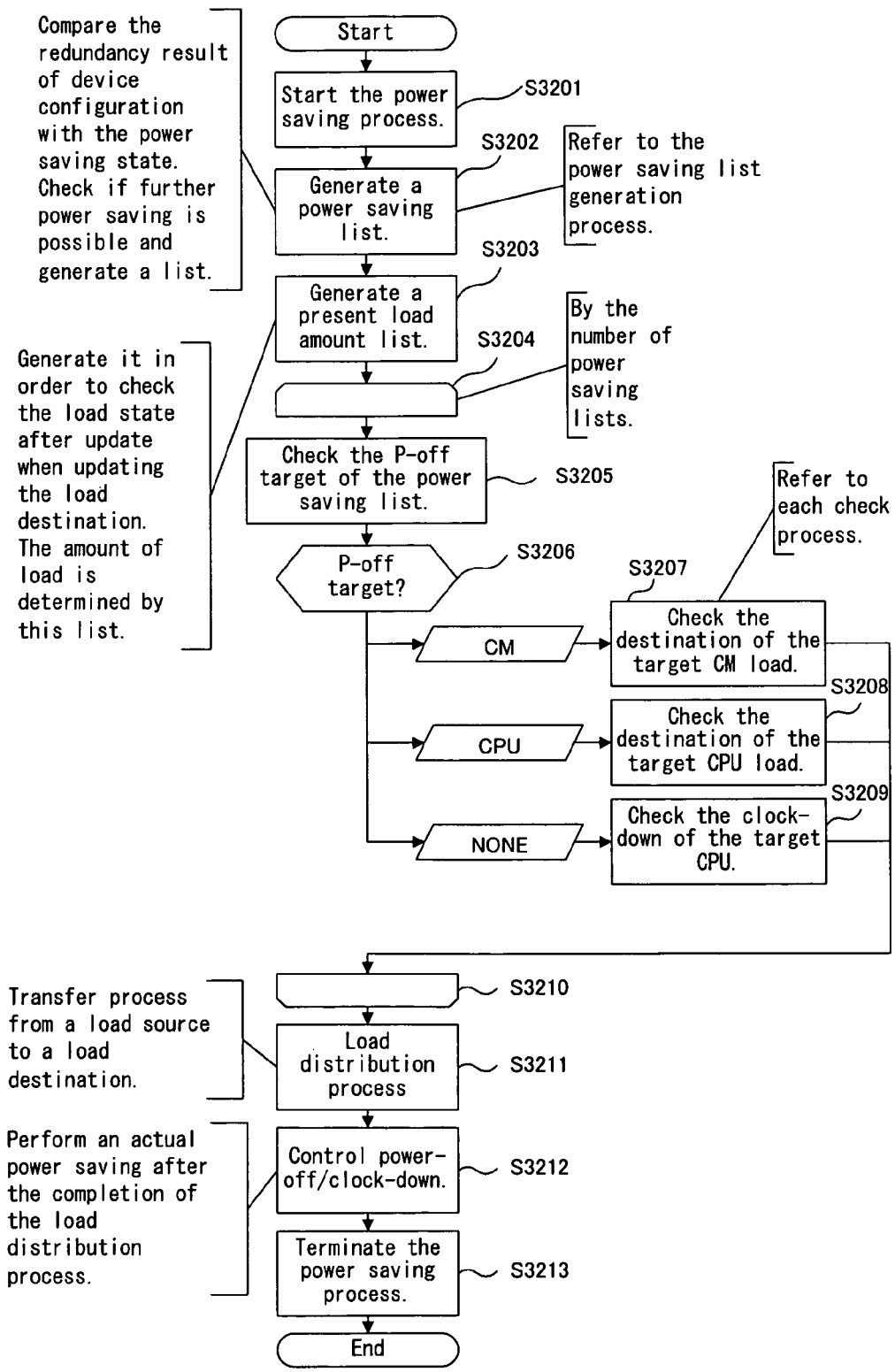
FIG. 32 is the detailed flowchart of the power saving process.

FIG. 32 is the detailed flowchart of the power saving process (step S2807).

In step S3201 the power saving process is started.

In step S3202 the redundancy result of device configuration and the power saving state are compared, it is checked if further power saving is possible and a target list (power saving list) is generated. The detailed power saving list generation process is described later.

In step S3203 a load amount list is generated at the time of the update of a load destination in order to check the load state after update. The load amount determination uses this list.

Step S3204 is the beginning of a loop and is repeated by the number of the power saving lists.

In step S3205 the power-off target in the power saving list is checked.

In step S3206, if the power-off target is CM, the flow proceeds to step S3207. If it is CPU, the flow proceeds to step S3208. If there is no power-off target, the flow proceeds to step S3209.

In step S3207 the destination of the target CM load is checked. The detailed target CM load destination check process is described later.

In step S3208 the destination of the target CPU load is checked. The detailed target CPU load destination check process is described later.

In step S3209 the clock-down check of a target CPU is performed. The detailed target CPU clock-down check process is described later.

Step S3210 is the end of the loop, corresponding to step S3204.

In step S3211 a load distribution process is performed. Specifically, the process is transferred from a load source to a load destination.

In step S3212 after the completion of the load distribution process power-off or clock-down is performed and then power saving is implemented.

In step S3213 the power saving process is terminated.

Figure 33:
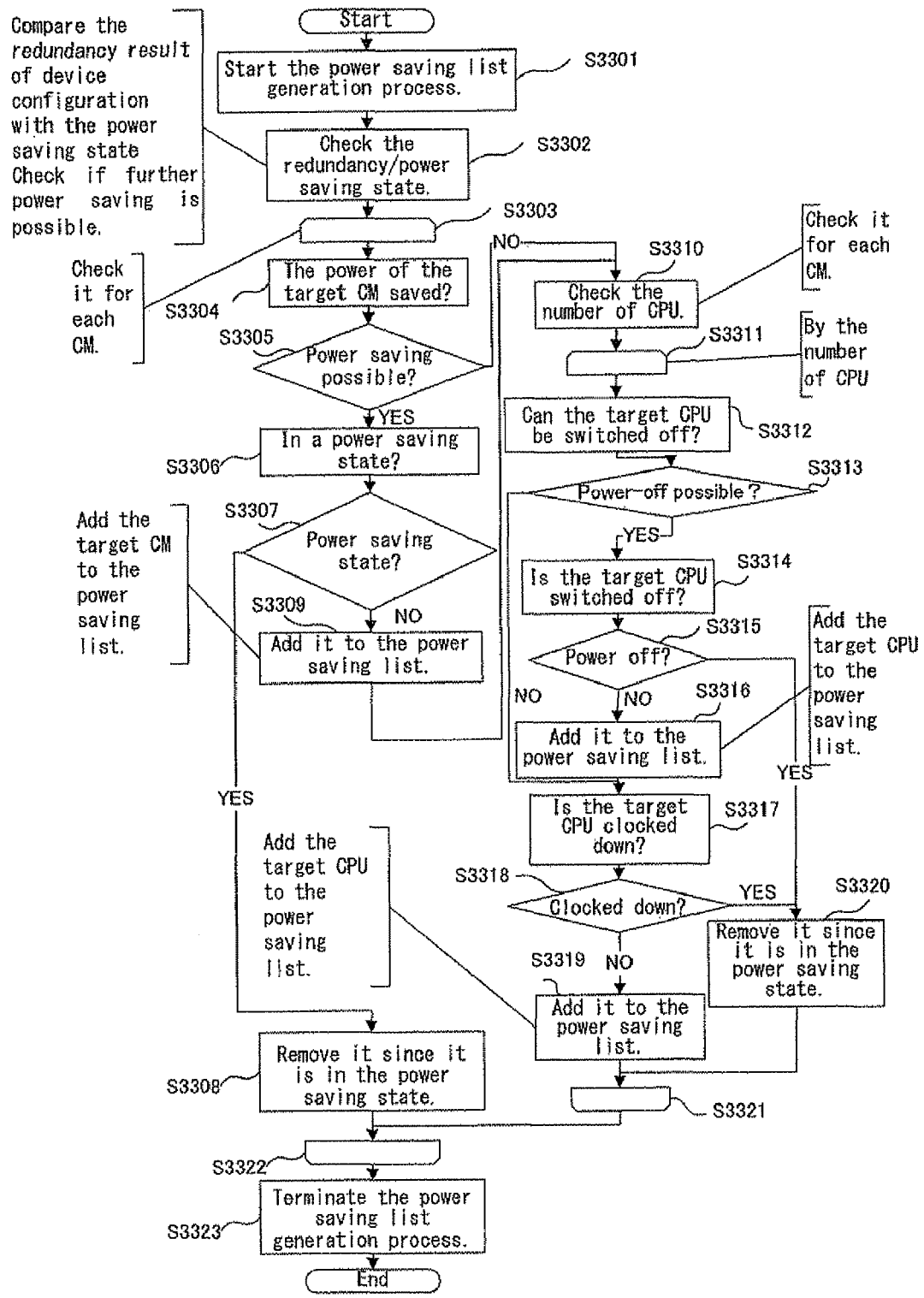
FIG. 33 is the detailed flowchart of a power saving list generation process.

FIG. 33 is the detailed flowchart of the power saving list generation process (step S3202).

In step S3301 the power saving list generation process is started.

In step S3302 the redundancy result of the device configuration obtained in the redundancy check process and the power saving state obtained in the power saving state check process are checked.

Step S3303 is the beginning of a loop and is repeated by the number of CM.

In step S3304 it is checked if the power of a target CM can be saved, on the basis of the redundancy result.

In step S3305, if the power of a target CM can be saved, the flow proceeds to step S3306. If it cannot be saved, the flow proceeds to step S3310.

In step S3306 it is checked if the target CM is in a power saving state, based on the power saving state.

In step S3307, if the target CM is in a power saving state, the flow proceeds to step S3308. If it is not in a power saving state, the flow proceeds to step S3309.

In step S3308, the target CM is removed from the power saving list since it is in a power saving state.

In step S3309 the target CM is added to the power saving list.

In step S3310 the number of CPU in the target CM is checked.

Step S3311 is the beginning of another loop and is repeated by the number of CPU.

In step S3312 it is checked if the power of a target CPU can be switched off, based on the redundancy result.

In step S3313, if the power can be switched off, the flow proceeds to step S3314. If it cannot be switched off, the flow proceeds to step S3317.

In step S3314 it is checked if the target CPU is in a power-off state, based on the power saving state.

In step S3315, if the target CPU is not in a power-off state, the flow proceeds to step S3316. If it is in a power-off state, the flow proceeds to step S3320.

In step S3316 the target CPU is added to the power saving list.

In step S3317 it is checked if the target CPU is in a clock-down state, based on the power saving state.

In step S3318, if it is not in a clock-down state, the flow proceeds to step S3319. If it is in a clock-down state, the flow proceeds to step S3320.

In step S3319 the target CPU is added to the power saving list.

In step S3320 the target CPU is removed from the power saving list since it is in a power-off state.

Step S3321 is the end of the loop; corresponding to step S3311.

Step S3322 is the end of the loop, corresponding to step S3303.

In step S3323 the power saving list generation process is terminated.

Figure 34:
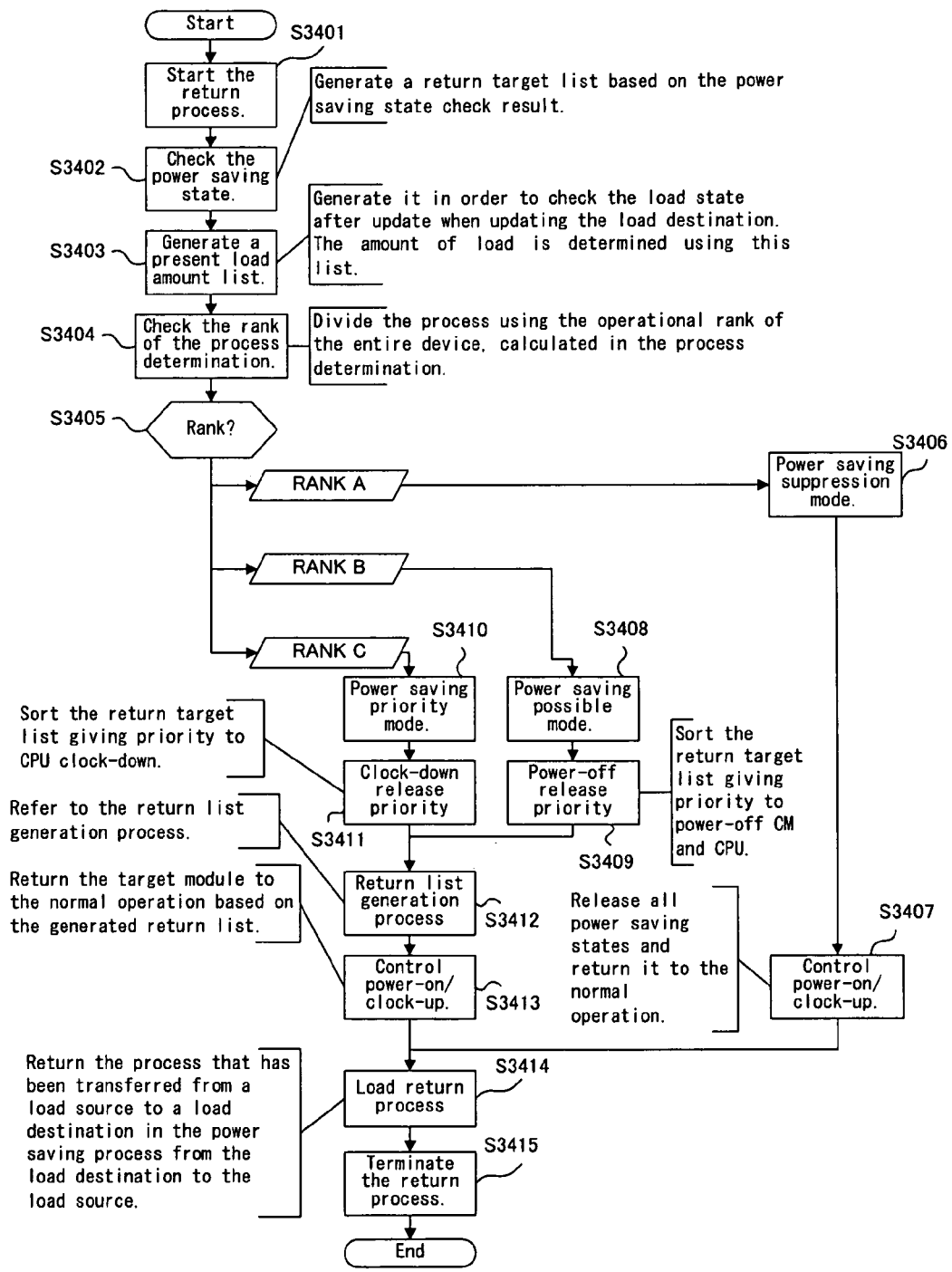
FIG. 34 is the detailed flowchart of a return process.

FIG. 34 is the detailed flowchart of the return process (step S2905).

In step S3401 the return process is started.

In step S3402 the power state obtained in the power saving state check process is checked and the power saving state is checked.

In step S3403 a present load amount list is generated at the time of update of a load destination in order to check the load state after update. The load amount determination uses this list.

In step S3404 the operational rank of the entire device, calculated in the process control determination process is checked.

In step S3405, if the rank is A, the flow proceeds to step S3406. If the rank is B, the flow proceeds to step S3408. If the rank is C, the flow proceeds to step S3410.

In step S3406 the power saving suppression mode is set.

In step S3407 all the power saving states are released to return the device to its normal operation.

In step S3408 the power saving possible mode is set.

In step S3409 the return target list is sorted giving priority to power-off CM and CPU.

In step S3410 the power saving priority mode is set.

In step S3411 the return target list is sorted giving priority to clocked-down CPU.

In step S3412 a return list is generated. The detailed return list generation process is described later.

In step S3413 power-off or clock-down is applied to the target module, according to the generated return list to return the device to its normal operation.

In step S3414 the process transferred from a load source to a load destination at the time of the power saving is returned from the load destination to the load source.

In step S3415 the return process is terminated.

Figure 35:
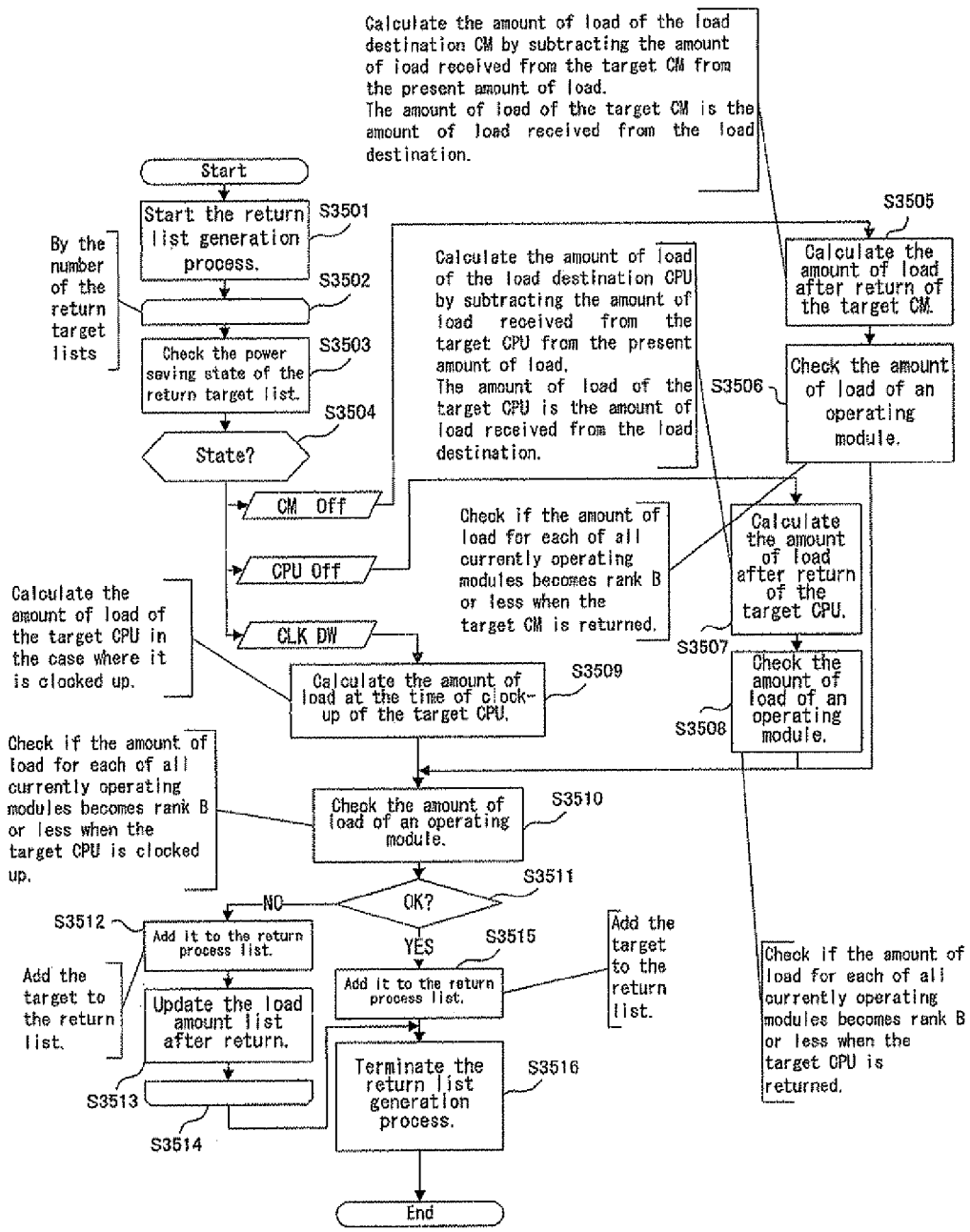
FIG. 35 is the detailed flowchart of a return list generation process (process).

FIG. 35 is the detailed flowchart of the return list generation process (step S3412).

In step S3501 the return list generation process is started.

Step S3502 is the beginning of a loop and is repeated by the numbers of the return target lists.

In step S3503 the power saving state in the return target list is checked.

In step S3504 if the state is CM power-off, the flow proceeds to step S3505. If it is CPU power-off, the flow proceeds to step S3507. If it is CPU clock-down, the flow proceeds to step S3509.

In step S3505 the amount of load after the return of the target CM is calculated. The amount of load of a load destination CM is calculated by subtracting the amount of load received from the target CM at the time of power saving from the present amount of load. The amount of load of the target CM is the amount of load received from a load destination CM.

In step S3506, if the target CM is returned, the amount of load of each of all the present operating modules is checked.

In step S3507 the amount of load after the return of the target CPU is calculated. The amount of load of a load destination CPU is calculated by subtracting the amount of load received from the target CPU from the present amount of load. The amount of load of the target CPU is the amount of load received from a load destination CPU.

In step S3508, if the target CPU is returned, the amount of load for each of all the present operating modules is checked.

In step S3509 the amount of load in the case where the target CPU is clocked up is calculated.

In step S3510 the amount of load of each of all the present operating modules in the case where the target CPU is clocked up is checked.

In step S3511, if the amount of load for each of all the modules is B or less, the flow proceeds to step S3515. If it is rank A, the flow proceeds to step S3512.

In step S3512 the target is added to the return process list.

In step S3513 the load amount list after return is updated.

Step S3514 is the end of the loop corresponding to step S3502.

In step S3515 the target is added to the return process list.

In step S3516 the power saving list generation process is terminated.

Figure 36:
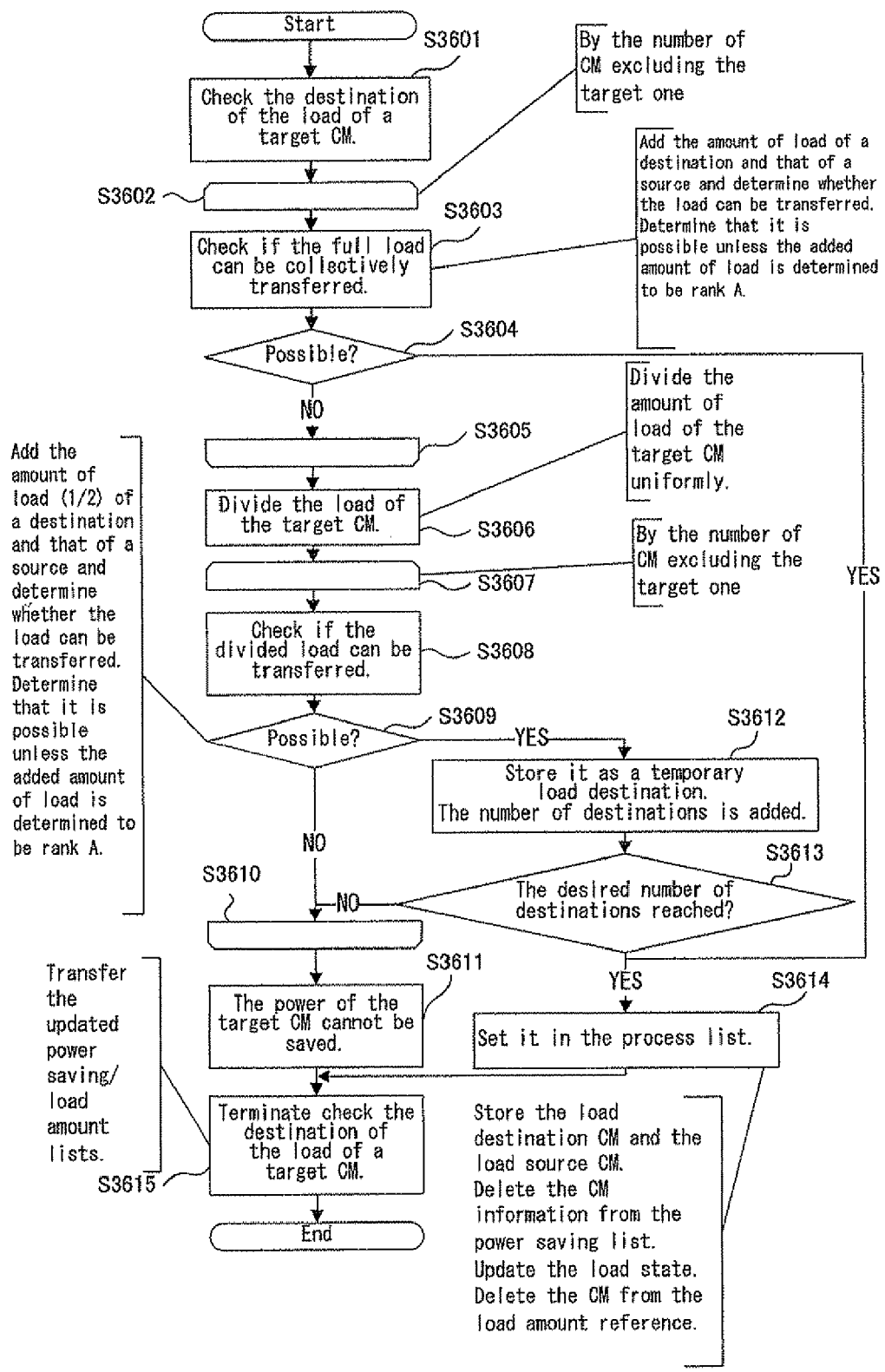
FIG. 36 is the detailed flowchart of a target CM load destination check process.

FIG. 36 is the detailed flowchart of the target CM load destination check process (step S3207).

In step S3601 the target CM load destination check process is started.

Step S3602 is the beginning of a loop and is repeated by the number of CM excluding a target CM.

In step S3603 the amount of load of a load destination and that of a load source are added and it is checked if load can be undertaken.

In step S3604, if the added amount of load is rank A, it is determined that load cannot be undertaken and the flow proceeds to step S3614. If it is other than rank A, it is determined that load can be undertaken and the flow proceeds to step S3605.

Step S3605 is the end of the loop, corresponding to step S3602.

In step S3606 the amount of load of the target CM is uniformly divided.

Step S3607 is the beginning of another loop and is repeated by the number of CM excluding the target CM.

In step S3608 it is checked if the divided load can be undertaken.

In step S3609 half of the amount of load of a load destination and the amount of load of a load source are added. If the added amount of load is rank A, it is determined that load cannot be undertaken and the flow proceeds to step S3610. If it is other than rank A, it is determined that load can be undertaken and the flow proceeds to step S3612.

Step S3610 is the end of the loop, corresponding to step S3608.

In step S3611 it is determined that the power of the target CM cannot be saved.

In step S3612 it is stored as a temporary load destination and is added to the number of load destinations.

In step S3613 it is determined whether the required number of load destination is reached. If it is reached, the flow proceeds to step S3614. If it is not reached, the flow proceeds to step S3610.

In step S3614 each of the load destination CM and the load source CM are stored. The CM information is deleted from the power saving list. The load state is updated. The CM is deleted from the load state reference.

In step S3615 the target CM load destination check process is terminated.

Figure 37:
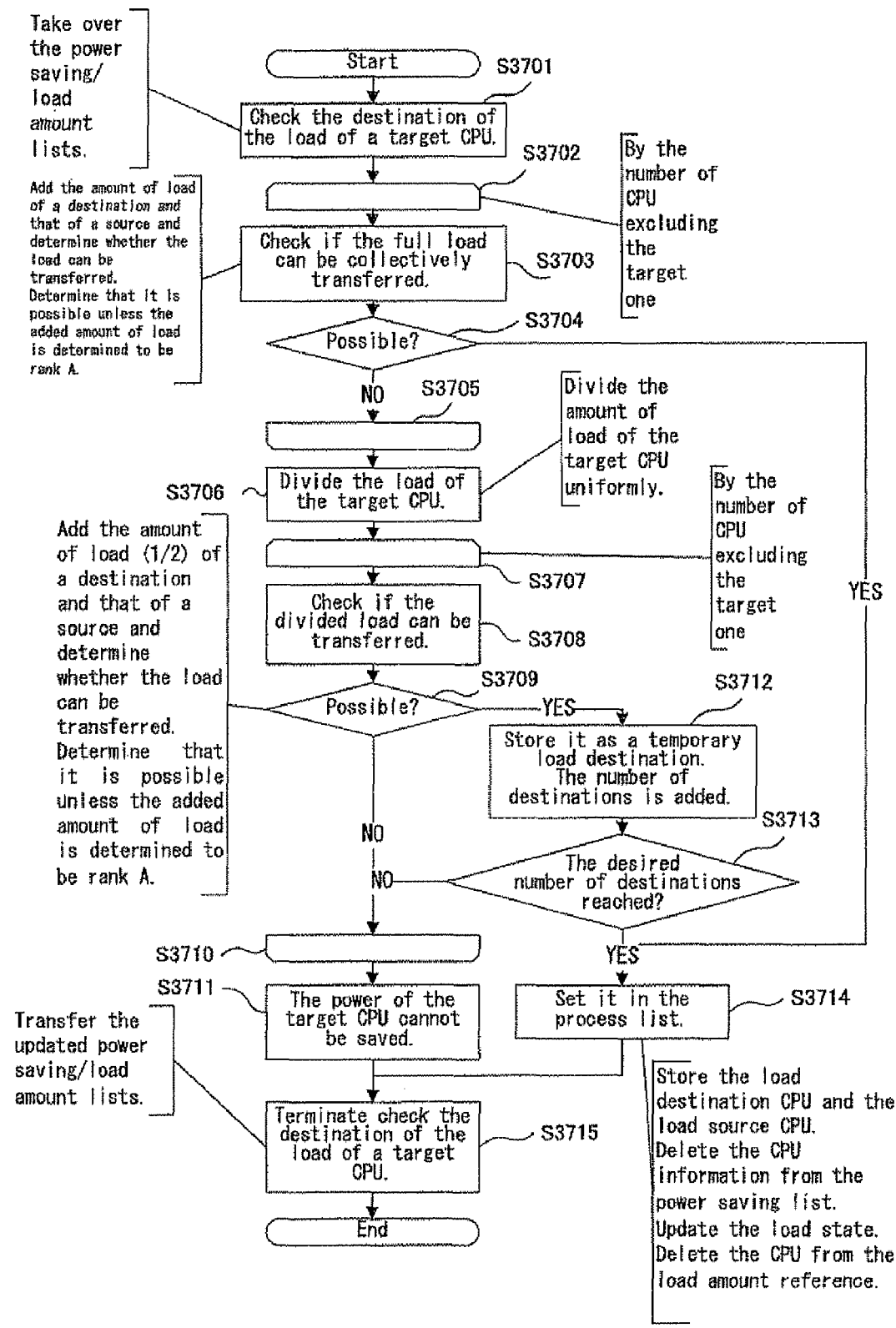
FIG. 37 is the detailed flowchart of a target CPU load destination check process.

FIG. 37 is the detailed flowchart of the target CPU load destination check process.

In step S3701 the target CPU load destination check process is started.

Step S3702 is the beginning of a loop and is repeated by the number of CPU excluding a target CPU.

In step S3703 the amount of load of a load destination and that of a load source are added and it is checked if load can be undertaken.

In step S3704, if the added amount of load is rank A, it is determined that load cannot be undertaken and the flow proceeds to step S3714. If it is other than rank A, it is determined that load can be undertaken and the flow proceeds to step S3705.

Step S3705 is the end of the loop, corresponding to step S3702.

In step S3706 the amount of load of the target CPU is uniformly divided.

Step S3707 is the beginning of another loop and is repeated by the number of CPU excluding the target CM.

Step S3708 it is checked if the divided load can be undertaken.

In step S3709 half of the amount of load of a load destination and the amount of load of a load source are added. If the added amount of load is rank A, it is determined that load cannot be undertaken and the flow proceeds to step S3710. If it is other than rank A, it is determined that load can be undertaken and the flow proceeds to step S3712.

Step S3710 is the end of the loop, corresponding to step S3708.

In step S3711 it is determined that the power of the target CPU cannot be saved, namely, it cannot be switched off.

In step S3712 it is stored as a temporary load destination and is added to the number of load destinations.

In step S3713 it is determined whether the required number of load destination is reached. If it is reached, the flow proceeds to step S3714. If it is not reached, the flow proceeds to step S3710.

In step S3714 each of the load destination CPU and the load source CPU are stored. The CM information is deleted from the power saving list. The load state is updated. The CPU is deleted from the load state reference.

In step S3715 the target CPU load destination check process is terminated.

Figure 38:
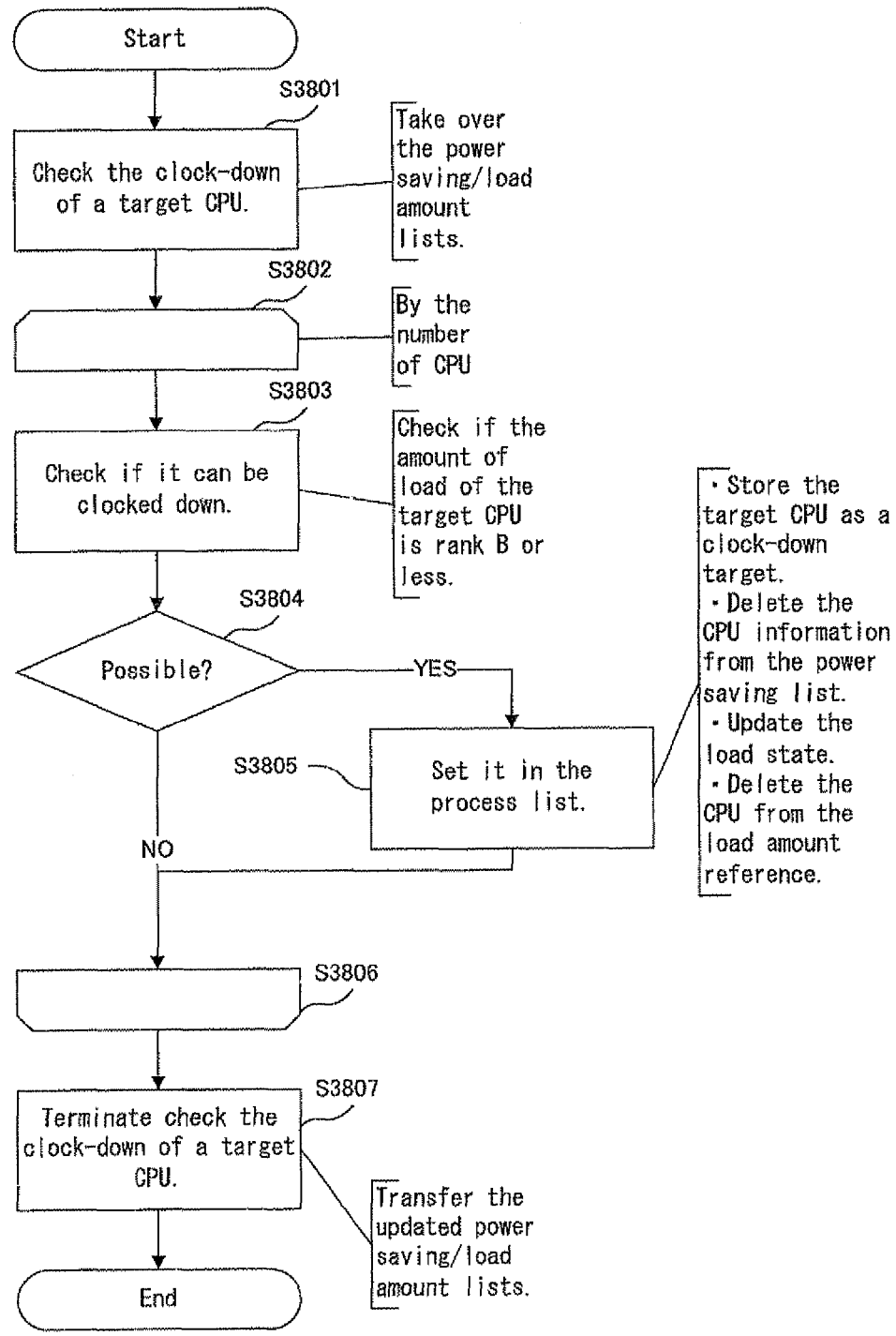
FIG. 38 is the detailed flowchart of a target CPU clockdown check process.

FIG. 38 is the detailed flowchart of the target CPU clock-down check process (step S3209).

In step S3801 the target CPU clock-down check process is started.

Step S3802 is the beginning of a loop and is repeated by the number of target CPU.

In step S3803 it is checked if clock-down is possible. Specifically, the amount of load of a target CPU is checked.

In step S3804, if the amount of load of the target CPU is rank B or less, the flow proceeds to step S3805. If it is rank A, the flow proceeds to step S3806.

In step S3805 the target CPU is stored as a clock-down target. The CPU information is deleted from the power saving list. The load information is updated. The CPU is deleted from the load state reference.

Step S3806 is the end of the loop, corresponding to step S3802.

In step S3807 the target CPU clock-down check process is terminated.

Although in the above-described preferred embodiment a controller module is the target of power consumption reduction, next, a power saving device in which a disk is the power consumption reduction target is described.

Figure 39:
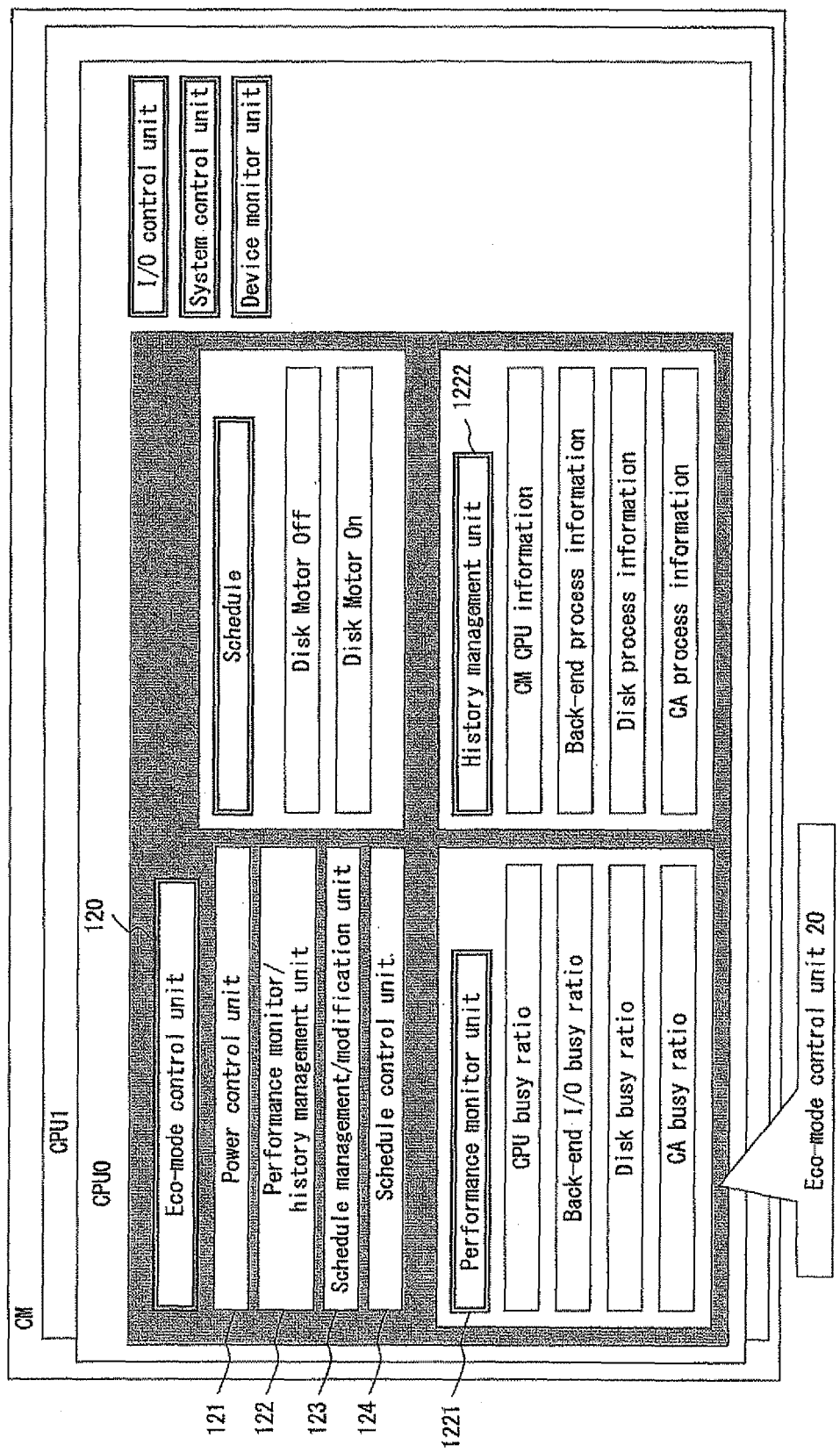
FIG. 39 shows the configuration of the eco-mode control unit in the second preferred embodiment of the present invention.

FIG. 39 shows configuration of the second preferred embodiment of the present invention in which power reduction control is applied to the disk array of the disk array device. The controller module CM comprises an I/O control unit for controlling I/O from a higher-order device, a system control unit for controlling the device and a device monitor unit for monitoring a device state. The second preferred embodiment of the present invention further comprises a power consumption control unit (hereinafter called "eco-mode control unit") for reducing power consumption. This eco-mode control unit comprises four control modules.

FIG. 39 shows the configuration of the eco-mode control unit 120. This eco-mode control unit 120 comprises a power control unit 121 installed on memory to which a specific CPU0 of a specific CM refers, a performance monitor/history management unit 122, a schedule management/modification unit 123 and a schedule control unit 124.

The power control unit 121 determines and performs a process to be actually performed in order to reduce power consumption. Specifically, the motor-off/on of a target disk is controlled.

The performance monitor/history management unit 122 performs motor-off control when detecting a disk that has not been operated at specific time intervals and motor-on control due to rapid load increase. The performance monitor/history management unit 122 monitors the operating state of a disk array and manages the operation state as history. In this case, the load states of CPU/CM/disk/RAID group/logical volume are monitored every day every hour for each module and a history is generated. The performance monitor/history management unit 122 comprises a performance monitor unit 1221 and a history management unit 1222. The performance monitor unit 1221 monitors a CPU busy ratio, a back-end I/O busy ratio, a disk busy ratio and a CA busy ratio. The history management unit 1222 manages the histories of CM CPU information, back-end process information, disk process information and CA process information.

The schedule management/modification unit 123 manages and modifies the schedule of disk motor-off/on in order to reduce power consumption. It generates an optimized schedule from schedule management instructed by a user and the history generated by the performance monitor/history management unit 122.

The schedule control unit 124 controls the process schedule of power consumption reduction. It controls the power control unit 121 in such a way as to reflect the optimized schedule on the basis of the schedule specified by a user and to always update the schedule at specific time intervals. In this case, a schedule means the time change of the access load of a disk being a component and a rank or busy ratio, which are described later.

A performance information collection control unit, which is described later, which operates in co-operation with the above-described control units is also provided. This control unit obtains the performance value of each component whose performance it monitors. There is information to obtain depending on each component and logical volume. The above-described performance values, schedules and performance histories are stored in the memory of CM and are referenced by each control unit.

Next, the normal operation of the disk array device is described.

A disk array has a configuration as shown in FIG. 40 in which redundancy is taken into consideration. For this purpose, a module for controlling the device is at least duplicated. A RAID group 521 which is composed of disks mounted on the device is composed of a plurality of disks. In the normal operation, since no care is paid to power consumption, all the mounted disks are operated in a motor-on state.

The power consumption reduction process (operation/schedule control) in the second preferred embodiment of the present invention is described. While normally operating the disk array, the performance monitor unit 1221 obtains performance information values, such as a busy ratio of each disk, RAID group (hereinafter called "RLU") and logical volume, the number of write/read commands, block size and the like, which are the indexes of their performance, at specific time intervals. These obtained performance information values are stored in the memory of CM.

Figure 41A:
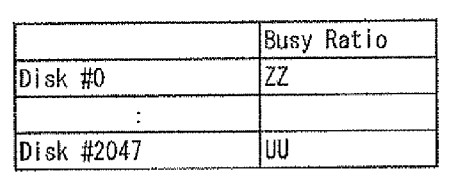

FIG. 41A shows the performance information values of disks #0~#2047 using their busy ratios. The higher its busy ratio is, the higher the performance information, that is, operation information of a disk or RLU is.

FIG. 41B shows the number of commands, block size and busy ratio of each of RLU #0~#1023. The busy ratio is calculated using the number of commands and the block size as parameters, which corresponds to the access frequency of a disk, in which the block size is taken into consideration.

The history management unit 1222 calculates the operation state of each disk, RAID group and logical volume based on the performance information values stored in the memory and stores them in the memory of the controller module CM as history information.

FIG. 42A shows the history of the busy ratio for each half a minute after 0 hour 0 minute, of disk #0. FIG. 42B shows the history of the operational rank for each half an hour at the same hour and minute, of RLU#0. In this case, the operational rank means the criterion of the degree of power saving reflected from the busy ratio or the amount of load based on the operation history, of each component. The order of ranks is A>B>C>D.

The schedule management/modification unit 123 generates the motor-off/on control schedule of a disk in the device from history information calculated on the basis of its operating state. When the schedule is already generated, the previous schedule and the schedule generated this time are collated and optimized.

FIG. 43 shows a schedule indicating the change history of the operational rank for each half an hour, of RLU#0. A field present indicates the average of operational ranks up to yesterday, and a field today indicates the operational rank of today. Then, the operational rank after today is calculated on the basis of the schedule of the operational rank in the field present and that in the field today is indicated in a field renewal as the updated operational rank calculated in the preferred embodiment of the present invention.

Furthermore, it is checked if there is a schedule set by a user. If there is one, the schedule is collated with the schedule by the schedule management/modification unit 123 and is optimized again.

FIG. 44A shows a schedule set by a user. For example, since January 1 through 3 are New Year holidays, it is determined that the disk array device is not operated and its operational rank is set D. For February 1 through 3 the operational rank is set C.

FIG. 44B shows a schedule obtained by collating the schedule generated by the schedule management/modification unit 123 shown in FIG. 43 with the schedule set by a user shown in FIG. 44A and optimizing it. Specifically, although the operational rank history in the schedule set by the schedule management/modification unit 123 is AABBC, the operational rank of February 1 in the schedule set by the user is C. Therefore, BBAB . . . is set as the operational rank history optimized taking this into consideration.

The schedule control unit 124 requests the power control unit 121 to control the motor-off/on of disks in the device based on the schedule generated by the schedule management/modification unit 123. Upon receipt of the request from the schedule control unit 124, the power control unit 121 determines the motor-off/on of which disk in the device should be controlled taking into the present operating state, collates it with configuration information (the disk configuration of RAID group, the using state of a hot spare disk and the like) presuming that redundancy is secured and power control is optimally exercised.

FIG. 45 shows the operational rank change history for each half an hour of February 1 of each RLU in the disk array device composed of RLU#0, RLU#1, RLU#2 and RLU#3. In the schedule shown in FIG. 45, since it is anticipated that RLU#0 and #1 are frequently accessed, they are not shifted to a power saving mode and are normally operated. It is anticipated that RLU#2 and #3 are fairly little accessed. Especially, it can be determined that RLU#3 is hardly accessed. In this case, determination on whether it can be operated in a power saving mode is started.

The control of RLU which can be shifted to a power saving mode varies depending on the type of a composing disk. If it is a near line disk, it is mainly used for backup in which quick response is not required.

The actual access state of a target RLU is checked and if access from the host is not confirmed within a monitor time set in the device, namely, if its load is 0, all the motors of disks composing the target RLU is switched off. This is because the motor-on of the disk can start after receiving host access and access can be received, since response is not emphasized in a near line disk compared with a fiber channel (FC) disk. Specifically, it is promptly operated in a timing that load occurs.

If the motors of all the composing disks are switched off when disks composing the target RLU are FC ones, there is a possibility that the motor-on of the disks is not complete within a response time and response delay looks to occur when host access is received in the motor-off state. Since response is emphasized when FC disks are used, it is common that they are basically ready to receive access.

Therefore, in the case of an FC disk, a power saving mode is selected taking into consideration the disk mounting state of the device and the RAID level of a target RLU and an optimal mode is selected taking into consideration the using environment/setting of the device. For example, the data of a most frequently used disk (RLU#1) is copied to a hot spare disk and the operation of the most frequently used disk is stopped.

Next, the case in which priority is given to reliability is described.

In this case, since the response time of access is insured and redundancy is ensured even when disk abnormality occurs, the device is operated in a state where no data is lost.

Figure 46:
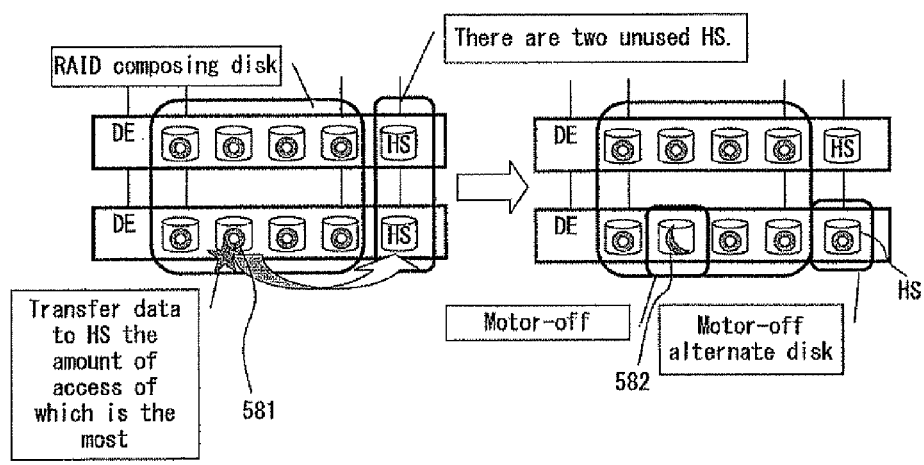
FIG. 46 shows the concept of power saving (No. 1).

FIG. 46 shows the case where a plurality of (two) hot spare disks (HS) is mounted in the RAID composition disk. In this case, the hot spare disks (HS) are effectively used. Its process determination is as follows.

The using states of hot spare disks (HS) in the device are checked and if there are two or more unused hot spare disks (HS), the busy ratio or rank of each disk composing the target RLU is read from history management data and, for example, a disk 581 the amount of access to which is the most is retrieved according to a flow described later.

Data is copied from the disk the amount of access to which is the most to a hot spare disk.

After the copy to the hot spare disk is completed, the motor of the copy source disk 582 is switched off.

The RLU in a power saving mode monitors update points on memory in a bit map format.

By stopping the disk the amount of access to which is the most, not only a power saving effect can be improved, but also the life of disks can be averaged.

Figure 47:
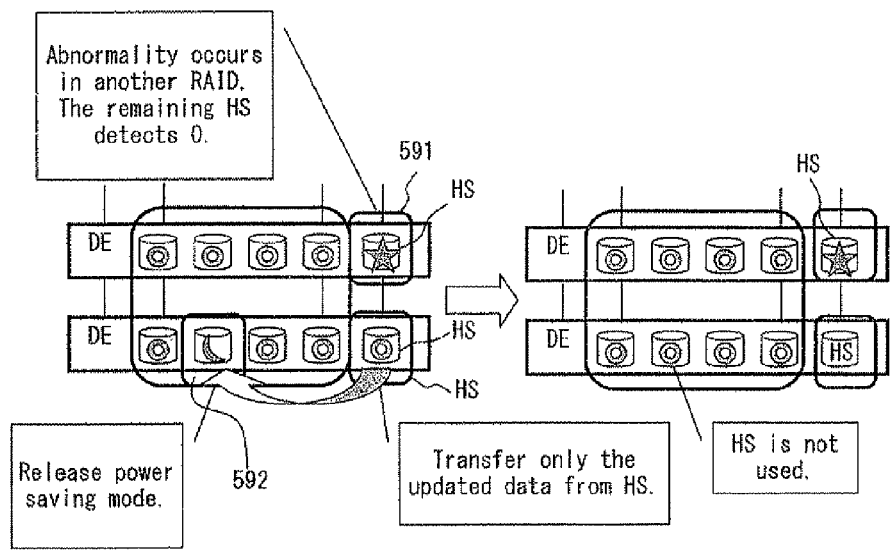
FIG. 47 shows the concept of power saving (No. 2).

FIG. 47 shows the case where disk abnormality (disk 591) occurs in another RLU during the above-described power saving mode and the case where the disk 592 returns from the power saving mode to a normal operation mode.

The motor of a disk (disk 592), which is switched off in a power saving mode is switched on.

After the motor-on is normally completed, only update points are written back from the hot spare disk (HS) in a bit map format.

After the completion of writing back, the hot spare disk (HS) is released from using state of the power saving mode.

Figure 48:
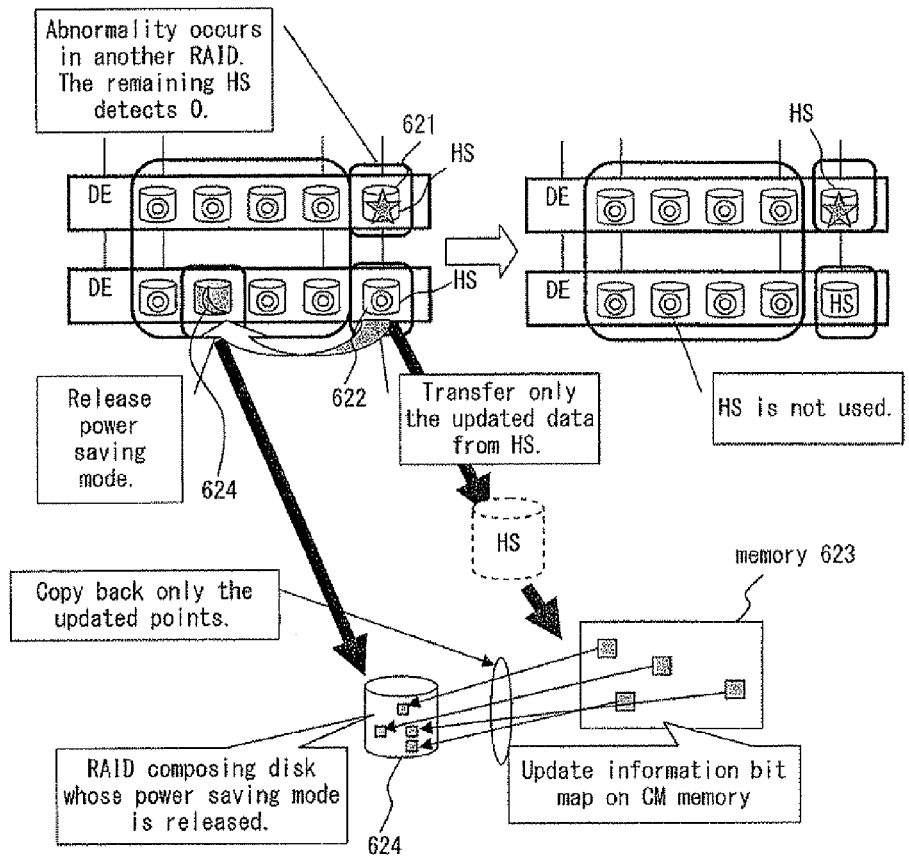
FIG. 48 shows how to restore the data of a power saving disk using bitmap.

FIG. 48 shows how to restore the data of the power saving disk using a bit map. When abnormality occurs in another RAID and a hot spare disk 621 is used, the eco-mode control unit in CM detects no remaining hot spare disk (HS). The copy destination hot spare disk 622 of the RAID in a power saving mode stores the data of the update points on the memory 623 of the CM as update information bit map.

The data of only the update points is copied back from the hot spare disk 622 to a switched-off disk 624, based on an update information bit map on the memory 623 of the CM. Thus, the disk array becomes RAID composition in which the power saving mode is released and returns to the normal operation. When the device returns from the power saving mode to the normal operation mode, similarly, the data of only the update points is copied back from the hot spare disk 622 to a switched-off disk 624, based on an update information bit map on the memory 623 of the CM and the device returns to the normal operation.

FIG. 49 shows the case where a plurality of hot spare disks is not mounted on a target device.

If the RAID level is 6, even when the motor of one of the composing disks is switched off, redundancy can be secured by the composing disks whose motors are switched on. Therefore, the using states of hot spare disks (HS) in the device are checked and if the RAID level of the target RLU is 6 even when there is less than two unused hot spare disk, the device is shifted to a power saving mode.

A disk 631 the amount of access to which is the most of disks composing a target RLU is retrieved from history management data.

The motor of the disk 631 the amount of access to which is the most is switched off.

The RLU in a power saving mode monitors update points in a bit map format on the memory of CM.

Figure 50:
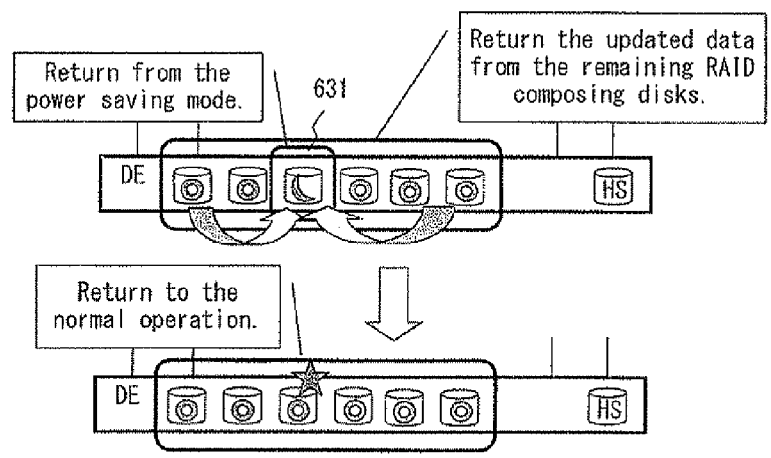
FIG. 50 shows the concept of normal operation return.

FIG. 50 shows the case where disk abnormality occurs in another RLU during the above-described power saving mode and the case where the disk returns from the power saving mode to a normal operation mode.

The motor of a disk 631, which is switched off in a power saving mode is switched on.

After the motor-on is normally completed, only update points are written back from the composing disk whose motor was switched on during the power saving mode in a bit map format.

If the RAID level is other than 6, the device is not shifted to a power saving mode since redundancy is lost the motor of one disk is switched off.

Next, the case where priority is given to schedule is described with reference to FIG. 51.

The device is set in such a way that the power of a specific disk can be saved, namely, the disk can be switched off according to a flow described later by giving priority to a schedule set in advance, using a schedule to which inside history information is added and using the rank or busy ratio of RLU. In the time range of the schedule where access is rare, the motors of all the composing disks are switched off like a near line disk and when access is anticipated, the motor of one of the composing disks is switched off like an FC disk in the case where priority is given to reliability.

Since it is anticipated that RLU#0 and #1 are frequently accessed they are not shifted to a power saving mode and are normally operated.

Since RLU#2 is not frequently accessed but sometimes accessed, the motor of one of the composing disks is switched off.

Since it is anticipated that RLU#3 becomes never accessed, it is monitored for a specific time after it becomes never accessed and the motors of all the composing disks are switched off after confirming that there is no access to it. When there is some access even after monitoring it for the specific time, the motor of one of the composing disks is switched off and the device is shifted to a power saving mode.

Next, the detailed power consumption control process is described. The following disk array device in the second preferred embodiment of the present invention not only saves the power of disks, but also saves the power of controller modules and CPU as in the first preferred embodiment.

Figure 52:
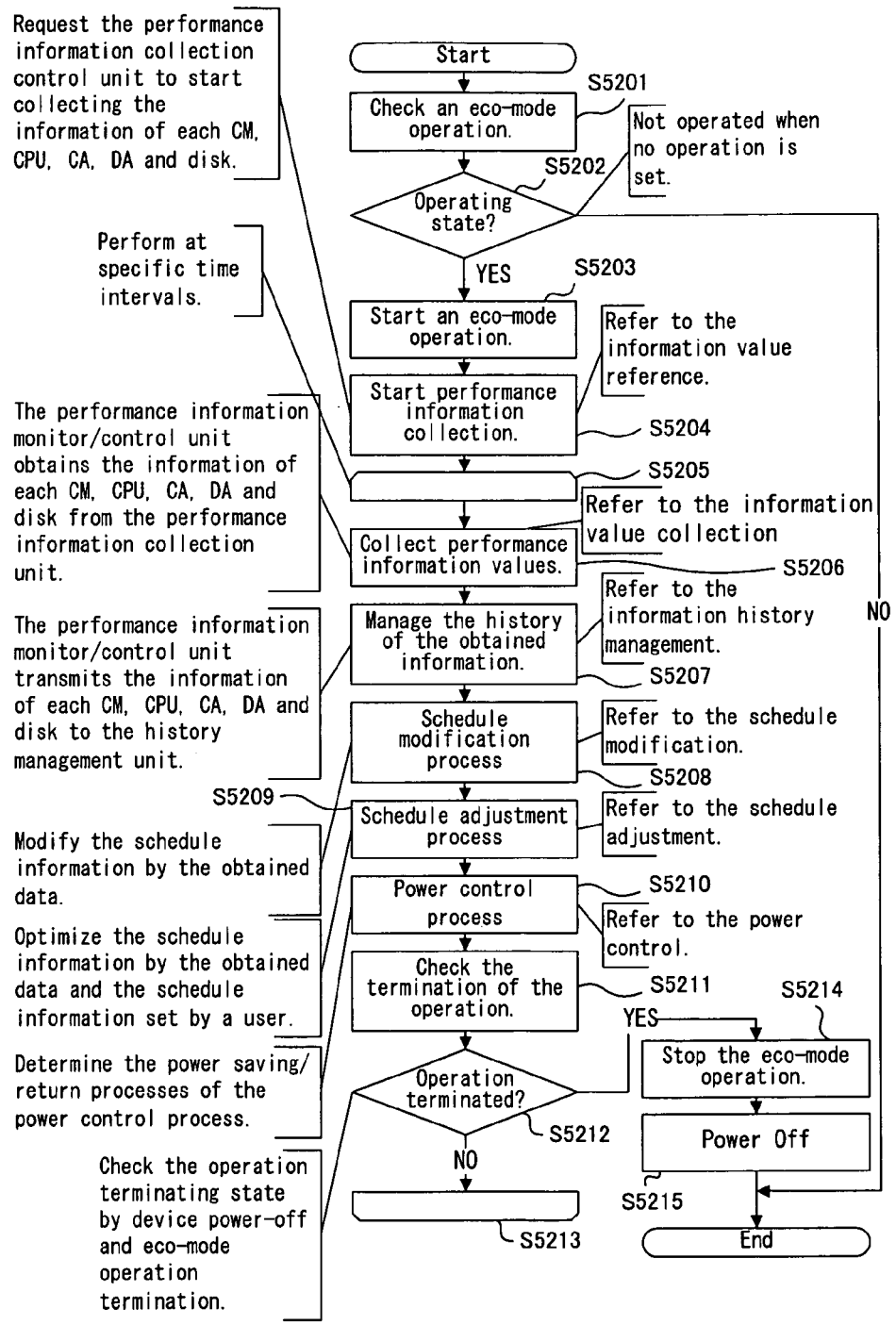
FIG. 52 is the flowchart of the power consumption control process of the disk array device in the second preferred embodiment of the present invention.

FIG. 52 is the flowchart of the power consumption control process of the disk array device in the second preferred embodiment of the present invention.

In step S5201 it is checked if the disk array can be operated in an eco-mode. The eco-mode means a mode for controlling power consumption.

In step S5202, if the disk array can be operated in an eco-mode, the flow proceeds to step S5203. If it cannot be operated in an eco-mode because no eco-mode is set and so on, the process is terminated.

In step S5203 an eco-mode operation is started.

In step S5204 the performance information collection unit is requested to start the performance information collection of each CM, CPU, CA, DA and disk. The detailed performance information collection start process is described later.

Step S5205 is the beginning of a loop and is started at specific time intervals.

In step S5206 the performance monitor/history management unit 122 obtains information about each CM, CPU, CA, DA and disk for the performance information collection unit. The detailed performance information value acquisition process is described later.

In step S5207 the performance monitor/history management unit 122 manages the obtained information as a history. The detailed history management process is described later.

In step S5208 the schedule management/modification unit 123 modifies and manages a schedule based on the obtained data. The detailed schedule modification process is described later.

In step S5209 the schedule based on the obtained data generated in step S5208 and the schedule based on the schedule set by a user are optimized. The detailed schedule adjustment process is described later.

In step S5210 the power control processing unit 121 performs the power saving process of the power control process/the determination process of the return process. The detailed power control process is described later.

In step S5211 it is checked if the eco-mode operation should be terminated.

In step S5212 if the eco-mode operation is not terminated, the flow proceeds to step S5213. If it is terminated, the flow proceeds to step S5214.

Step S5213 is the end of the loop, corresponding to step S5205.

In step S5214 the eco-mode operation is terminated.

In step S5215, if the device is switched off, the disk array is switched off.

Figure 53:
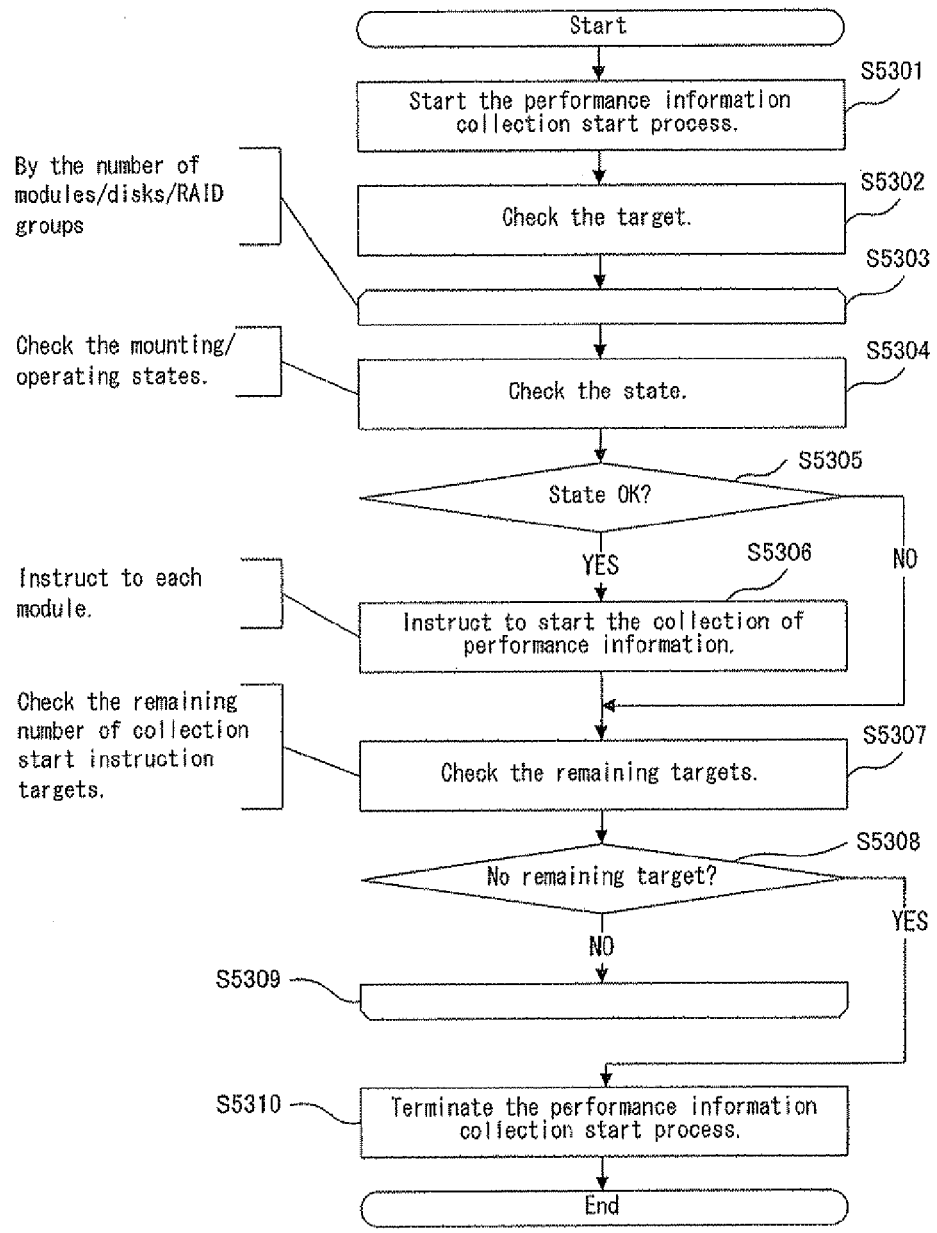
FIG. 53 is the detailed flowchart of a performance information collection starting process.

FIG. 53 is the detailed flowchart of the performance information collection starting process (step S5204).

In step S5301 the performance information collection process is started.

In step S5302 the target of the performance information collection process (for example, CM, CPU, CA, DA, disk, etc.) is checked.

Step S5303 is the beginning of a loop and is repeated by the number of modules, disks or RAID groups.

In step S5304 the mounting state and operating state of the target are checked.

In step S5305, if a module is in a normal state, the flow proceeds to step S5306. If it is not in a normal state because the module does not operate and so on, the flow proceeds to step S5307.

In step S5306 the performance information collection unit is instructed to start the performance information collection of the module.

In step S5307 it is checked if there remains a module that is not starting performance information collection.

In step S5308, if there is no remaining module, the flow proceeds to step S5309. If there is a remaining module, the flow proceeds to step S5310.

Step S5309 is the end of the loop, corresponding to step S5303.

In step S5310 the performance information collection process is terminated.

Figure 54:
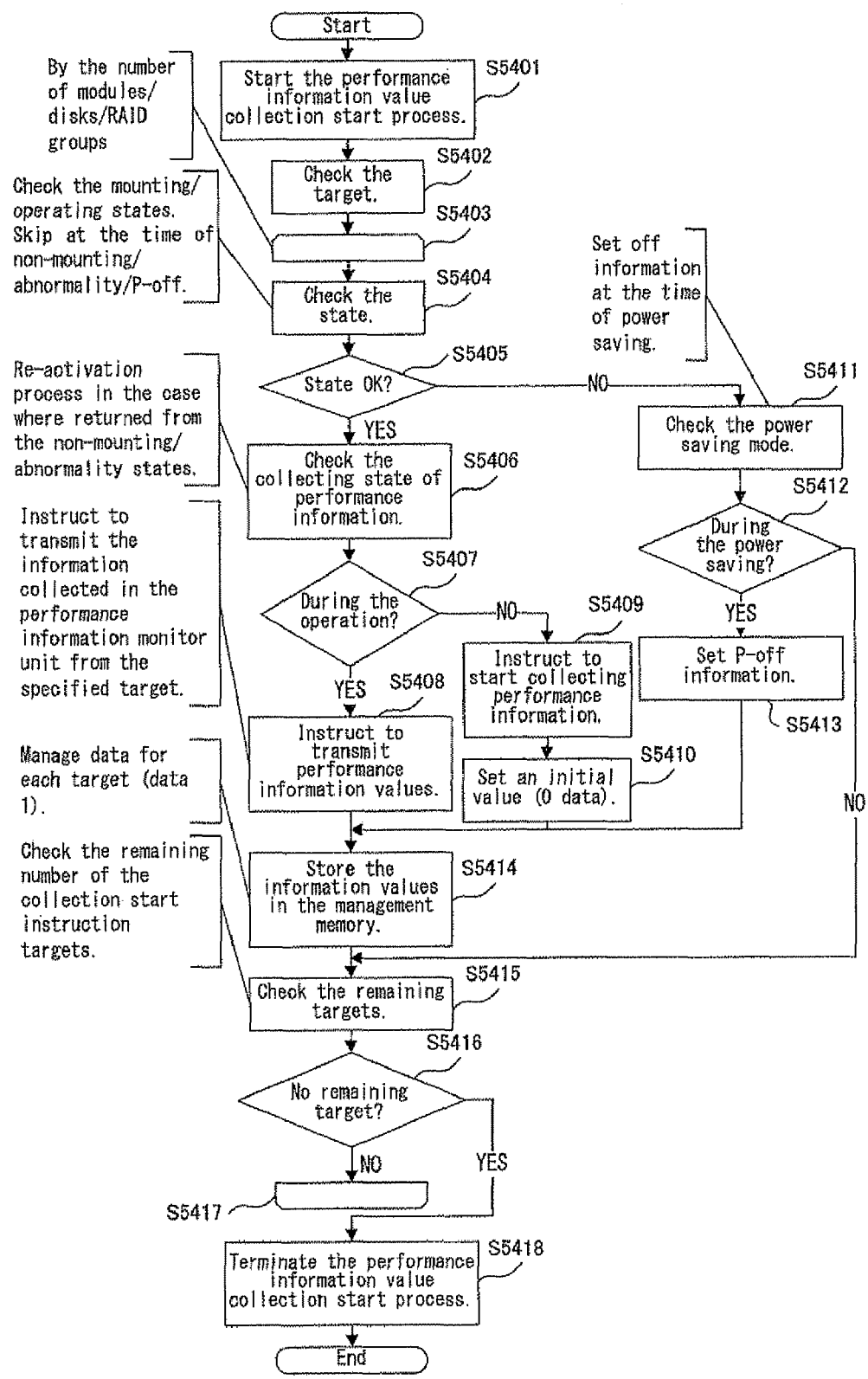
FIG. 54 is the detailed flowchart of a performance information value collection process.

FIG. 54 is the detailed flowchart of the performance information value collection process (step S5206).

In step S5401 the performance information value collection process is started.

In step S5402 the check of a target is started.

Step S5403 is the beginning of a loop and is repeated by the number of modules, disks or RAID groups.

In step S5404 the mounting state and operating state of the target are checked.

In step S5405, if the state of the target is OK, the flow proceeds to step S5406. If the state of the target is NG because the target is not mounted yet, it fails, its power is switched off or the like, the flow proceeds to step S5411.

In step s5406 it is checked if the performance information of the module is collected.

In step S5407, if the performance information is collected, the flow proceeds to step S5408. If it is not collected, the flow proceeds to step S5409.

In step S5408 it is instructed to transmit the collected performance information value to the performance monitor/history management unit 122.

In step S5409 the performance information collection unit is instructed to start the performance information collection of the module.

In step S5410 an initial value is set.

In step S5411 it is checked if the target is in a power saving mode. The power saving mode means a state where a target is not used to save power consumption instead of being not used due to a failure or being not mounted.

In step S5412, if the target is in a power saving mode, the flow proceeds to step S5413. If it is not in a power saving mode, the flow proceeds to step S5415.

In step S5413 information that the target is in a power saving mode (P-off information) is set.

In step S5414 the performance information value of the module is stored in memory.

In step S5415 it is checked if there remains a target that does not collect the performance information value although the performance information collection start is instructed.

In step S5416, if there remains a target that does not collect the performance information value although the performance information collection start is instructed, the flow proceeds to step S5417. If there remains no such target, the flow proceeds to step S5418.

Step S5417 is the end of the loop, corresponding to step S5403.

In step S5418 the performance information value collection process is terminated.

FIG. 55 is the detailed flowchart of the history management process (step S5207).

In step S5501 the history management process of performance information is started.

In step S5502 short-time history (for example, 0~30 minutes) is updated on the basis of the obtained performance information.

Step S5503 is the beginning of a loop and is repeated by the number of modules, disks or RAID groups.

In step S5504 the updated history data is stored in memory for each module, disk or RAID group.

In step S5505 the present operational rank is updated on the basis of the updated history data and is stored. The present operational rank is calculated using a schedule calculation process described later.

Step S5506 is the end of the loop, corresponding to step S5503.

In step S5507 the history of the main is updated. In the history of the main, for example, history information for 24 hours at intervals of half an hour is stored.

In step S5508 it is checked that it is its update time. If it is its update time, the flow proceeds to step S5509. If it is not its update time yet, the flow proceeds to step S5512.

Step S5509 is the beginning of another loop and is repeated by the number of modules, disks or RAID groups.

In step S5510 the operational rank updated by the short-time history update process is stored in the history information of the hour of the day.

Step S5511 is the end of the loop, corresponding to step S5509.

In step S5512 the history management process of performance information is terminated.

FIG. 56 is the flowchart of the schedule calculation process (steps S5505, S5708 and S5812). This process is used to calculate the present operational rank, the average of operational ranks and the like, based on a plurality of operational ranks.

In step S5601 the schedule calculation process is started.

Step S5602 is the beginning of a loop and is repeated by the number of modules.

In step S5603 an average operational rank calculation process is started.

Step S5604 is the beginning of another loop and is repeated by the number of obtained data.

In step S5605, if the operational rank of the obtained data is A, the flow proceeds to step S5606. If it is B, the flow proceeds to step S5608. If it is C, the flow proceeds to step S5610. If it is DB, the flow proceeds to step S5612.

In step S5606 a rank is numerically expressed. In the case of rank A, its adding point is 1.

In step S5607, 1 is added to the number of ranks A in the evaluation value for managing the number of each rank.

In step S5608 a rank is numerically expressed. In the case of rank B, its adding point is 2.

In step S5609 1 is added to the number of ranks B in the evaluation value for managing the number of each rank.

In step S5610 a rank is numerically expressed. In the case of rank C, its adding point is 3.

In step S5611, 1 is added to the number of ranks C in the evaluation value for managing the number of each rank.

In step S5612 a rank is numerically expressed. In the case of rank D, its adding point is 4.

In step S5613, 1 is added to the number of ranks D in the evaluation value for managing the number of each rank.

In step S5614 all the numerically expressed values are added to their rank numeric values.

Step S5615 is the end of the loop corresponding to step S5602.

In step S5616 an average is calculated by dividing the total of all the added rank numeric values by the number of obtained data.

In step S5617, if the average is 1, the flow proceeds to step S5618. If it is 1~1.99, the flow proceeds to step S5619. If it is 2~2.99, the flow proceeds to step S5622. If it is 3~3.99, the flow proceeds to step S5625.

In step S5618 it is ranked A.

In step S5619 it is determined which it is ranked, A or B. It is determined by comparing the weighted number of ranks A and those of ranks B, C and D. It is assumed that the weight of each of ranks A and B, that of rank C, that of rank D are 1, 1.25 and 1.5, respectively. Then, the number of rank A and "the number of ranks B+the number of ranks C×1.25+the number of ranks D×1.5" are compared. If the number of ranks A is larger, it is determined that rank A is larger. If "the number of ranks B+the number of ranks C×1.25+the number of ranks D×1.5" is larger, it is determined that rank B is larger.

In step S5620, if rank A is larger, the flow proceeds to step S5618. If rank B is larger, the flow proceeds to step S5621.

In step S5621 it is ranked B.

In step S5622 it is determined which it is ranked, B or C. It is determined by comparing the weighted number of ranks A and B and those of ranks C and D. It is assumed that the weight of each of ranks B and C and that of each of ranks A and D are 1 and 1.25, respectively. Then, "the number of ranks A×1.25+the number of ranks B" and "the number of ranks C+the number of ranks D×1.25" are compared. If "the number of ranks A×1.25+the number of ranks B" is larger, it is determined that rank B is larger. If "the number of ranks C+the number of ranks D×1.25" is larger, it is determined that rank C is larger.

In step S5623, if rank B is larger, the flow proceeds to step S5621. If rank C is larger, the flow proceeds to step S5624.

In step S5624 it is ranked C.

In step S5625 it is determined which it is ranked, C or D. It is determined by comparing the weighted number of ranks A, B and C and that of rank D. It is assumed that the weight of each of ranks C and D and that of rank B and that of rank A are 1, 1.25 and 1.5, respectively. Then, "the number of ranks A×1.5+the number of ranks B×1.25+the number of ranks C" and the number of ranks D are compared. If "the number of ranks A×1.5+the number of ranks B×1.25+the number of ranks C" is larger, it is determined that rank C is larger. If the number of ranks D is larger, it is determined that rank D is larger.

In step S5626, if rank C is larger, the flow proceeds to step S5624. If rank D is larger, the flow proceeds to step S5627.

In step S5627 it is ranked D.

In step S5628 the calculated rank is set.

In step S5629 the schedule calculation process is terminated.

Figure 57:
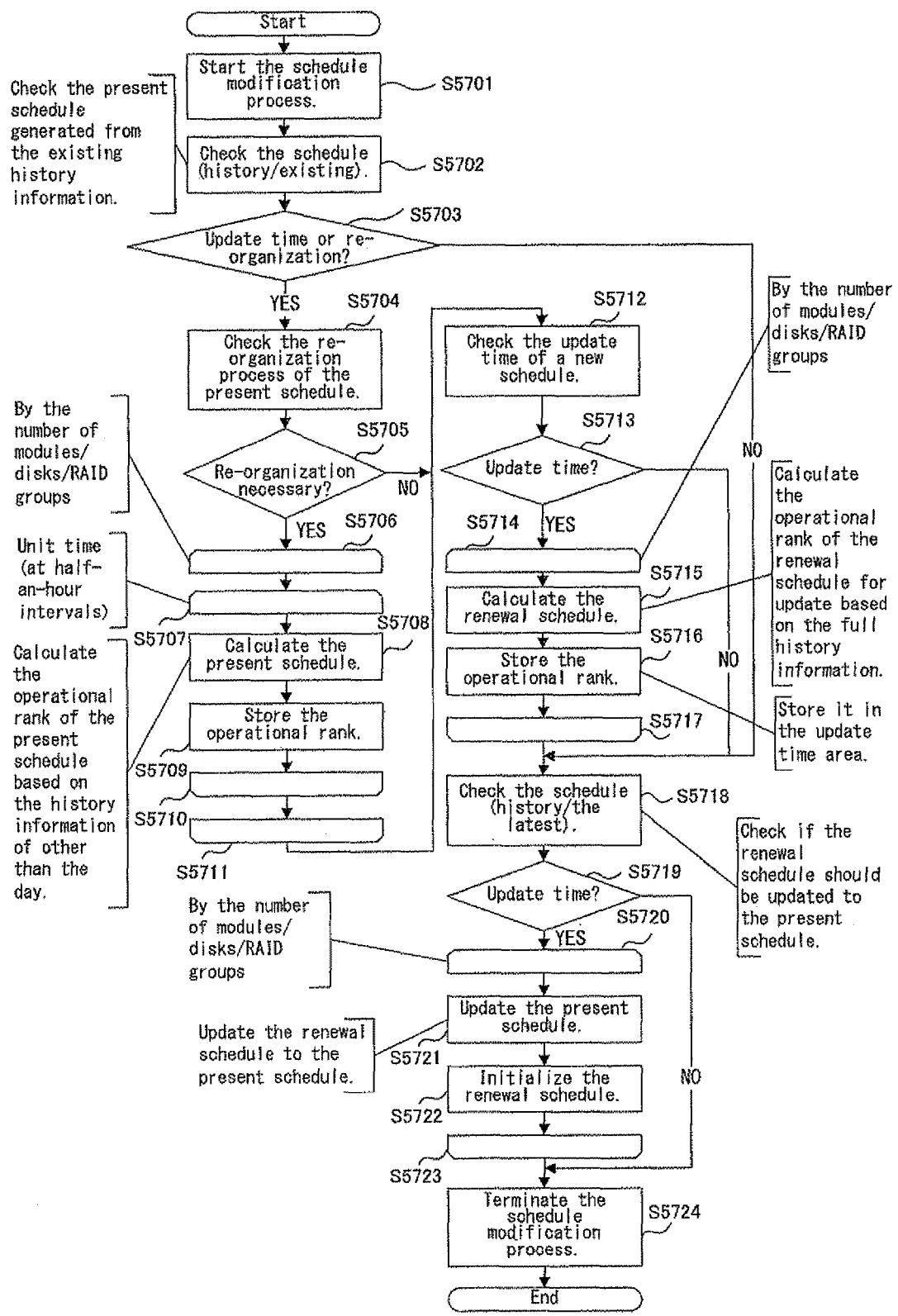
FIG. 57 is the detailed flowchart of a schedule modification process.

FIG. 57 is the detailed flowchart of the schedule modification process (step S5208).

In step S5701 the schedule modification process is started.

In step S5702 the present schedule generated from the existing history information is checked.

In step S5703, if it is its update time or the schedule is re-organized, the flow proceeds to step S5704. If it is neither its update time nor the schedule is re-organized, the flow proceeds to step S5718.

In step S5704 it is checked if the present schedule must be re-organized.

In step S5705, if the present schedule must be re-organized, the flow proceeds to step S5706. If it is not re-organized, the flow proceeds to step S5712.

Step S5706 is the beginning of a loop and is repeated by the number of modules, disks or RAID groups.

In step S5707 is the beginning of another loop and is repeated for a unit time (for example, half an hour).

In step S5708 the present schedule is calculated.

In step S5709 the calculated operational rank is stored.

Step S5710 is the end of the loop, corresponding to step S5707.

Step S5711 is the end of the loop, corresponding to step S5706.

In step S5712 the update time of a new schedule is checked.

In step S5713, if it is its update time, the flow proceeds to step S5714. If it is not its update time, the flow proceeds to step S5718.

Step S5714 is the beginning of another loop and is repeated by the number of modules, disks or RAID groups.

In step S5715 an operational rank as a renewal schedule for update is calculated on the basis of the whole history information. The operational rank as a renewal schedule is calculated using the above-described schedule calculation process.

In step S5716 the calculated operational rank is stored in an update time area.

Step S5717 is the end of the loop, corresponding to step S5714.

In step S5718 it is checked if the renewal schedule should be updated to the present schedule.

In step S5719, if it is its update time, the flow proceeds to step S5720. If it is not its update time, the flow proceeds to step S5724.

Step S5720 is the beginning of another loop and is repeated by the number of modules, disks or RAID groups.

In step S5721 the renewal schedule is updated to the present schedule.

In step S5722 the renewal schedule is initialized.

Step S5723 is the end of the loop, corresponding to step S5720.

In step S5724 the schedule modification process is terminated.

Figure 58:
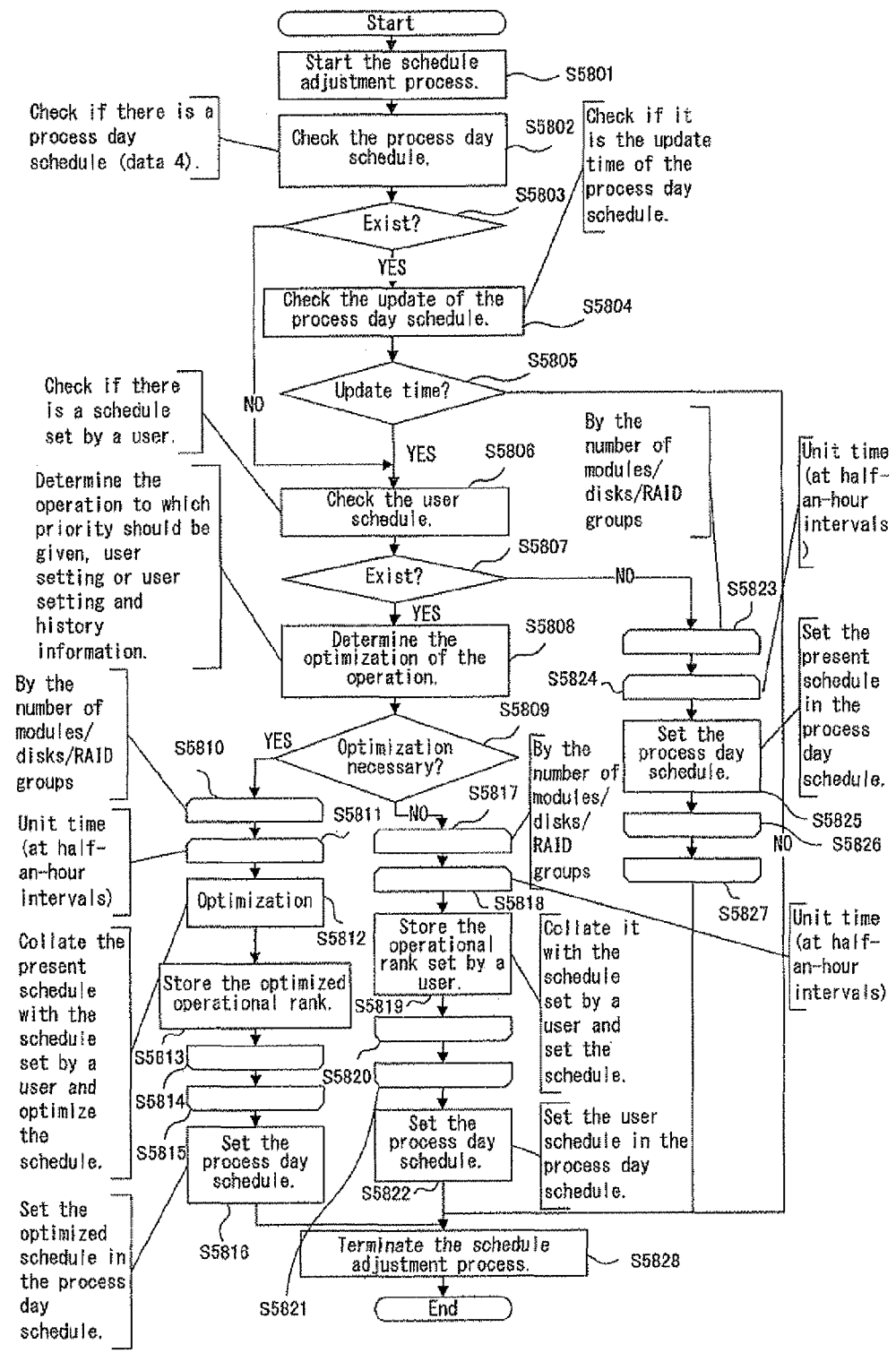
FIG. 58 is the detailed flowchart of a schedule adjustment process.

FIG. 58 is the detailed flowchart of the schedule adjustment process (step S5209).

In step S5801 the schedule adjustment process is started.

In step S5802 it is checked if there is a process day schedule.

In step S5803, if there is a process day schedule, the flow proceeds to step S5804. If there is no process day schedule, the flow proceeds to step S5806.

In step S5804 it is checked if it is the update time of the process day schedule.

In step S5805, if it is its update time, the flow proceeds to step S5806. If it is not its update time, the flow proceeds to step S5828.

In step S5806 it is checked if there is a user schedule.

In step S5807, if there is a user schedule, the flow proceeds to step S5808. IF there is no user schedule, the flow proceeds to step S5823.

In step S5808 it is determined to which priority is given in the operation of power consumption control, user setting or combination of user setting and history information.

In step S5809, if it is determined that optimization is necessary, the flow proceeds to step S5810. If it is not determined that optimization is necessary, the flow proceeds to step S5817.

Step S5810 is the beginning of a loop and is repeated by the number of modules, disks or RAID groups.

Step S5811 is the beginning of another loop and is repeated for a unit time.

In step S5812 the present schedule and the schedule set by a user is collated to calculate an optimized operational rank. The optimized operational rank is calculated using the above-described schedule calculation process.

In step S5813 the optimized operational rank is stored.

Step S5814 is the end of the loop, corresponding to step S5811.

Step S5815 is the end of the loop, corresponding to step S5810.

In step S5816 the optimized schedule is set in the process day schedule.

Step S5817 is the beginning of another loop and is repeated by the number of modules, disks or RAID groups.

Step S5818 is the beginning of another loop and is repeated for a unit time.

In step S5819 the operational rank set by a user is stored.

Step S5820 is the end of the loop, corresponding to step S5817.

Step S5821 is the end of the loop, corresponding to step S5818.

In step S5822 the schedule set by a user is set in the process day schedule.

Step S5823 is the beginning of another loop and is repeated by the number of modules, disks or RAID groups.

Step S5824 is the beginning of another loop and is repeated for a unit time.

In step S5825 the present schedule is set in the process day schedule.

Step S5826 is the end of the loop, corresponding to step S5824.

Step S5827 is the end of the loop, corresponding to step S5823.

In step S5828 the schedule adjustment process is terminated.

Figure 59:
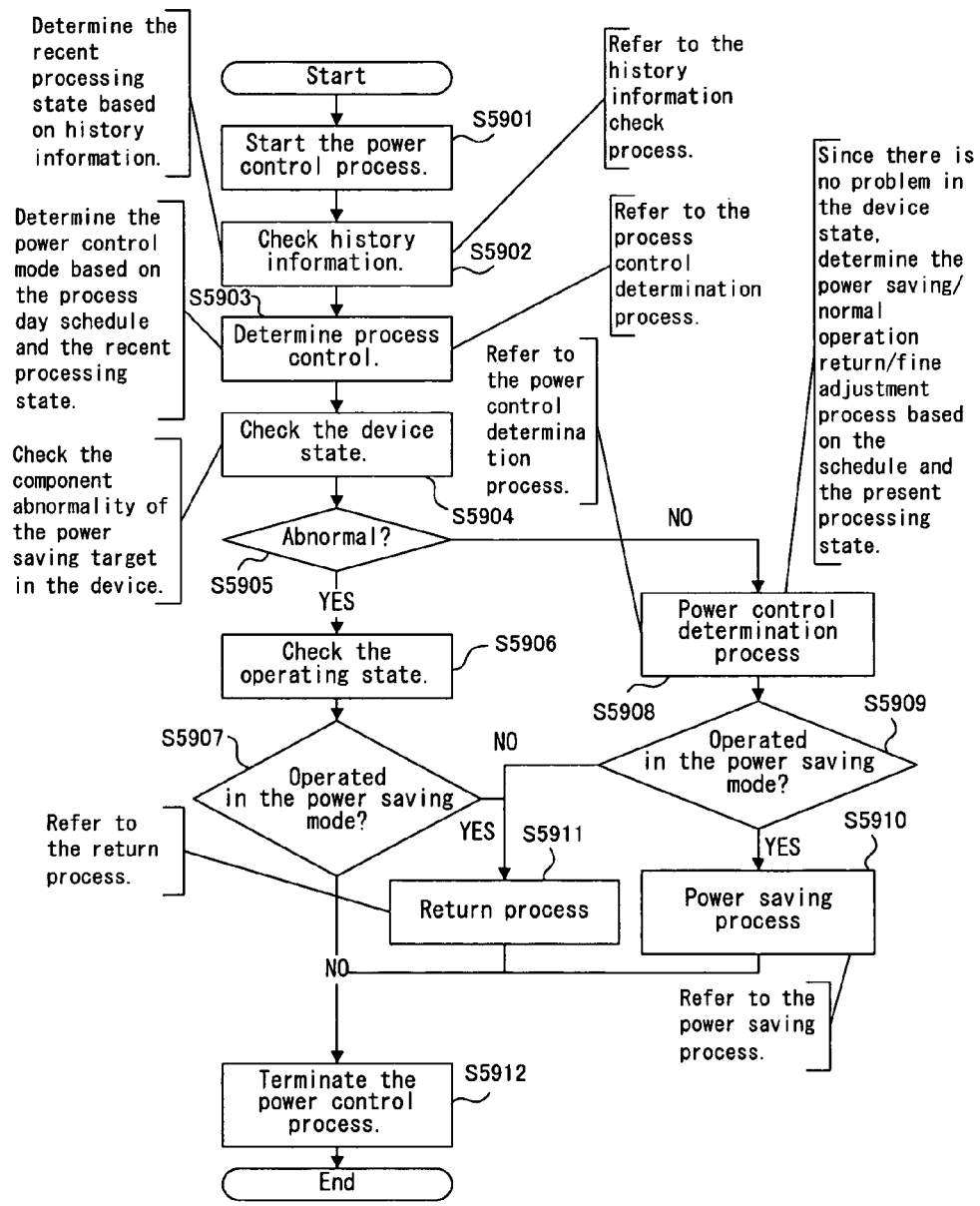
FIG. 59 is the detailed flowchart of a power control process.

FIG. 59 is the detailed flowchart of the power control process (step S5210).

In step S5901 the power control process is started.

In step S5902 history information is checked and its recent processing state is determined. The detailed history information check process is described later.

In step S5903 a power control mode is determined on the basis of the process day schedule and the recent processing state. The detailed process control determination process for determining a power control mode is described later.

In step S5904 it is checked if there is the component abnormality of a power saving target in the device.

In step S5905, if there is such abnormality, the flow proceeds to step S5906☐ If there is no such abnormality, the flow proceeds to step S5909☐

In step S5906 the present operating state is checked.

In step S5907 it is determined whether the device is operated in a power saving mode, by referring to the present operational rank of the entire device. If it is operated in such a mode, the flow proceeds to step S5911. If it is not operated in such a mode, the flow proceeds to step S5912.

In step S5908 since there is no problem in the device state, which should be performed, power saving, normal operation return or fine adjustment on the basis of the schedule and present processing state.

In step S5909, if the device is operated in a power saving mode, the flow proceeds to step S5910. If it is not operated in a power saving mode, the flow proceeds to step S5911.

In step S5910 a power saving process is performed. The detailed power saving process is described later.

In step S5911 the return process is performed. The detailed return process is described later.

In step S5912 the power control process is terminated.

Figure 60:
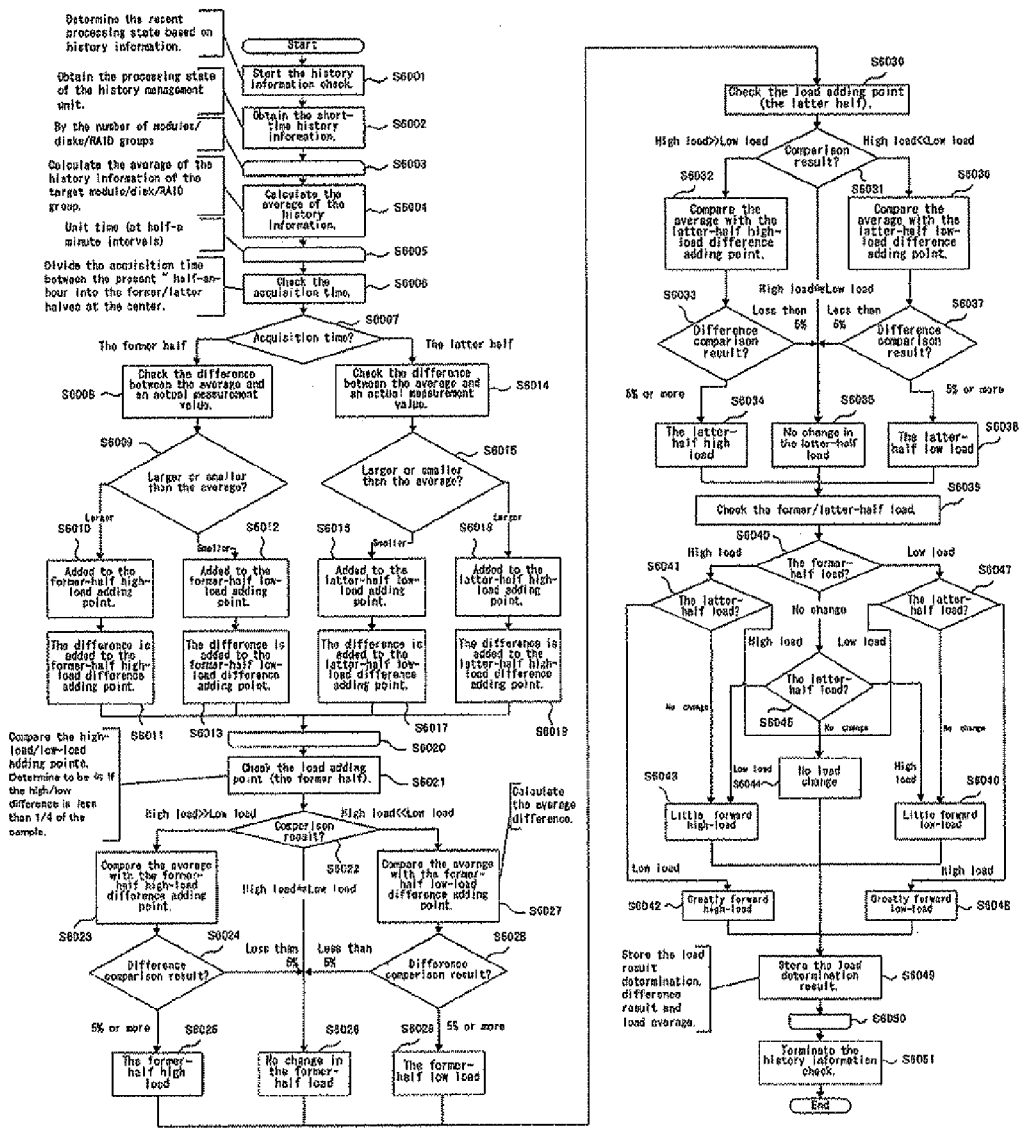
FIG. 60 is the detailed flowchart of a history information check process.

FIG. 60 is the detailed flowchart of the history information check process (step S5902).

In step S6001 the history information check process for determining a recent processing state, based on history information is started.

In step S6002 short time history information is obtained by obtaining the processing state of the history management unit.

Step S6003 is the beginning of a loop and is repeated by the number of modules, disks or RAID groups.

In step S6004 the history information average of a target module, disk or RAID group is calculated.

Step S6005 is the beginning of a loop and is repeated for a unit time (for example, half a minute).

In step S6006 the acquisition time of an actual measurement value in history information is checked.

In step S6007, if the actual measurement value is obtained in the former half of the time, the flow proceeds to step S6008. If it is obtained in its latter half, the flow proceeds to step S6015. For example, if it is obtained half an hour ago, the former half is between the present time and 15 minutes ago and the latter half is between 15 and 30 minutes ago.

In step S6008 a difference between the average and the actual measurement value is checked.

In step S6009, if the actual measurement value is larger than the average, the flow proceeds to step S6010. If the actual measurement value is smaller than the average, the flow proceeds to step S6012.

In step S6010, An evaluation value indicating that the former half is highly loaded (the former high-load adding point) is added.

In step S6011 the difference is added to the former high-load difference adding point being one evaluation value.

In step S6012 an evaluation value indicating that the former half is low loaded (the former low-load adding point) is added.

In step S6013 the difference is added to the former low-load adding difference point being one evaluation value.

In step S6014 a difference between the average and the actual measurement value is checked.

In step S6015, if the actual measurement value is larger than the average, the flow proceeds to step S6018. If the actual measurement value is smaller than the average, the flow proceeds to step S6016.

In step S6016, an evaluation value indicating that the latter half is low loaded (the latter low-load adding point) is added.

In step S6017 the difference is added to the latter low-load difference adding point being one evaluation value.

In step S6018 an evaluation value indicating that the latter half is highly loaded (the latter high-load adding point) is added.

In step S6019 the difference is added to the latter high-load difference adding point being one evaluation value.

Step S6020 is the end of the loop, corresponding to step S6005.

In step S6021 the former high-load adding point and the former low-load adding point are compared.

In step S6022, if the former high-load adding point is larger than the former low-load adding point, the flow proceeds to step S6023. If the former high-load adding point is smaller than the former low-load adding point, the flow proceeds to step S6027. If the former high-load adding point is almost equal to the former low-load adding point or a difference between the former high-load adding point and the former low-load adding point is less than 25% of the number of data, the flow proceeds to step S6026.

In step S6023 an average calculation differential value is calculated and compared with the former high-load difference adding point.

In step S6024 its difference with the average calculation differential value is 5% or more, the flow proceeds to step S6025. If the difference is less than 5%, the flow proceeds to step S6026.

In step S6025 it is set that the former half is highly loaded.

In step S6026 it is set that there is no change in the load of the former half.

In step S6027 an average calculation differential value is calculated and compared with the former low-load difference adding point.

In step S6028 its difference with the average calculation differential value is 5% or more, the flow proceeds to step S6025. If the difference is less than 5%, the flow proceeds to step S6026.

In step S6029 it is set that the former half is low loaded.

In step S6030 the latter high-load adding point and the latter low-load adding point are compared.

In step S6031, if the latter high-load adding point is larger than the latter low-load adding point, the flow proceeds to step S6032. If the latter high-load adding point is smaller than the latter low-load adding point, the flow proceeds to step S6036. If the latter high-load adding point is almost equal to the latter low-load adding point or a difference between the latter high-load adding point and the latter low-load adding point is less than 25% of the number of data, the flow proceeds to step S6035.

In step S6032 an average calculation differential value is calculated and compared with the latter high-load difference adding point.

In step S6033 its difference with the average calculation differential value is 5% or more, the flow proceeds to step S6034. If the difference is less than 5%, the flow proceeds to step S6035.

In step S6034 it is set that the latter half is highly loaded.

In step S6035 it is set that there is no change in the load of the latter half.

In step S6036 an average calculation differential value is calculated and compared with the latter low-load difference adding point.

In step S6037 its difference with the average calculation differential value is 5% or more, the flow proceeds to step S6038. If the difference is less than 5%, the flow proceeds to step S6035.

In step S6038 it is set that the latter half is low loaded.

In step S6039 the load of the former half and that of the latter half are checked.

In step S6040, if the load of the former half is high, the flow proceeds to step S6041. If there is no change in the load of the former half, the flow proceeds to step S6045. If the load of the former half is low, the flow proceeds to step S6047.

In step S6041 if the load of the latter half is low, the flow proceeds to step S6042. If there is no change in the load of the latter half, the flow proceeds to step S6043. If the load of the latter half is high, the flow proceeds to step S6044.

In step S6042 it is determined that the load tends to increase greatly toward high load.

In step S6043 it is determined that the load tends to increase little toward high load.

In step S6044 it is determined that the load does not tend to change.

In step S6045, if the load of the latter half is low, the flow proceeds to step S6043. If there is no change in the load of the latter half, the flow proceeds to step S6044. If the load of the latter half is high, the flow proceeds to step S6046.

In step S6046 it is determined that the load tends to decrease from little toward low load.

In step S6047, if the load of the latter half is low, the flow proceeds to step S6044. If there is no change in the load of the latter half, the flow proceeds to step S6046. If the load of the latter half is high, the flow proceeds to step S6048.

In step S6048 it is determined that the load tends to decrease from low load greatly toward low load.

In step S6049 the load result determination, the difference result and the load average are stored.

Step S6050 is the end of the loop, corresponding to step S6003.

In step S6051 the history information check process is terminated.

Figure 61:
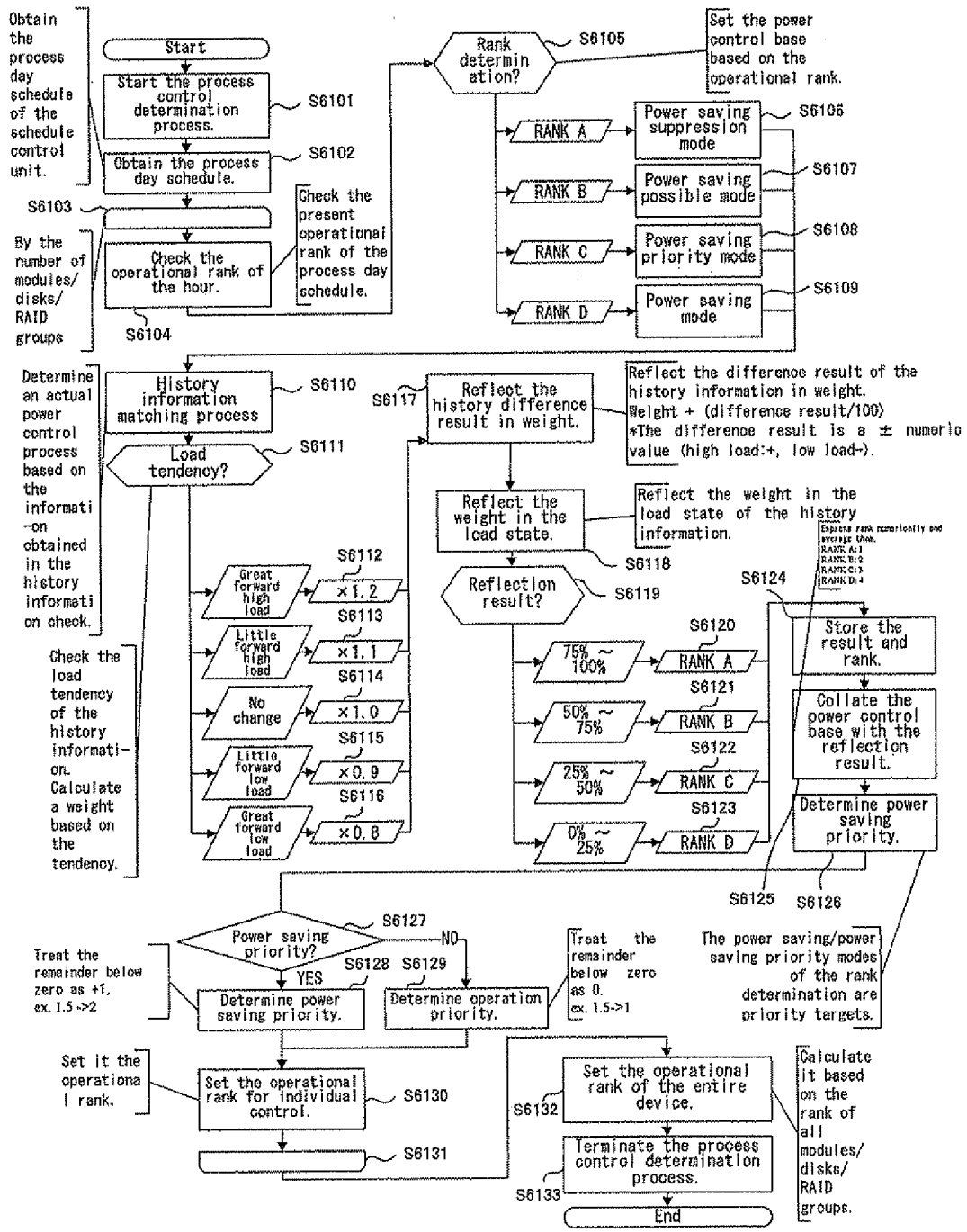
FIG. 61 is the detailed flowchart of a process control determination process.

FIG. 61 is the detailed flowchart of the process control determination process (step S5903).

In step S6101 the process control determination process is started.

In step S6102 the process day schedule of the schedule control unit 124 is obtained.

Step S6103 is the beginning of a loop and is repeated by the number of modules, disks or RAID groups.

In step S6104 the present time operational rank of the process day schedule is checked.

In step S6105, if the present time operational rank of the process day schedule is A, the flow proceeds to step S6106. If the rank is B, the flow proceeds to step S6107. If the rank is C, the flow proceeds to step S6108. If the rank is D, the flow proceeds to step S6109.

In step S6106 it is determined that the base of power control is the power saving suppression mode.

In step S6107 it is determined that the base of power control is the power saving possible mode.

In step S6108 it is determined that the base of power control is the power saving priority mode.

In step S6109 it is determined that the base of power control is the power saving mode.

In step S6110 a process for determining an actual power control process, based on the result calculated in the history information check process is started.

In step S6111, if the load tendency calculated in the history information check process is greatly toward high load, the flow proceeds to step S6112. If the load tendency is little toward high load, the flow proceeds to step S6113. If there is no change in the load, the flow proceeds to step S6114. If the load tendency is little toward low load, the flow proceeds to step S6115. If the load tendency is greatly toward low load, the flow proceeds to step S6116.

In step S6112 it is determined that weight is 1.2.

In step S6113 it is determined that weight is 1.1.

In step S6114 it is determined that weight is 1.0.

In step S6115 it is determined that weight is 0.9.

In step S6116 it is determined that weight is 0.8.

In step S6117 the difference result of history information is reflected in the weight and a new weight is calculated.

New weight=weight+(difference result/100)

In the case of high load the difference result is + and in the case of low load it is −.

In step S6118 the weight is reflected in the load state of history information. More specifically, it is calculated by multiplying the load by a new weight calculated in step S6117.

In step S6119, if the value calculated in step S6118 is 75~100%, the flow proceeds to step S6120. If the value calculated in step S6118 is 50~75%, the flow proceeds to step S6121. If the value calculated in step S6118 is 25~50%, the flow proceeds to step S6122. If the value calculated in step S6118 is 0~25%, the flow proceeds to step S6123.

In step S6120 it is ranked A.
In step S6121 it is ranked B.
In step S6122 it is ranked C.
In step S6123 it is ranked D.
In step S6124 the result value and the rank are stored.
In step S6125 the power control base and the reflected result are collated. More specifically, ranks are numerically expressed and their average is calculated. At that time ranks A, B, C and D are 1, 2, 3 and 4, respectively.

In step S6126 the power saving mode/power saving priority mode in the rank determination becomes a priority target.

In step S6127 if it is power saving priority, the flow proceeds to step S6128. If it is not power saving priority, the flow proceeds to step S6129.

In step S6128 the remainder below zero of the average rank numeric value is raised. For example, 1.5 becomes 2.

In step S6129 the remainder below zero of the average rank numeric value is omitted. For example, 1.5 becomes 1.

In step S6130 an operational rank for individual control is set.

Step S6131 is the end of the loop, corresponding to step S6103.

In step S6132 the operational rank of the entire device is calculated and set on the basis of the ranks of all the modules, disk and RAID group.

In step S6133 the process control determination process is terminated.

Figure 62:
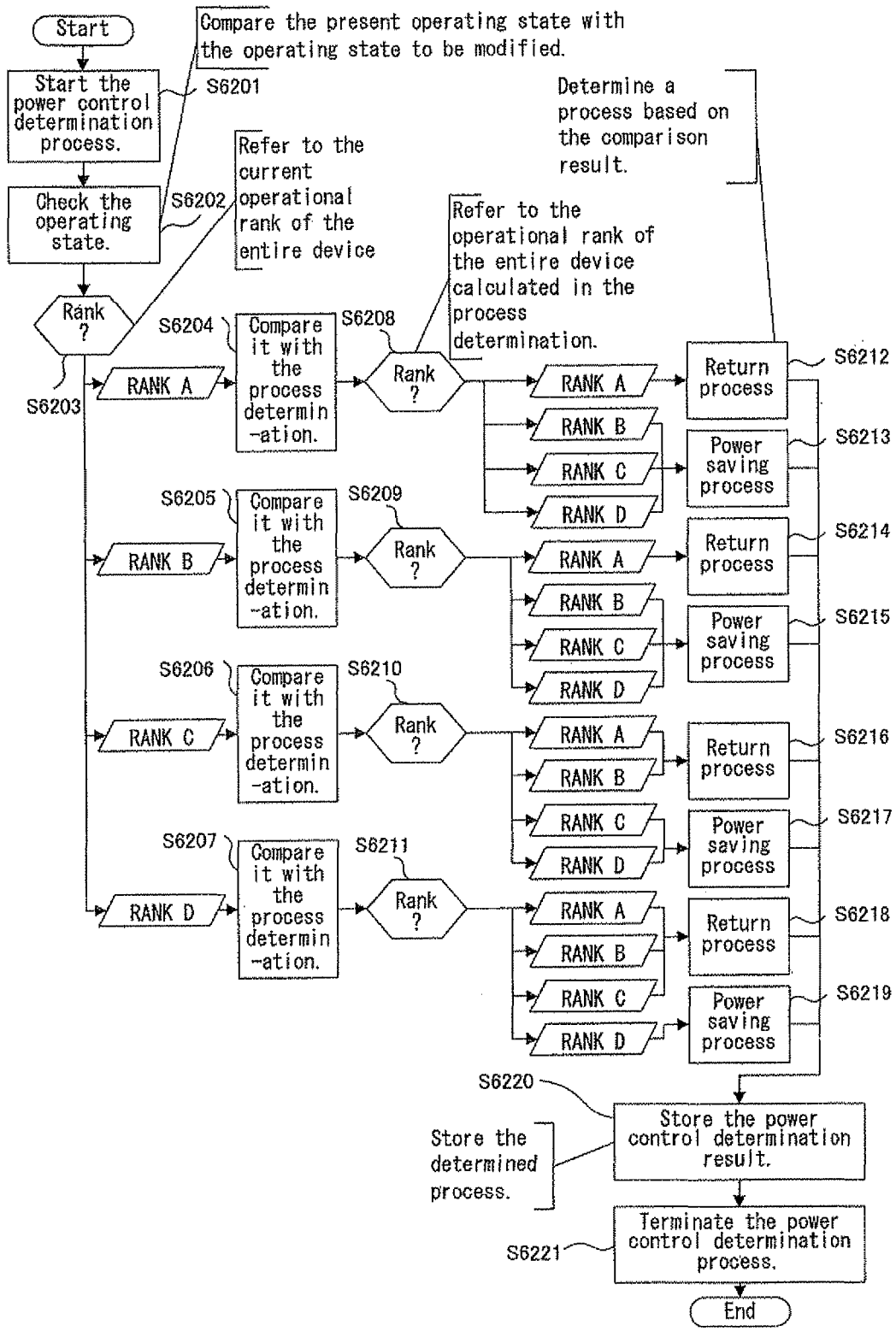
FIG. 62 is the detailed flowchart of a power control determination process.

FIG. 62 is the detailed flowchart of the power control determination process (step S5908).

In step S6201 the power control determination process is started.

In step S6202 the present operating state (operational rank) and an operating state (operational rank) to be modified are checked.

In step S6203, if the present operational rank of the entire device is A, the flow proceeds to step S6204. If the present operational rank of the entire device is B, the flow proceeds to step S6205. If the present operational rank of the entire device is C, the flow proceeds to step S6206. If the present operational rank of the entire device is D, the flow proceeds to step S6207.

In step S6204 the operational rank of the entire device, calculated in the process control determination process is checked.

In step S6205 the operational rank of the entire device, calculated in the process control determination process is checked.

In step S6206 the operational rank of the entire device, calculated in the process control determination process is checked.

In step S6207 the operational rank of the entire device, calculated in the process control determination process is checked.

In step S6208, if the operational rank of the entire device, calculated in the process control determination process is A, the flow proceeds to step S6212. If it is B, C or D, the flow proceeds to step S6213.

In step S6209, if the operational rank of the entire device, calculated in the process control determination process is A, the flow proceeds to step S6214. If it is B, C or D, the flow proceeds to step S6215.

In step S6210, if the operational rank of the entire device, calculated in the process control determination process is A or B, the flow proceeds to step S6216. If it is C or D, the flow proceeds to step S6217.

In step S6211, if the operational rank of the entire device, calculated in the process control determination process is A, B or C, the flow proceeds to step S6218. If the operational rank of the entire device, calculated in the process control determination process is D, the flow proceeds to step S6219.

In step S6212 the return process is applied to the power control determination result.

In step S6213 the power saving process is applied to the power control determination result.

In step S6214 the return process is applied to the power control determination result.

In step S6215 the power saving process is applied to the power control determination result.

In step S6216 the return process is applied to the power control determination result.

In step S6217 the power saving process is applied to the power control determination result.

In step S6218 the return process is applied to the power control determination result.

In step S6219 the power saving process is applied to the power control determination result.

In step S6220 the power control determination results are stored.

In step S6221 the power control determination process is terminated.

Figure 63:
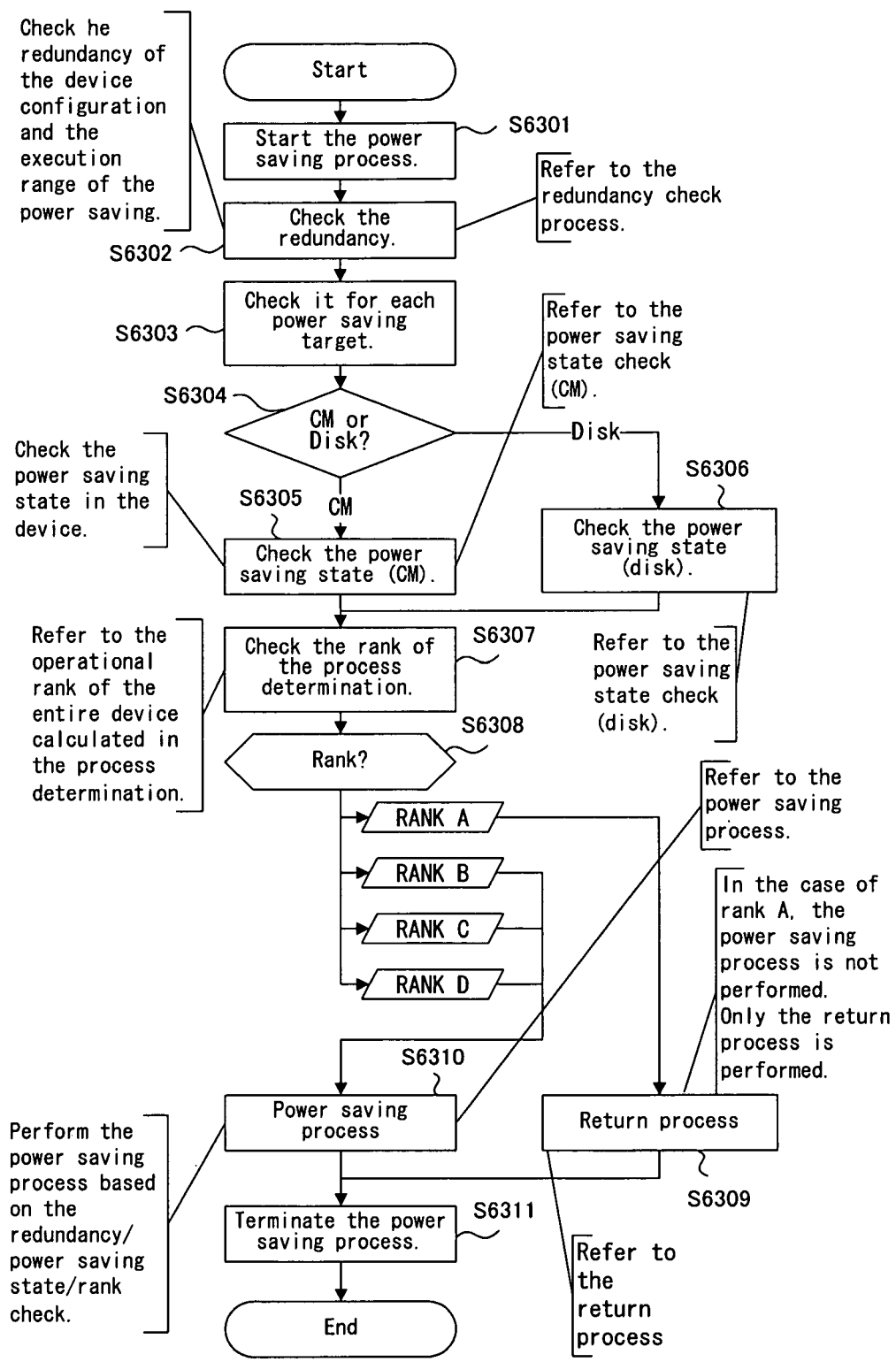
FIG. 63 is the detailed flowchart of a power saving process.

FIG. 63 is the detailed flowchart of the power saving process (step S5910).

In step S6301 the power saving process is started.

In step S6302 the redundancy of the device configuration is checked and its range whose power saving is applicable is checked. The detailed redundancy check process is described later.

In step S6303 the target of power saving is checked.

In step S6304, if the power saving target is CM, the flow proceeds to step S6305. If it is a disk, the flow proceeds to step S6306.

In step S6305 the power saving state of CM in the device is checked. The detailed power saving state check process (CM) is described.

In step S6306 the power saving state of a disk in the device is checked. The detailed power saving state check process (disk) is described.

In step S6307 the operational rank of the entire device, calculated in the process control determination process is checked.

In step S6308, if the operational rank of the entire device, calculated in the process control determination process is A, the flow proceeds to step S6309. If it is B, C or D, the flow proceeds to step S6310.

In step S6309 the return process is performed. The detailed return process is described later.

In step S6310 the power saving process is performed on the basis of its redundancy, power saving state and operational rank.

In step S6311 the power saving process is terminated.

Figure 64:
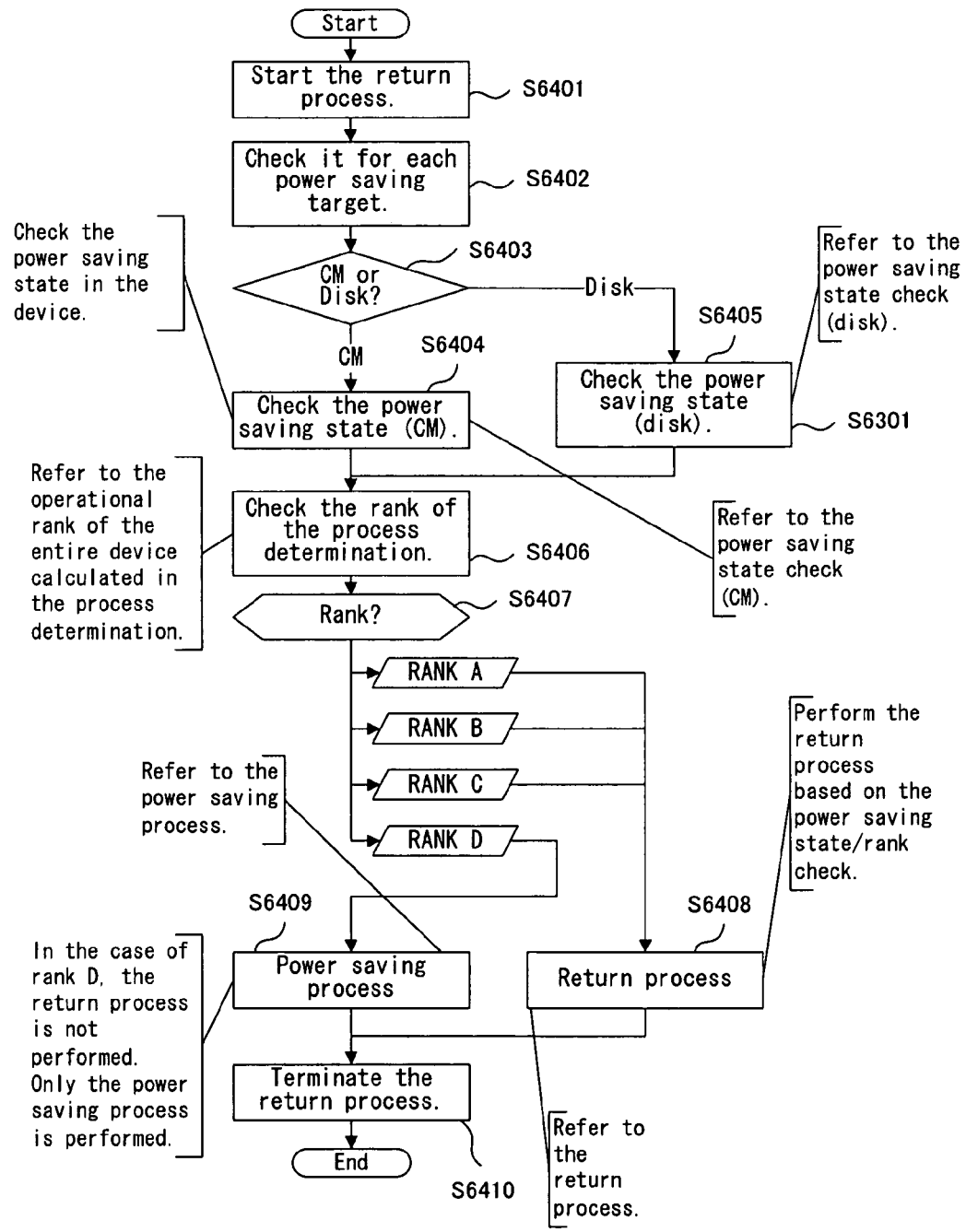
FIG. 64 is the detailed flowchart of a return process.

FIG. 64 is the detailed flowchart of the return process (steps S5911 and S6309).

In step S6401 the return process is started.

In step S6402 the target of power saving is checked.

In step S6403, if the power saving target is CM, the flow proceeds to step S6404. If it is a disk, the flow proceeds to step S6405.

In step S6404, the power saving state of CM in the device is checked. The detailed power saving state check process (CM) is described later.

In step S6405, the power saving state of a disk in the device is checked. The detailed power saving state check process (disk) is described later.

In step S6406 the operational rank of the entire device, calculated in the process control determination process is checked.

In step S6407, if the operational rank of the entire device, calculated in the process control determination process is A, B or C, the flow proceeds to step S6408. If it is D, the flow proceeds to step S6409.

In step S6408 the return process is performed on the basis of its power saving state and operational rank. The detailed return process is described later.

In step S6409 the power saving process is performed. The power saving process is always described above.

In step S6410 the return process is terminated.

Figure 65:
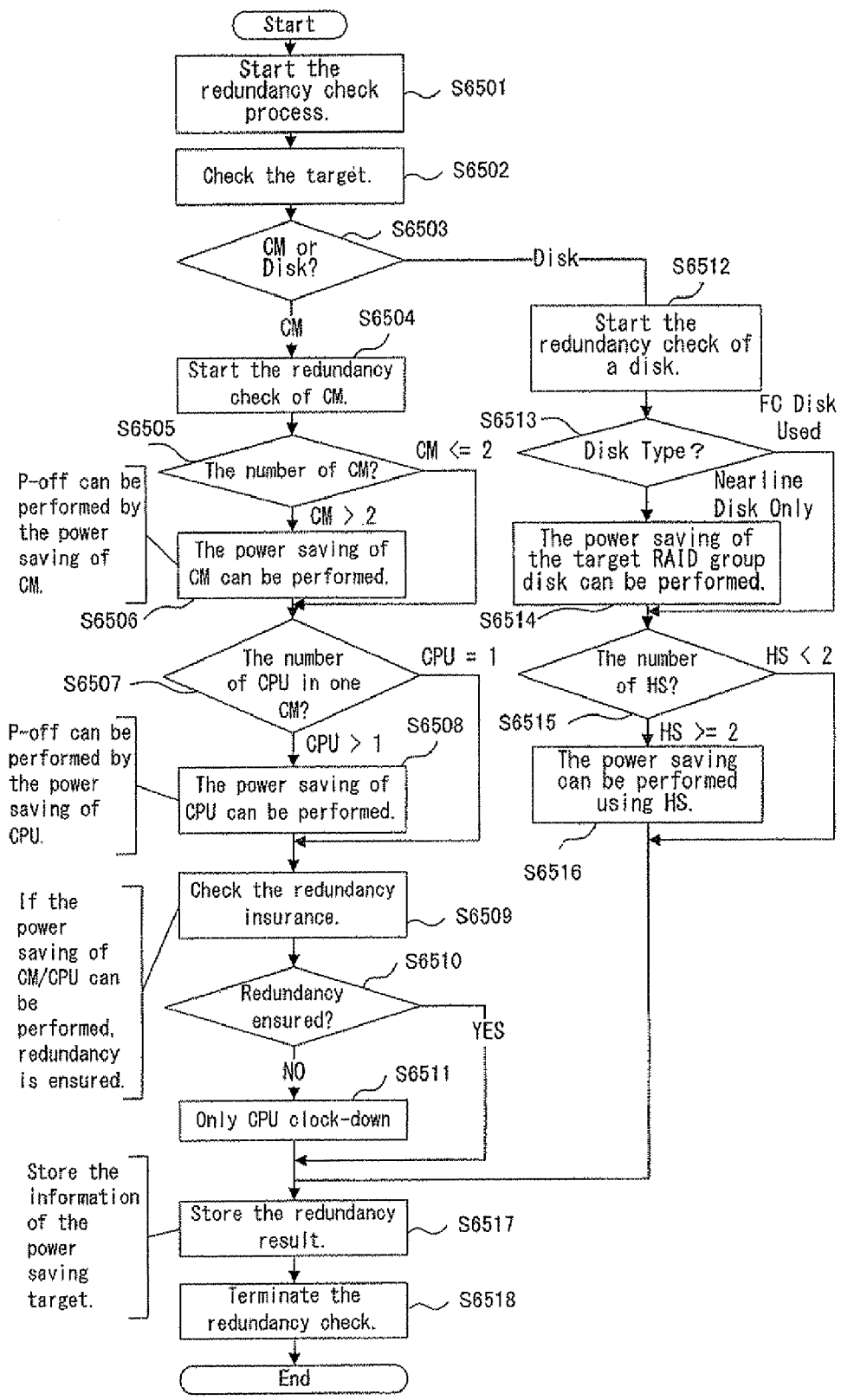
FIG. 65 is the detailed flowchart of a redundancy check process.

FIG. 65 is the detailed flowchart of the redundancy check process (step S6302).

In step S6501 the redundancy check process is started.

In step S6502 the target of redundancy check is checked.

In step S6503, if the check target is CM, the flow proceeds to step S6504. If it is a disk, the flow proceeds to step S6512.

In step S6504 the redundancy check of CM is started.

In step S6505, if the number of CM is more than two, the flow proceeds to step S6506. If it is two or less, the flow proceeds to step S6507.

In step S6506 it is determined that the power of CM can be saved, namely, the power of CM can be switched off.

In step S6507, if the number of CPU of one CM is two or more, the flow proceeds to step S6508. If it is one, the flow proceeds to step S6509.

In step S6508 it is determined that the power of CPU can be saved, namely, the power of CPU can be switched off.

In step S6509 it is checked if redundancy is ensured.

In step S6510, if the power of CM or CPU can be saved, it is determined that the redundancy is ensured and the flow proceeds to step S6517. If it cannot be saved, the flow proceeds to step S6511.

In step S6511 it is determined that only the clock-down of CPU is applicable.

In step S6512 the redundancy check of disks is started.

In step S6513, if only near line disks are used, the flow proceeds to step S6514. If an FC disk is also used, the flow proceeds to step S6515.

In step S6514 it is determined that the power of a target RAID group disk can be saved.

In step S6515, if the number of hot spare disks is two or more, the flow proceeds to step S6516. If it is one or less, the flow proceeds to step S6517.

In step S6516 it is determined that power saving using a hot spare disk is possible.

In step S6517 the information about a power saving target calculated in the above step, that is, information about the redundancy of the device is stored In step S6518 the redundancy check process is terminated.

Figure 66:
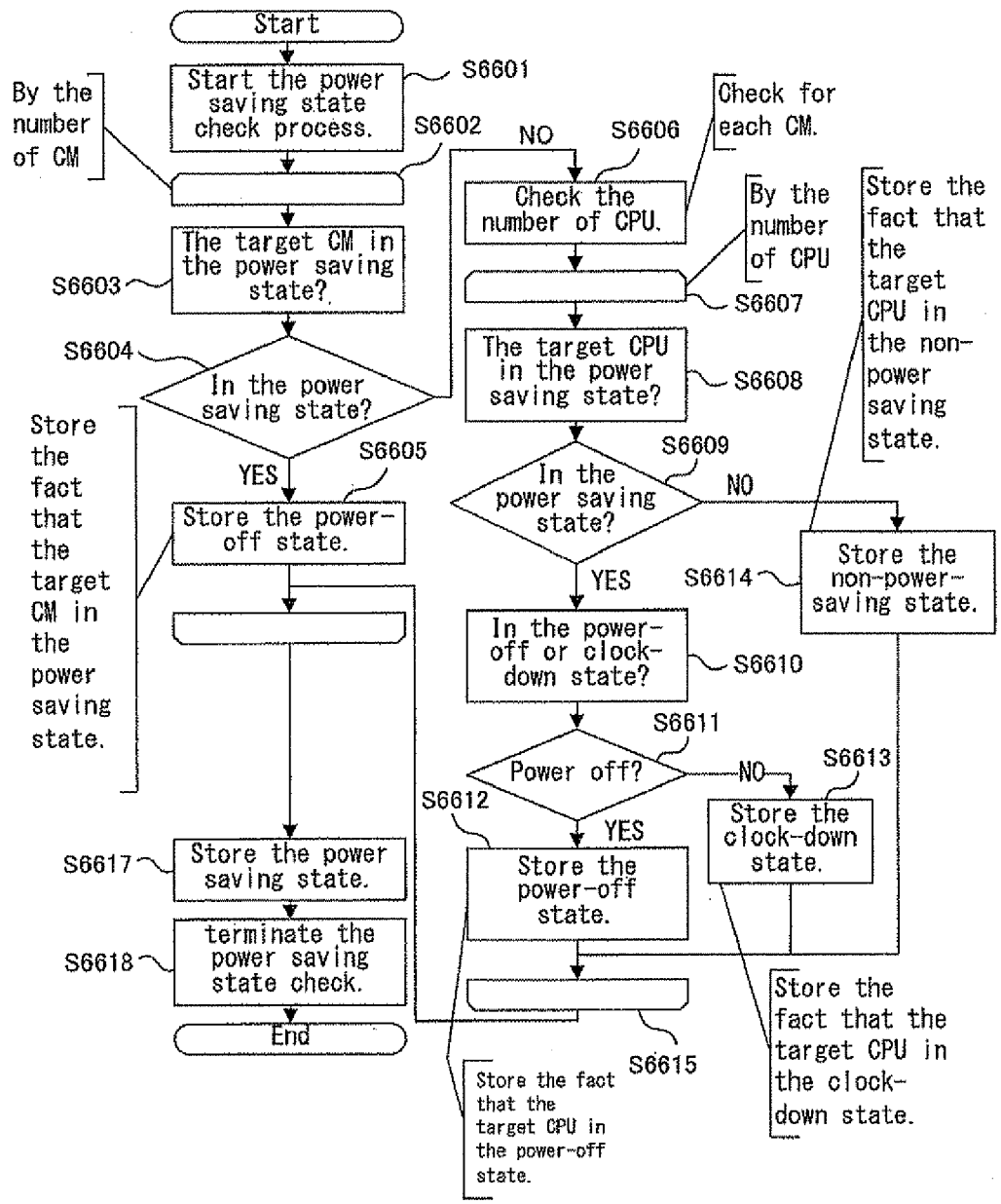
FIG. 66 is the detailed flowchart of a power saving state check (CM) process.

FIG. 66 is the detailed flowchart of the power saving state check process (CM)(steps S6305 and S6404).

In step S6601 the power saving state check process of CM is started.

Step S6602 is the beginning of a loop and is repeated by the number of CM.

In step S6603 it is checked if a power saving target CM is in a power saving state.

In step S6504, if it is in the power saving state, the flow proceeds to step S6605. If it is not in the power saving state, the flow proceeds to step S6606.

In step S6605 the fact that the target CM is in the power saving state (power-off state) is stored.

In step S6606 the number of CPU in one CM is checked.

Step S6607 is the beginning of another loop and is repeated by the number of CPU.

In step S6608 it is checked if a power saving target CPU is in a power saving state.

In step S6609, if the CPU is in the power saving state, the flow proceeds to step S6610. If it is not in the power saving state, the flow proceeds to step S6614.

In step S6610 it is checked if the target CPU is in a power-off or clock-down state.

In step S6611 if the power of the target CPU is switched off, the flow proceeds to step S6612. If it is switched on, the flow proceeds to step S6613.

In step S6612 the fact that the target CPU is in a power saving state (power-off state) is stored.

In step S6613 the fact that the target CPU is in a clock-down state. In step S6614 the fact that the target CPU is in not a power saving state yet is stored.

Step S6615 is the end of the loop, corresponding to step S6607.

Step S6616 is the end of the loop, corresponding to step S6602.

In step S6617 the power state is stored.

In step S6618 the power saving state check process is terminated.

Figure 67:
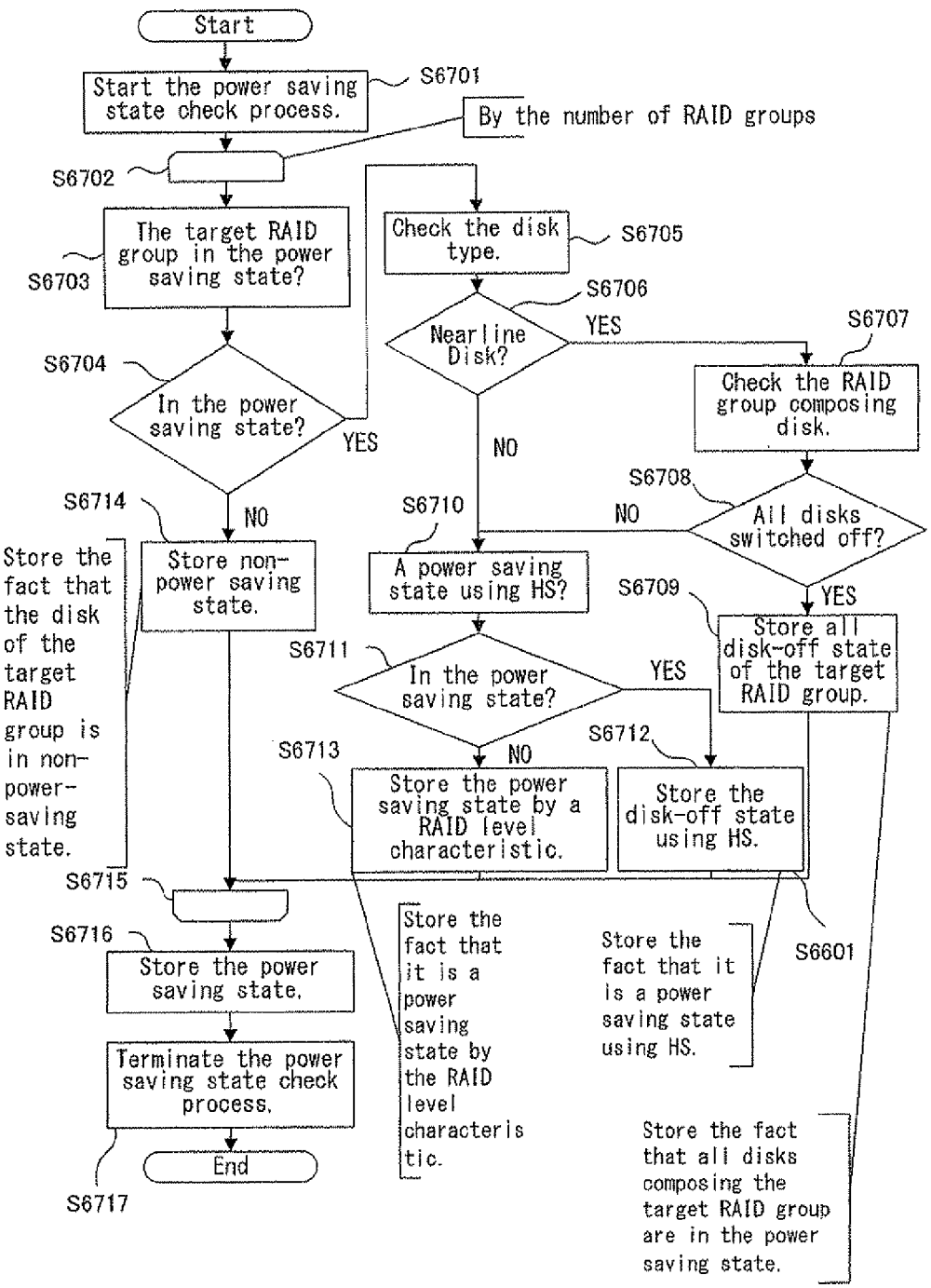
FIG. 67 is the detailed flowchart of a power saving state check (disk) process.

FIG. 67 is the detailed flowchart of the power saving state check process (disk) (steps S6306 and S6405).

In step S6701 the power saving state check process of a disk is started.

Step S6702 is the beginning of a loop and is repeated by the number of RAID groups.

In step S6703 it is checked if the target RAID group is in a power saving state.

In step S6704, if the target RAID group is in a power saving state, the flow proceeds to step S6705. If it is not in a power saving state, the flow proceeds to step S6714.

In step S6705 the type of the disk is checked.

In step S6706, if it is a near line disk, the flow proceeds to step S6707. If it is not a near line disk, the flow proceeds to step S6710.

In step S6707 a disk composing a RAID group is checked.

In step S6708, if all the disks are switched off, the flow proceeds to step S6709. If it is not, the flow proceeds to step S6710.

In step S6709 the fact that all the disks composing the target RAID group are in a power saving state is stored.

In step S6710 it is checked if power is saved using a hot spare disk.

In step S6711, if it is in a power saving state, the flow proceeds to step S6712. If it is not in a power saving state, the flow proceeds to step S6713.

In step S6712 the fact that power is saved using a hot spare disk is stored.

In step S6713 the fact that power is saved due to the level characteristic of a RAID group is stored.

In step S6714 the fact that the disk of the target RAID group is not in a power saving state is stored.

Step S6715 is the end of the loop, corresponding to step S6702.

In step S6716 the power saving state is maintained.

In step S6717 the power saving state check process (disk) is terminated.

Figure 68:
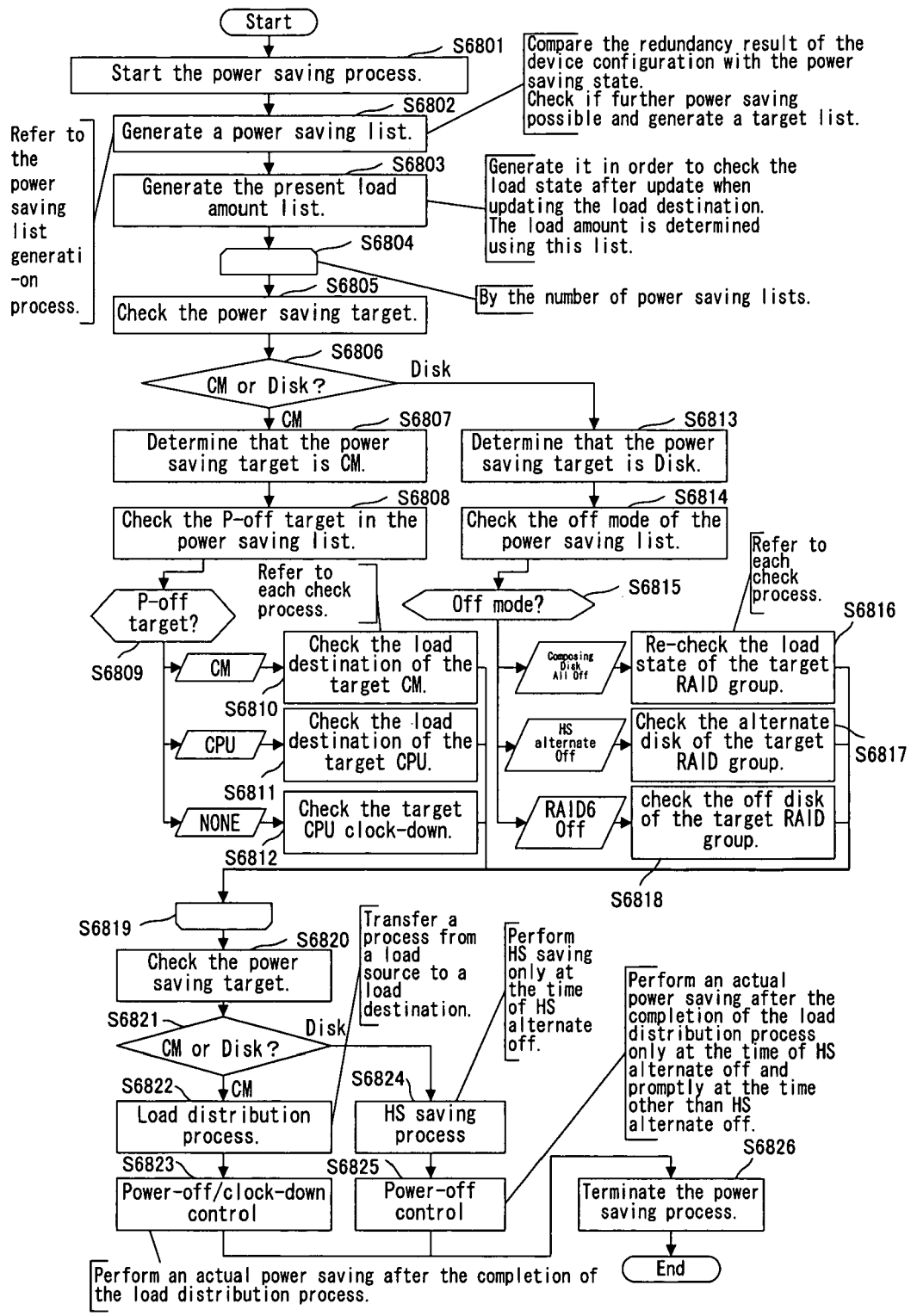
FIG. 68 is the detailed flowchart of the power saving process.

FIG. 68 is the detailed flowchart of the power saving process (step S6310).

In step S6801 the power saving process is started.

In step S6802 the redundancy result of device configuration and the power saving state are compared, it is checked if power can be further saved and a target list (power saving list) is generated. The detailed power saving list generation process is described later.

In step S6803 a load amount list is generated in order to check a load state after update when updating a load distribution destination. The amount of load is determined using this list.

Step S6804 is the beginning of a loop and is repeated by the number of power saving lists.

In step S6805 the target of power saving is checked.

In step S6806, if the target is CM, the flow proceeds to step S6807. If it is a disk, the flow proceeds to step S6813.

In step S6807 it is determined that the power saving target is CM.

In step S6808 the power-off target of the power saving list is checked.

In step S6809, if the power-off target is CM, the flow proceeds to step S6810. If it is CPU, the flow proceeds to step S6811. If there is no target, the flow proceeds to step S6812.

In step S6810 the load destination of the target CM load is checked. The detailed target CM load destination check process is described later.

In step S6811 the load destination of the target CPU load is checked. The detailed target CPU load destination check process is described later.

In step S6812 the clock-down of the target CPU is checked. The detailed target CPU clock-down check process is described later.

In step S6813 it is determined that the target of power saving is a disk.

In step S6814 the off-mode of the power saving list is checked.

In step S6815, if all the composing disks are switched off, the flow proceeds to step S6816. If it is the disk-off due to the alternate use of HS, the flow proceeds to step S6817. If it is off due to RAID 6, the flow proceeds to step S6818.

In step S6816 the load state of a target RAID group is re-checked. The detailed target RAID group load state re-check process is described later.

In step S6817 the alternate disk of the target RAID group is checked. The detailed target RAID group alternate disk check process is described later.

In step S6818 the off-disk of the target RAID group is checked. The detailed target RAID group off-disk check process is described later.

Step S6819 is the end of the loop, corresponding to step S6804.

In step S6820 the target of power saving is checked.

In step S6821, if the target is CM, the flow proceeds to step S6822. If it is a disk, the flow proceeds to step S6824.

In step S6822 a load distribution process is performed. Specifically, a process is transferred from a load source to a load destination.

In step S6823 after the completion of the load distribution process, power is saved by power-off or clock-down.

In step S6824, if it is hot spare disk alternate off, data is saved in a hot spare disk.

In step S6825, if it is hot spare disk alternate off, power saving is performed after the saving of data in a hot spare disk is completed. If it is other than hot spare disk alternate off, power saving is promptly performed.

In step S6826 the power saving process is terminated.

Figure 69:
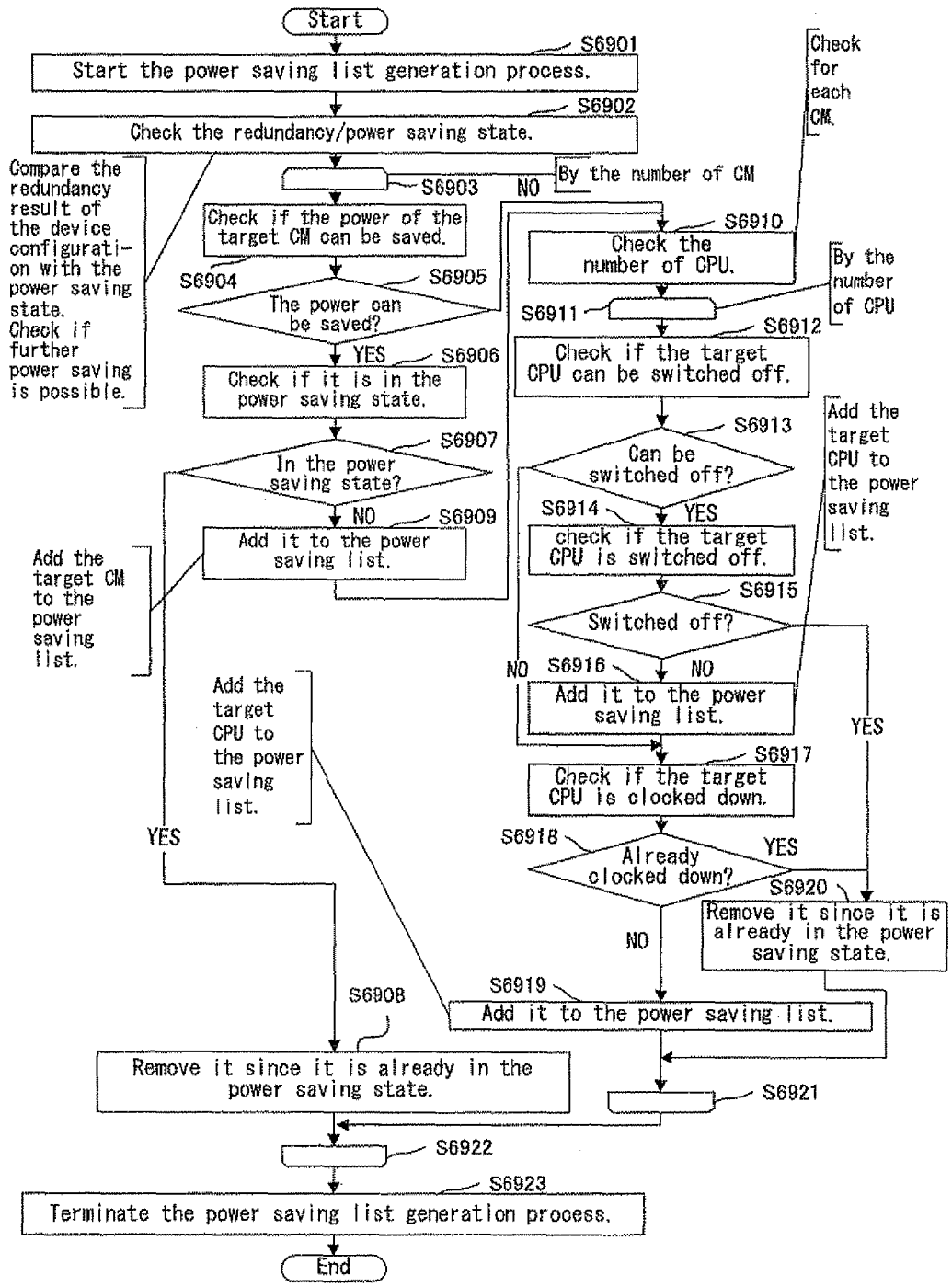
FIG. 69 is the detailed flowchart of a power saving list generation process (CM).

FIG. 69 is the detailed flowchart of the power saving list generation process (CM) (step S6802).

In step S6901 the power saving list generation process (CM) is started.

In step S6902 the redundancy result of device configuration calculated in the redundancy check process and the power state calculated in the power saving state check process (CM) are checked.

Step S6903 is the beginning of a loop and is repeated by the number of CM.

In step S6904 it is checked if the power of a target CM can be saved, on the basis of the redundancy result.

In step S6905, if power can be saved, the flow proceeds to step S6906. If power cannot be saved, the flow proceeds to step S6910

In step S6906 it is checked if the target CM is in a power saving state, based on the power state.

In step S6907, if the target CM is in a power saving state, the flow proceeds to step S6908. If it is not in a power saving state, the flow proceeds to step S6909.

In step S6908, since the target CM is in the power saving state, it is removed from the power saving list.

In step S6909 the target CM is added to the power saving list.

In step S6910 the number of CPU in the target CM is checked.

Step S6911 is the beginning of another loop and is repeated by the number of CPU.

In step S6912 it is checked if a target CPU can be switched off on the basis of the redundancy result.

In step S6913, if it can be switched off, the flow proceeds to step S6914. If it cannot be switched off, the flow proceeds to step S6917.

In step S6914 it is checked if the target CPU can be switched off, on the basis of the power state.

In step S6915, if it is not switched of f, the flow proceeds to step S6916. If it is switched off, the flow proceeds to step S6920.

In step S6911 the target CPU is added to the power saving list.

In step S6917 is it checked if the target CPU in a clock-down state, based on the power state.

In step S6918, if it is not in a clock-down state, the flow proceeds to step S6919. If it is in a clock-down state, the flow proceeds to step S6920.

In step S6919 the target CPU is added to the power saving list.

In step S6920, since the target CPU is in the power saving state, it is removed from the power saving list.

Step S6921 is the end of the loop, corresponding to step S6911.

Step S6922 is the end of the loop, corresponding to step S6903.

In step S6923 the power saving list generation process (CM) is terminated.

Figure 70:
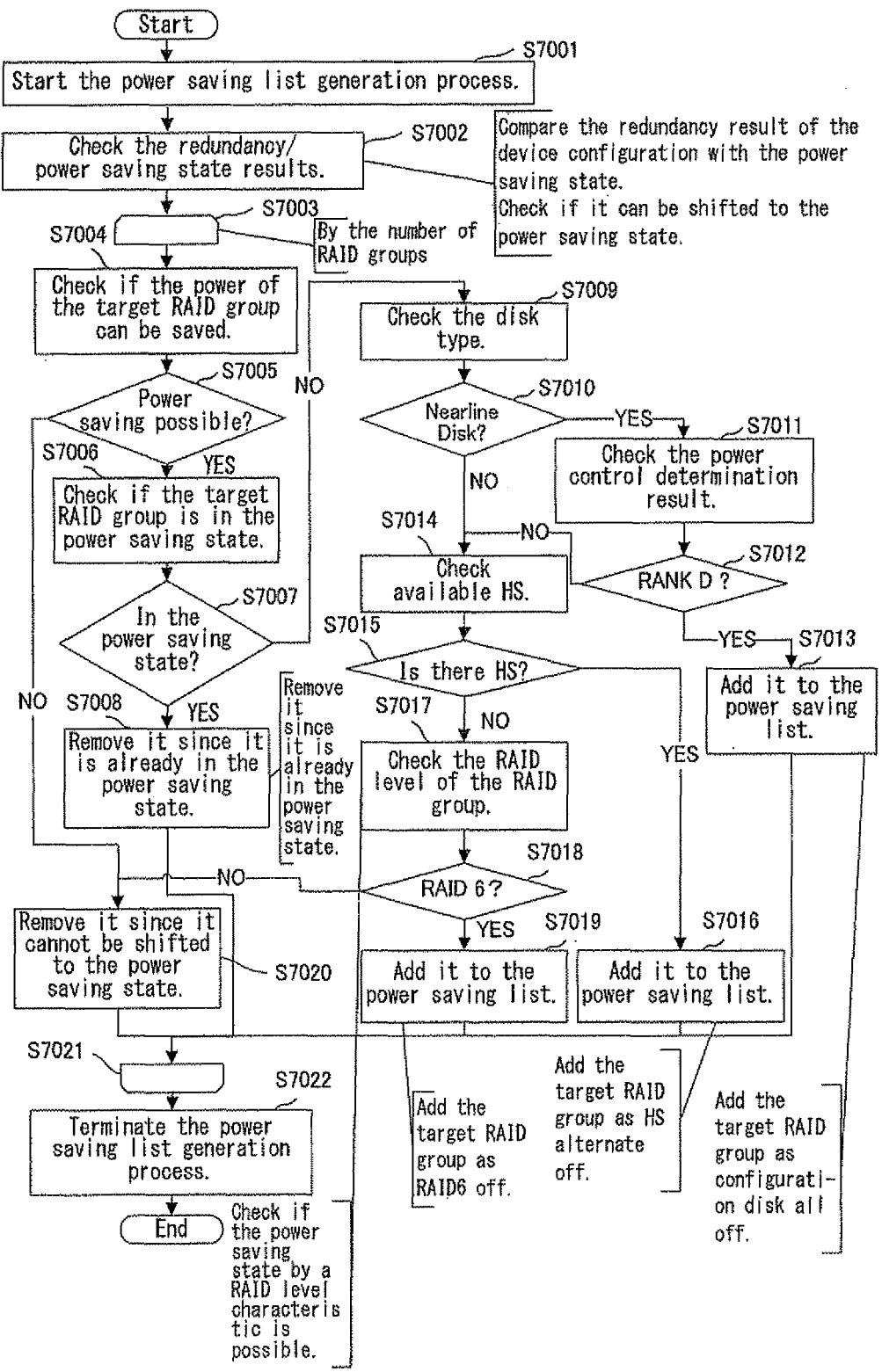
FIG. 70 is the detailed flowchart of a power saving list generation process (disk).

FIG. 70 is the detailed flowchart of the power saving list generation process (disk)(step S6802).

In step S7001 the power saving list generation process (disk) is started.

In step S7002 the redundancy result of device configuration calculated in the redundancy check process and the power saving state calculated in the power saving state check process (disk) are checked.

Step S7003 is the beginning of a loop and is repeated by the number of RAID groups.

In step S7004 it is checked if the power of a RAID group can be saved.

In step S7005, if its power can be saved, the flow proceeds to step S7006. If it cannot be saved, the flow proceeds to step S7020

In step S7006 it is checked if the target RAID group is in a power saving state.

In step S7007, if the target RAID group is in a power saving state, the flow proceeds to step S7008. If it is not in a power saving state, the flow proceeds to step S7009.

In step S7008, since the target RAID group is in the power saving state, it is removed from the power saving list.

In step S7009 the type of a disk is checked.

In step S7010 if disk type is near line disk, the flow proceeds to step S7011. If it is not near line, the flow proceeds to step S7014.

In step S7011 the power control determination result obtained in the power control determination is checked.

In step S7012 if the power control determination result is rank D, the flow proceeds to step S7013. If it is not rank D, the flow proceeds to step S7014.

In step S7013 the target RAID group is added to the power saving list as configuration disk all off.

In step S7014 it is checked if there is an available hot spare disk.

In step S7015, if there is an available hot spare disk, the flow proceeds to step S7016. If there is no available hot spare disk, the flow proceeds to step S7017.

In step S7016 the target RAID group is added to the power saving list as HS alternate off.

In step S7017 the RAID level of a RAID group is checked.

In step S7018, if the RAID level is 6, the flow proceeds to step S7019. If it is not 6, the flow proceeds to step S7020.

In step S7019 the target RAID group is added to the power saving list as RAID 6 off.

In step S7020, since it cannot be shifted to a power saving state, the target RAID group is removed from the power saving list.

Step S7021 is the end of the loop, corresponding to step S7003.

In step S7022 the power saving list generation process (disk) is terminated.

FIG. 71 is the detailed flowchart of the return process (step S6408).

In step S7101 the return process is started.

In step S7102 the power state obtained in the power saving state check process (CM) and the power saving state obtained in the power saving state check process (disk) are checked, the power saving state is confirmed and a return target list is generated.

In step S7103 a present load amount list is generated in order to check a load state after update when updating the load destination. The amount of load is determined using this list.

In step S7104 the target of the return process is checked.

In step S7105, if the target is CM, the flow proceeds to step S7106. If it is a disk, the flow proceeds to step S7117.

In step S7106 the operational rank of the entire device calculated in the process control determination process is checked.

In step S7107, if rank is A, the flow proceeds to step S7108. If it is B, the flow proceeds to step S7110. If it is C, the flow proceeds to step S7112.

In step S7108 it is set to a power saving suppression mode.

In step S7109 all the power saving states are released and it is returned to its normal operation.

In step S7110 it is set to a power saving possible mode.

In step S7111 the return target list is sorted giving priority to a power-off CM and CPU.

In step S7112 it is set to a power saving priority mode.

In step S7113 the return target list is sorted giving priority to CPU clock-down.

In step S7114 the return list (CM) is generated. The detailed return list generation process (CM) is described later.

In step S7115 power-on or clock-up is applied to a target module, based on the generated return list to return it to the normal operation.

In step S7116 the process transferred from a load source to a load destination at the time of power saving is returned from the load destination to the load source.

In step S7117 the operational rank of the entire device calculated in the process control determination process is checked.

In step S7118, if the rank is A, the flow proceeds to step S7119. If it is B, the flow proceeds to step S7121. If it is C, the flow proceeds to step S7123.

In step S7119 it is set to a power saving suppression mode.

In step S7120 all the power saving states are released and it is returned to the normal operation.

In step S7121 it is set to a power saving possible mode.

In step S7122 the release of the power saving state is determined on the basis of the load amount list and the schedule.

In step S7123 it is set to a power saving priority mode.

In step S7124 it is returned only when it cannot be accessed.

In step S7125 a return list (disk) is generated. The detailed return list generation process (disk) is described later.

In step S7126 the target disk is returned to the normal operation, according to the generated return list.

In step S7127 the return process is terminated.

Figure 72:
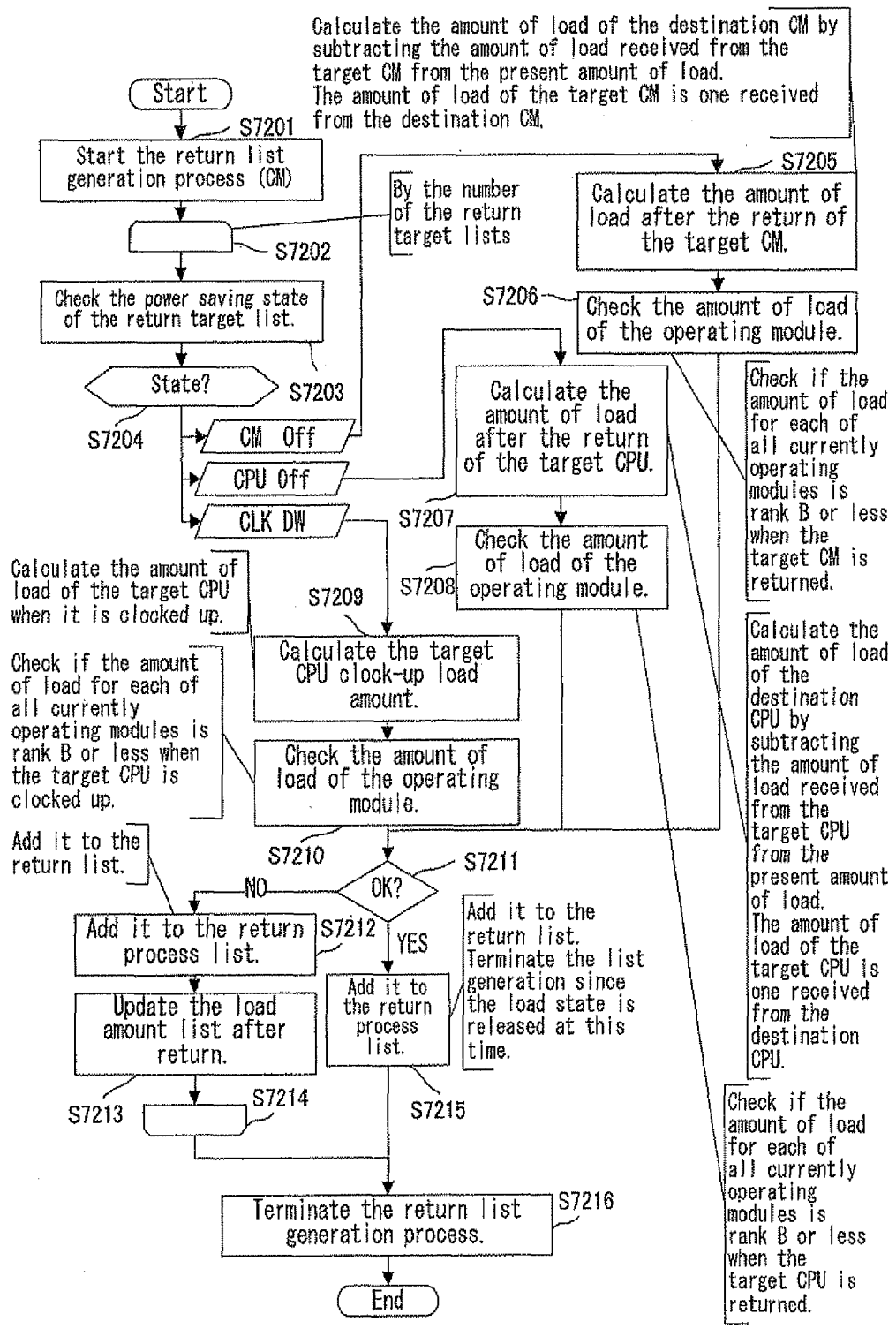
FIG. 72 is the detailed flowchart of a return list generation process (CM).

FIG. 72 is the detailed flowchart of the return list generation process (CM) (step S7114).

In step S7201 the return list generation process (CM) is started.

Step S7202 is the beginning of a loop and is repeated by the number of return target list.

In step S7203 the power saving state of the return target list is checked.

In step S7204, if the state is the power-off of CM, the flow proceeds to step S7205. If it is the power-off of CPU, the flow proceeds to step S7207. If it is the clock-down of CPU, the flow proceeds to step S7209.

In step S7205 the amount of load after return of the target CM is calculated. The amount of load of a load destination is calculated by subtracting the amount of load received from the target CM from the present amount of load. The amount of load of the target CM is the amount of load received from the load destination.

In step S7206, when the target CM is returned, the amount of load for each module of all the currently operating modules is checked.

In step S7207 the amount of load after return of the target CPU is calculated. The amount of load of a load destination CPU is calculated by subtracting the amount of load received from the target CPU from the present amount of load. The amount of load of the target CPU is the amount of load received from the load destination CPU.

In step S7208, when the target CPU is returned, the amount of load for each module of all the currently operating modules is checked.

In step S7209 the amount of load in the case where the target CPU is clocked up is calculated.

In step S7210 when the target CPU is clocked up, the amount of load for each module of all the currently operating modules is checked.

In step S7211, if the amount of load for each module of all the modules is B or less, the flow proceeds to step S7215. If it is A, the flow proceeds to step S7212.

In step S7212 the target is added to the return process list (return list).

In step S7213 the load amount list after return is updated.

Step S7214 is the end of the loop, corresponding to step S7202.

In step S7215 the target is added to the return process list.

In step S7216 the return list generation process (CM) is terminated.

Figure 73:
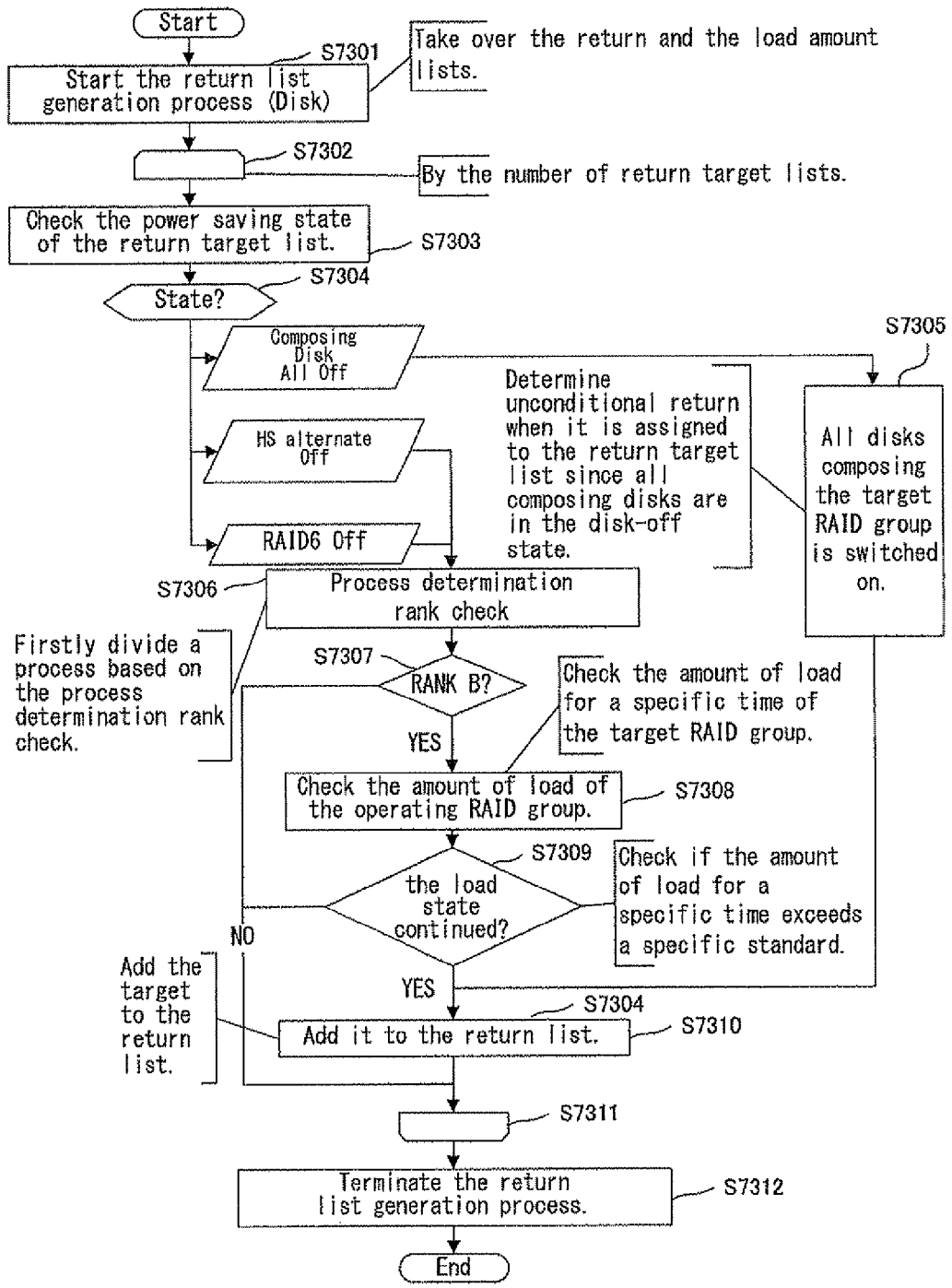
FIG. 73 is the detailed flowchart of a return list generation process (disk).

FIG. 73 is the detailed flowchart of the return list generation process (disk)(step S7125).

In step S7301 the return list generation process (disk) is started.

Step S7302 is the beginning of a loop and is repeated by the number of the return target list.

In step S7303 the power saving state of the return target list is checked.

In step S7304, if the power saving state is configuration disk all off, the flow proceeds to step S7305. If it is HS alternate off or RAID 6 off, the flow proceeds to step S7306.

In step S7305, since all the composing disks are switched off, its return is unconditionally determined when it is assigned to the return target list. Therefore, all the composing disks in the target RAID group are set on.

In step S7306 the operational rank of the entire device obtained in the process control determination check process is checked.

In step S7307, if the rank is B, the flow proceeds to step S7308. If it is not B, the flow proceeds to step S7310.

In step S7308 the amount of load for a specific time of the target RAID group is checked.

In step S7309 the amount of load for a specific time exceeds a specific standard, the flow proceeds to step S7310. If it does not exceed the specific standard, the flow proceeds to step S7311.

In step S7310 the target is added to the return list.

Step S7311 is the end of the loop, corresponding to step S7302.

In step S7312 the return list generation process (disk) is terminated.

Figure 74:
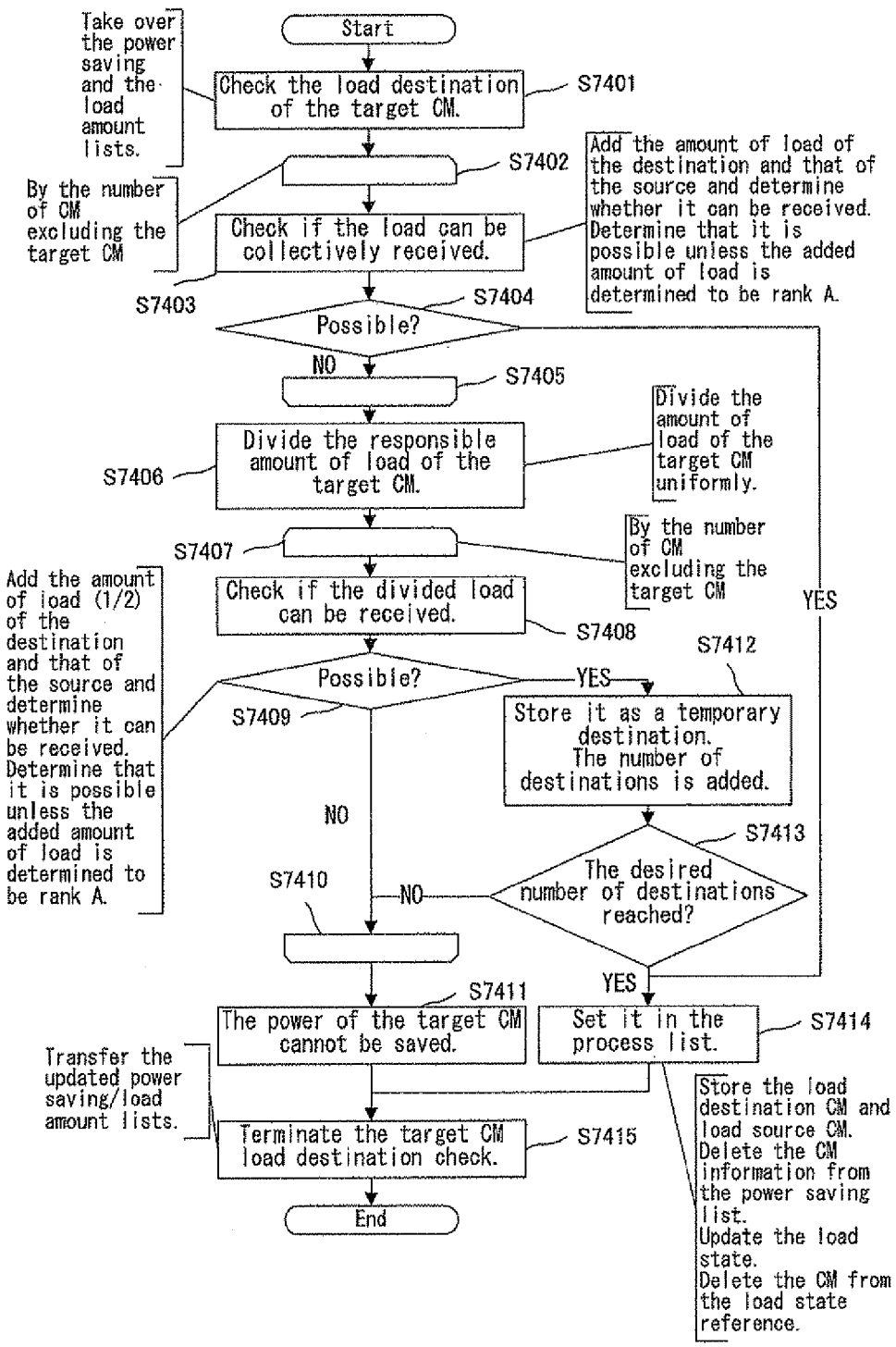
FIG. 74 is the detailed flowchart of a target CM load destination check process.

FIG. 74 is the detailed flowchart of the target CM load destination check process (step S6810).

In step S7401 the target CM load destination check process is started.

Step S7402 is the beginning of a loop and is repeated by the number of CM excluding a target CM.

In step S7403 the amount of load of a load destination and that of a load source are added and it is checked if load can be transferred.

In step S7404, if the added amount of load is rank A, it is determined that load cannot be undertaken and the flow proceeds to step S7414. If it is other than rank A, it is determined that load can be undertaken and the flow proceeds to step S7405.

Step S7405 is the end of the loop, corresponding to step S7402.

In step S7406 the amount of load of the target CM is uniformly divided.

Step S7407 is the beginning of another loop and is repeated by the number of CM excluding a target CM.

In step S7408 it is checked if the divided load can be undertaken.

In step S7409 the half of the amount of load of a load destination and the full amount of a load source are added. If the added amount of load is rank A, it is determined that load cannot be undertaken and the flow proceeds to step S7410. If it is other than rank A, it is determined that load can be undertaken and the flow proceeds to step S7412.

Step S7410 is the end of the loop, corresponding to step S7408.

In step S7411 it is determined that the power of the target CM cannot be saved.

In step S7412 it is stored as a temporary load destination and it is added to the number of destinations.

In step S7413 it is determined that the number of desired destinations is reached. If it is reached, the flow proceeds to step S7414. If it is not reached, the flow proceeds to step S7410.

In step S7414 the load destination CM and the load source CM are stored. The CM information is deleted from the power saving list. The load state is updated. The CM is deleted from the load state reference.

In step S7415 the target CM load destination check process is terminated.

Figure 75:
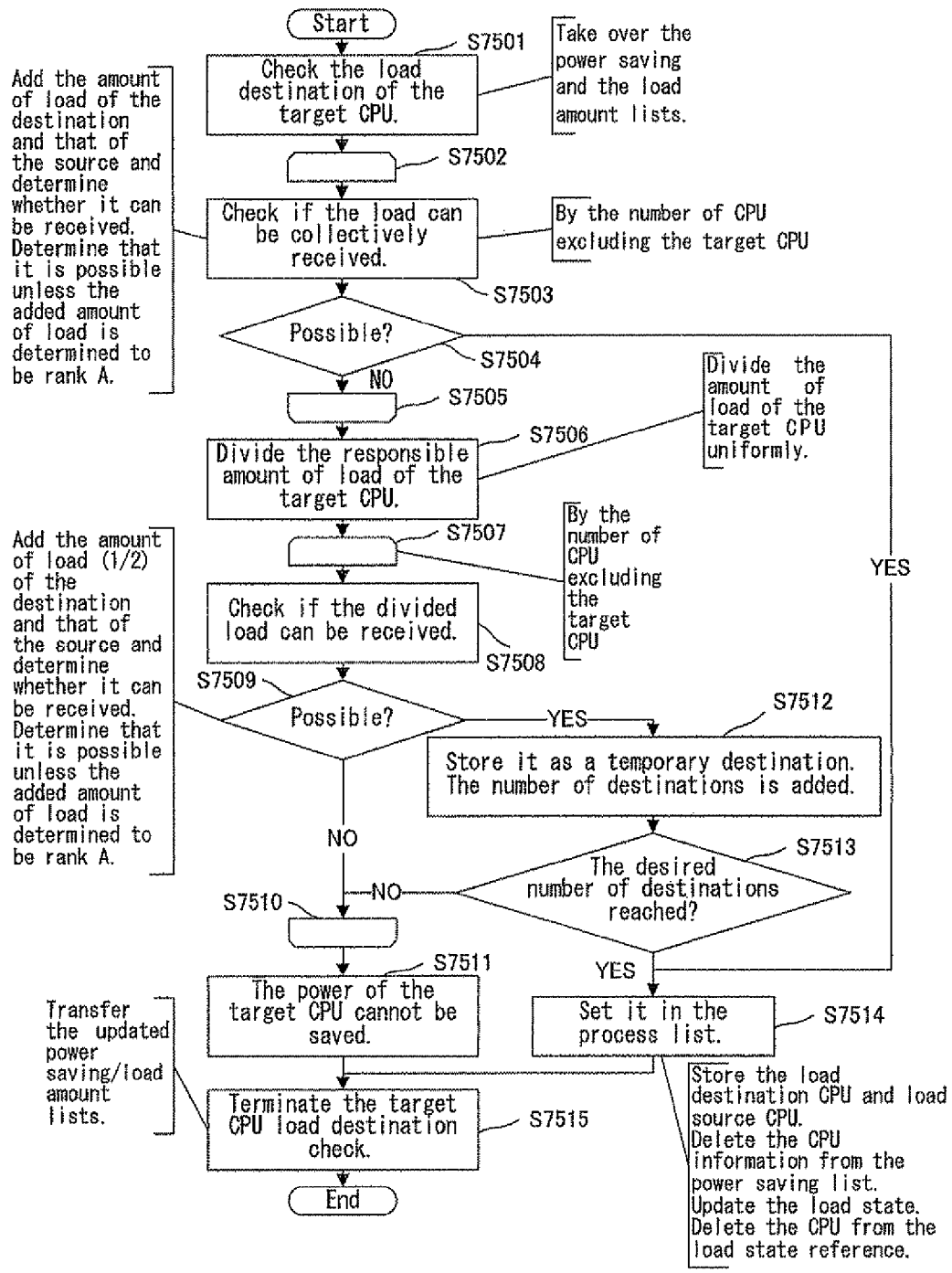
FIG. 75 is the detailed flowchart of a target CPU load destination check process.

FIG. 75 is the detailed flowchart of the target CPU load destination check process (step S6811).

In step S7501 the target CPU load destination check process is started.

Step S7502 is the beginning of a loop and is repeated by the number of CPU excluding a target CPU.

In step S7503 the amount of load of a load destination and that of a load source are added and it is checked if load can be transferred.

In step S7504, if the added amount of load is rank A, it is determined that load cannot be undertaken and the flow proceeds to step S7514. If it is other than rank A, it is determined that load can be undertaken and the flow proceeds to step S7505.

Step S7505 is the end of the loop, corresponding to step S7502.

In step S7506 the amount of load of the target CPU is uniformly divided.

Step S7507 is the beginning of another loop and is repeated by the number of CM excluding a target CM.

In step S7508 it is checked if divided load can be undertaken.

In step S7509 the half of the amount of load of a load destination and the full amount of a load source are added. If the added amount of load is rank A, it is determined that load cannot be undertaken and the flow proceeds to step S7510. If it is other than rank A, it is determined that load can be undertaken and the flow proceeds to step S7512.

Step S7510 is the end of the loop, corresponding to step S7508.

In step S7511 it is determined that the power saving of the target CPU cannot be saved, namely the power cannot be switched.

In step S7512 it is stored as a temporary load destination and it is added to the number of destinations.

In step S7513 it is determined that the number of desired destinations is reached. If it is reached, the flow proceeds to step S7514. If it is not reached, the flow proceeds to step S7510.

In step S7514 the load destination CPU and the load source CPU are stored. The CPU information is deleted from the power saving list. The load state is updated. The CPU is deleted from the load state reference.

In step S7515 the target CPU load destination check process is terminated.

Figure 76:
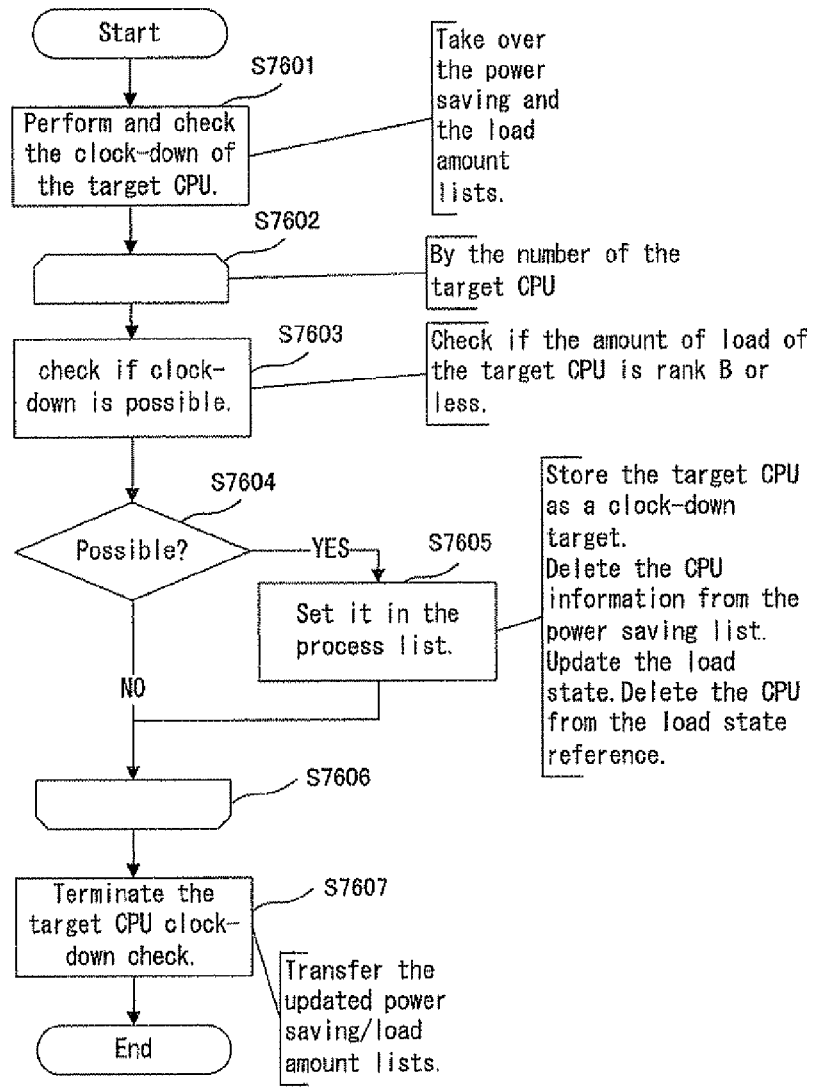
FIG. 76 is the detailed flowchart of a target CPU clockdown check process.

FIG. 76 is the detailed flowchart of the target CPU clock-down check process (step S6812).

In step S7601 the target CPU clock-down check process is started.

Step S7602 is the beginning of a loop and is repeated by the number of target CPU.

In step S7603 it is checked it can be clocked down. Specifically, the amount of load of a target CPU is checked.

In step S7604, if the amount of load of the target CPU is rank B or less, the flow proceeds to step S7605. If it is rank A, the flow proceeds to step S7606.

In step S7605 the target CPU is stored as a clock-down target. The CPU information is deleted from the power saving list. The load information is updated. The CPU is deleted from the load state reference.

Step S7606 is the end of the loop, corresponding to step S7602.

In step S7607 the target CPU clock-down check process is terminated.

FIG. 77 is the detailed flowchart of the target RAID group load state re-check process (step S6816).

In step S7701 the target RAID group load state re-check process is started. The power saving list is taken over.

Step S7702 is the beginning of a loop and is repeated by the amount of the short-time history information.

In step S7703 it is checked if there is disk access, based on the shot-time history information.

In step S7704, if there is no access, the flow proceeds to step S7705. If there is access, the flow proceeds to step S7706.

Step S7705 is the end of the loop, corresponding to step S7702.

In step S7706 the access time is checked.

In step S7707, the non-access time is checked.

In step S7708, if there is access within the operation time set by a user, the flow proceeds to step S7709. If there is no access within the time, the flow proceeds to step S7710.

In step S7709 the composing disks of the target RAID group is deleted from the power saving list.

In step S7710 the composing disks of the target RAID group are set in the process list as all disks off.

In step S7711 the target RAID group load state re-check process is terminated. Then, the updated power saving list is taken over.

Figure 78:
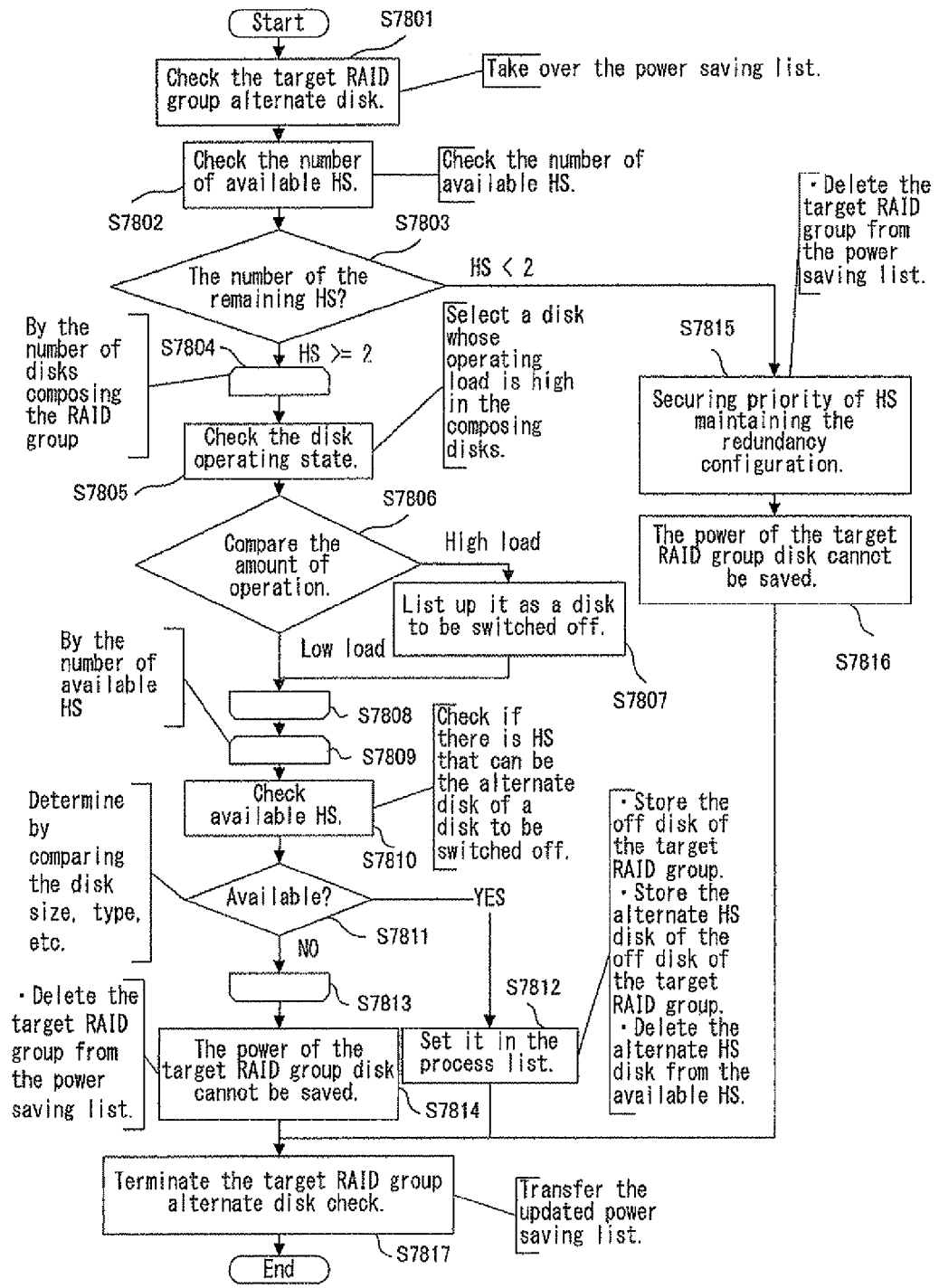
FIG. 78 is the detailed flowchart of a target RAID group substitute disk check process.

FIG. 78 is the detailed flowchart of the target RAID group substitute disk check process (step S6817).

In step S7801 the target RAID group substitute disk check process is started. The power saving list is taken over.

In step S7802 the number of available hot spare disks is checked.

In step S7803, if the number of remaining hot spare disks is two or more, the flow proceeds to step S7804. If it is less than two, the flow proceeds to step S7815.

Step S7804 is the beginning of a loop and is repeated by the number of the composing disks of the target RAID group.

In step S7805 the operating state of a disk is checked.

In step S7806 the amount of operation is compared. If the load is high, the flow proceeds to step S7807. If the load is low, the flow proceeds to step S7808.

In step S7807 a disk with high load is listed up as an off target disk indicating a power-off target disk.

Step S7808 is the end of the loop, corresponding to step S7804.

Step S7809 is the beginning of another loop and is repeated by the number of available hot spare disks.

In step S7810 it is checked if there is an available disk which can be the alternate disk of the power-off target disk. Whether it can be available is determined by comparing its disk size, type or the like.

In step S7811, if there is an available disk, the flow proceeds to step S7812. If there is no available disk, the flow proceeds to step S7813.

In step S7812 a disk to be switched off in the target RAID group (off-disk) and a hot spare disk which becomes the alternate disk of the off-disk in the target RAID group are stored in the process list. The alternate disk is deleted from the available hot spare disks.

Step S7813 is the end of the loop, corresponding to step S7809.

In step S7814 the target RAID group is deleted from the power saving list and it is determined that the power of the disk of the target RAID group cannot be saved.

In step S7815 in order to maintain a configuration with redundancy, priority is given to the securing of a hot spare disk and the target RAID group is deleted from the power saving list.

In step S7816 it is determined that the power of the disk of the target RAID group cannot be saved.

In step S7817 the target RAID group substitute disk check process is terminated. Then, the updated power saving list is taken over.

Figure 79:
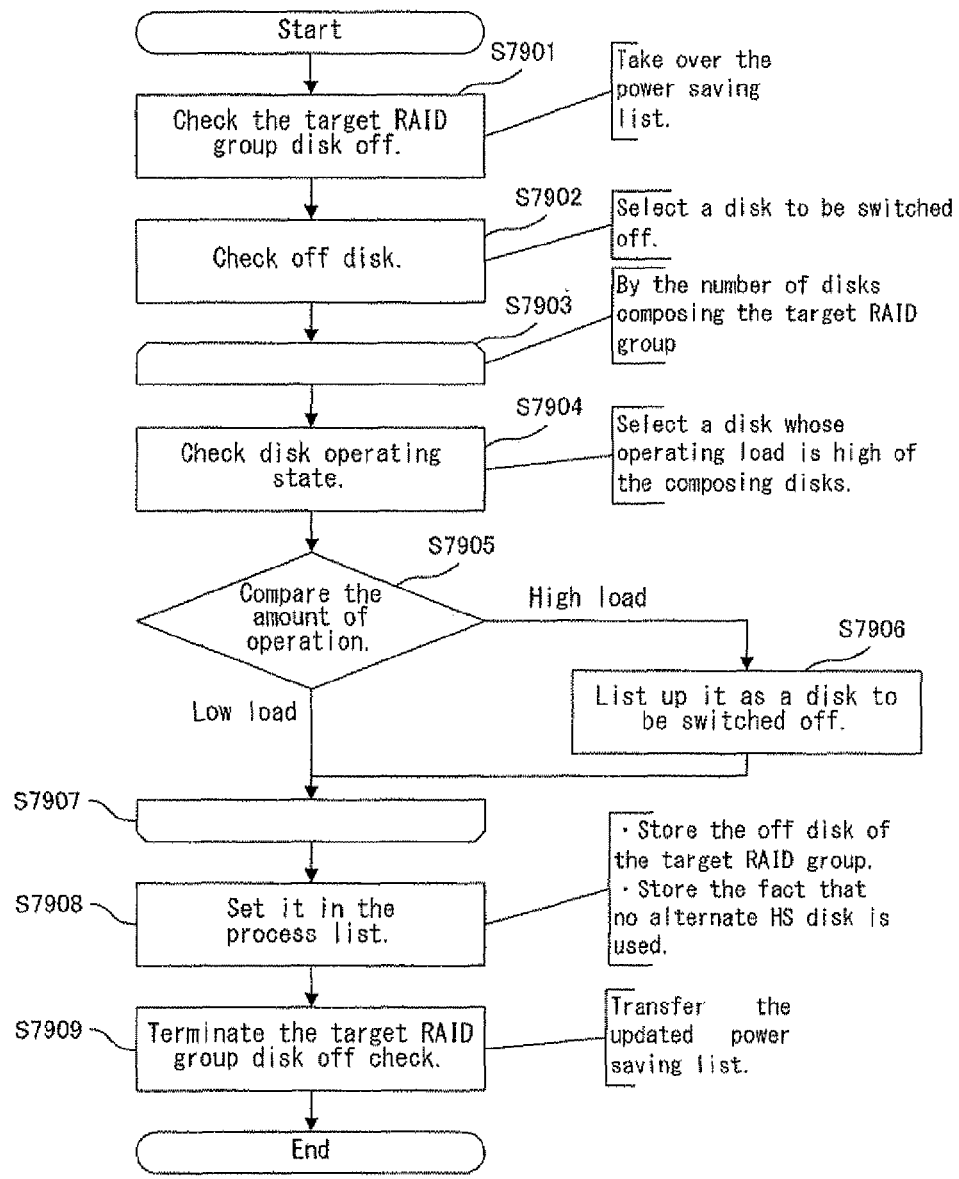
FIG. 79 is the detailed flowchart of a target RAID group disk off check process.

FIG. 79 is the detailed flowchart of the target RAID group disk off check process (step S6818).

In step S7901 the target RAID group disk off check process is started. The power saving list is taken over.

In step S7902 the selection of a disk to be switched off is started.

Step S7903 is the beginning of a loop and is repeated by the number of disks in the target RAID group.

In step S7904 the operating state of each disk is checked.

In step S7905 the amount of operation is compared. If its load is high, the flow proceeds to step S7906. If load is low, the flow proceeds to step S7907.

In step S7906 a disk with high load is listed up as off target disk indicating a disk to be switched off.

Step S7907 is the end of the loop, corresponding to step S7903.

In step S7908 the fact that a disk to be switched off in the target RAID group and an alternate hot spare disk are not used is stored.

In step S7909 the target RAID group disk off check process is terminated. Then, the updated power saving list is taken over.

Although the preferred embodiments have been so far described with reference to the drawings, the present invention is not limited to the preferred embodiment described so far and it can take various configurations and shapes as long as the subject matter of the present invention is not deviated.

What is claimed is:

1. A disk array device, comprising:
   means for operating a plurality of controller modules and disks;
   means for determining a future operating state, based on operation history of the plurality of controller modules and the disks;
   setting means for setting an operating state of the plurality of controller modules and disks in such a way as to reduce its power consumption, based on the future operating state of the plurality of controller modules and disks, wherein
   each of the plurality of controller modules comprises a plurality of CPUs,
   the means for determining the a future operating state determines a future operating state, based on operation history of the plurality of CPUs,
   the setting means sets an operating state of a CPU in such a way as to reduce its power consumption, based on the future operating state of the plurality of CPUs,
   the setting means comprises
      means for distributing load of a specific controller module to another controller module while securing redundancy of the CPU; and
      means for lowering an operating frequency of the plurality of CPUs instead of distributing load when load of another of the plurality of CPUs becomes too high.

2. The disk array device according to claim 1, wherein
the means for determining a future operating state comprises
means for ranking in order to indicate a criterion on degree of power consumption of a controller module or a disk, based on operation history; and
means for modifying the rank, based on operation history or user's setting.

3. The disk array device according to claim 2, wherein
the setting means comprises
means for distributing a load of a specific controller module to another controller module while securing redundancy of a controller module or a disk.

4. The disk array device according to claim 3, wherein
the setting means comprises
means for switching off an operation of the specific controller module.

5. The disk array device according to claim 1, wherein
the means for determining the a future operating state comprises
means for ranking in order to indicate a criterion on degree of power consumption of a CPU, based on operation history; and
means for modifying the rank, based on operation history or user's setting.

6. The disk array device according to claim 1, wherein
the setting means returns the plurality of controller modules and disks to normal operation, based on the future operating state and a present operating state of the plurality of controller modules and disks.

7. The disk array device according to claim 1, wherein
the setting means returns the plurality of controller modules and disks to normal operation, based on the operation history and a present operating state of the plurality of controller modules and disks.

8. The disk array device according to claim 1, wherein
the setting means comprises
means for transferring data of a disk operated while securing redundancy to a hot spare disk and stop an operation of the operated disk.

9. The disk array device according to claim 8, wherein
the setting means comprises
means for checking a type of a disk composing a target RAID group; and
means for stopping all disks of a target RAID group as long as no load is transferred to the target RAID group when a disk composing the target RAID group is composed of near line disks.

10. The disk array device according to claim 1, wherein
the setting means comprises
means for checking a type of a disk composing a target RAID group; and
means for saving power of a specific disk, based on access load to the target RAID group when a disk composing the target RAID group is composed of fiber channel disks.

11. A disk array device, comprising:
means for operating a plurality of control modules or disks;
performance information collection means for collecting performance information values of the plurality of controller modules or the disks;
history management means for storing the performance information values;
schedule modification means for calculating a future operation state of the plurality of controller modules or the disks, based on the performance information values;
schedule adjustment means for calculating a new future operating state, based on an operating state set by a user and the future operating state; and
means for controlling power of the plurality of controller modules or the disks, based on a present operating state and the new future operating state,
wherein
the schedule adjustment means determines whether to adjust the new future operating state to the operating state set by the user or to generate a new operating state based on the operating state set by the user and the future operating state.

12. The disk array device according to claim 11, wherein
the performance information collection means checks an operating state of the controller module or the disk, and collects performance information values if there is no problem.

13. The disk array device according to claim 11, wherein
the schedule modification means comprises
means for calculating a rank indicating a criterion on degree of power consumption of a controller module or disk, based on the performance information value.

14. The disk array device according to claim 11, wherein
the schedule modification means updates the future operating state every a prescribed time.

15. The disk array device according to claim 11, wherein
the schedule adjustment means adjusts the new future operating state to the operating state set by the user.

16. The disk array device according to claim 11, wherein
the means for controlling power checks a state of the plurality of controller modules or the disks and returns the plurality of controller modules or the disks to normal operation if there is abnormality in it and it also is in a power saving state.

17. The disk array device according to claim 11, wherein
the means for controlling power checks redundancy of the plurality of controller modules or the disks and controls power in such a way as not to lose redundancy of the plurality of controller modules or the disks.

18. The disk array device according to claim 11, wherein
the means for controlling power checks redundancy of the plurality of controller modules or the disks and switches off one of the plurality of controller modules or the disks in such a way as not to lose redundancy of the plurality of controller modules or the disks.

19. The disk array device according to claim 18, wherein
the means for controlling power transfers a process of the switched-off controller module or disk to another controller module or disk.

20. The disk array device according to claim 19, wherein
when transferring a process of the switched-off controller module or disk to another controller module or disk,
the means for controlling power checks whether the received other controller module or disk to another controller module or disk can perform a process.

* * * * *

UNITED STATES PATENT AND TRADEMARK OFFICE
CERTIFICATE OF CORRECTION

PATENT NO. : 8,108,702 B2
APPLICATION NO. : 12/038439
DATED : January 31, 2012
INVENTOR(S) : Masahiro Yoshida et al.

It is certified that error appears in the above-identified patent and that said Letters Patent is hereby corrected as shown below:

On the Title Page:

Item (57) (Abstract), Line 3, delete "the a" and insert -- a --, therefor.

Column 50, Line 55, In Claim 1, delete "the a" and insert -- a --, therefor.

Column 51, Line 20 (Approx.), In Claim 5, delete "the a" and insert -- a --, therefor.

Signed and Sealed this
Seventeenth Day of April, 2012

David J. Kappos
*Director of the United States Patent and Trademark Office*